United States Patent
Motoi et al.

(10) Patent No.: US 10,625,529 B2
(45) Date of Patent: Apr. 21, 2020

(54) HINGED LAMINATED BODY, LAYOUT SHEET FOR HINGED LAMINATED BODY, AND MANUFACTURING METHOD FOR HINGED LAMINATED BODY

(71) Applicant: Dai Nippon Printing Co., Ltd., Tokyo (JP)

(72) Inventors: Takumi Motoi, Tokyo (JP); Toru Nishioka, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/061,693

(22) PCT Filed: Dec. 14, 2016

(86) PCT No.: PCT/JP2016/087269
§ 371 (c)(1),
(2) Date: Jun. 13, 2018

(87) PCT Pub. No.: WO2017/104718
PCT Pub. Date: Jun. 22, 2017

(65) Prior Publication Data
US 2019/0009607 A1  Jan. 10, 2019

(30) Foreign Application Priority Data

Dec. 14, 2015 (JP) .................... 2015-243163
Dec. 14, 2015 (JP) .................... 2015-243385
Dec. 14, 2015 (JP) .................... 2015-243386

(51) Int. Cl.
*B42D 1/00* (2006.01)
*B42D 25/305* (2014.01)
(Continued)

(52) U.S. Cl.
CPC .............. *B42D 1/007* (2013.01); *B42D 1/00* (2013.01); *B42D 25/24* (2014.10); *B42D 25/305* (2014.10);
(Continued)

(58) Field of Classification Search
CPC ...... B42D 1/007; B42D 25/455; B42D 25/46; B42D 25/475; B42D 1/00; B42D 25/305;
(Continued)

(56) References Cited

U.S. PATENT DOCUMENTS 7,758,079 B2    7/2010  Beyer-Meklenburg et al.
2006/0261171 A1  11/2006  Buursma et al.
(Continued)

FOREIGN PATENT DOCUMENTS

EP    2287012 A1    2/2011
JP    2006-518898 A    8/2006
(Continued)

OTHER PUBLICATIONS

International Search Report dated Feb. 21, 2017, issued for PCT/JP2016/087269.
(Continued)

*Primary Examiner* — Justin V Lewis
(74) *Attorney, Agent, or Firm* — Locke Lord LLP

(57) ABSTRACT

A thin hinged laminated body and a layout sheet for the hinged laminated body are provided. A hinged laminated body, equipped with: an IC module having an IC chip capable of performing contactless communication; a hinge layer having a hinge section which can be bound into a booklet; a non-hinge layer which is laminated onto the hinge layer and does not have a hinge part, wherein the hinge layer is disposed over the entire surface of the laminated body having the hinge, the hinge layer and the non-hinge layer (Continued)

have a housing hole penetrating across the two layers, and the IC module is housed and held inside the housing hole.

26 Claims, 42 Drawing Sheets

(51) Int. Cl.
| | | |
|---|---|---|
| *G06K 19/02* | (2006.01) | |
| *B42D 25/40* | (2014.01) | |
| *G06K 19/077* | (2006.01) | |
| *B42D 25/24* | (2014.01) | |
| *B42D 25/455* | (2014.01) | |
| *B42D 25/46* | (2014.01) | |
| *B42D 25/475* | (2014.01) | |
| *G06K 19/07* | (2006.01) | |
| *B42D 25/328* | (2014.01) | |

(52) U.S. Cl.
CPC ........... *B42D 25/40* (2014.10); *B42D 25/455* (2014.10); *B42D 25/46* (2014.10); *B42D 25/475* (2014.10); *G06K 19/02* (2013.01); *G06K 19/077* (2013.01); *G06K 19/0723* (2013.01); *B42D 25/328* (2014.10)

(58) Field of Classification Search
CPC ...... B42D 25/40; B42D 25/328; B42D 25/24; G06K 19/0723; G06K 19/077; G06K 19/02
USPC .............. 283/67, 70, 72, 74, 75, 94, 98, 901
See application file for complete search history.

(56) References Cited

U.S. PATENT DOCUMENTS

2014/0265295 A1     9/2014  Rhyner et al.
2014/0326789 A1*   11/2014  Lim ..................... G06K 19/077
                                                                235/488

FOREIGN PATENT DOCUMENTS

| JP | 2012-038324 A | 2/2012 |
| JP | 2013-067020 A | 4/2013 |
| WO | 2007/034129 A1 | 3/2007 |

OTHER PUBLICATIONS

Extended European Search Report dated Jul. 17, 2019, issued in the EP Patent Application No. 16875695.5.

* cited by examiner

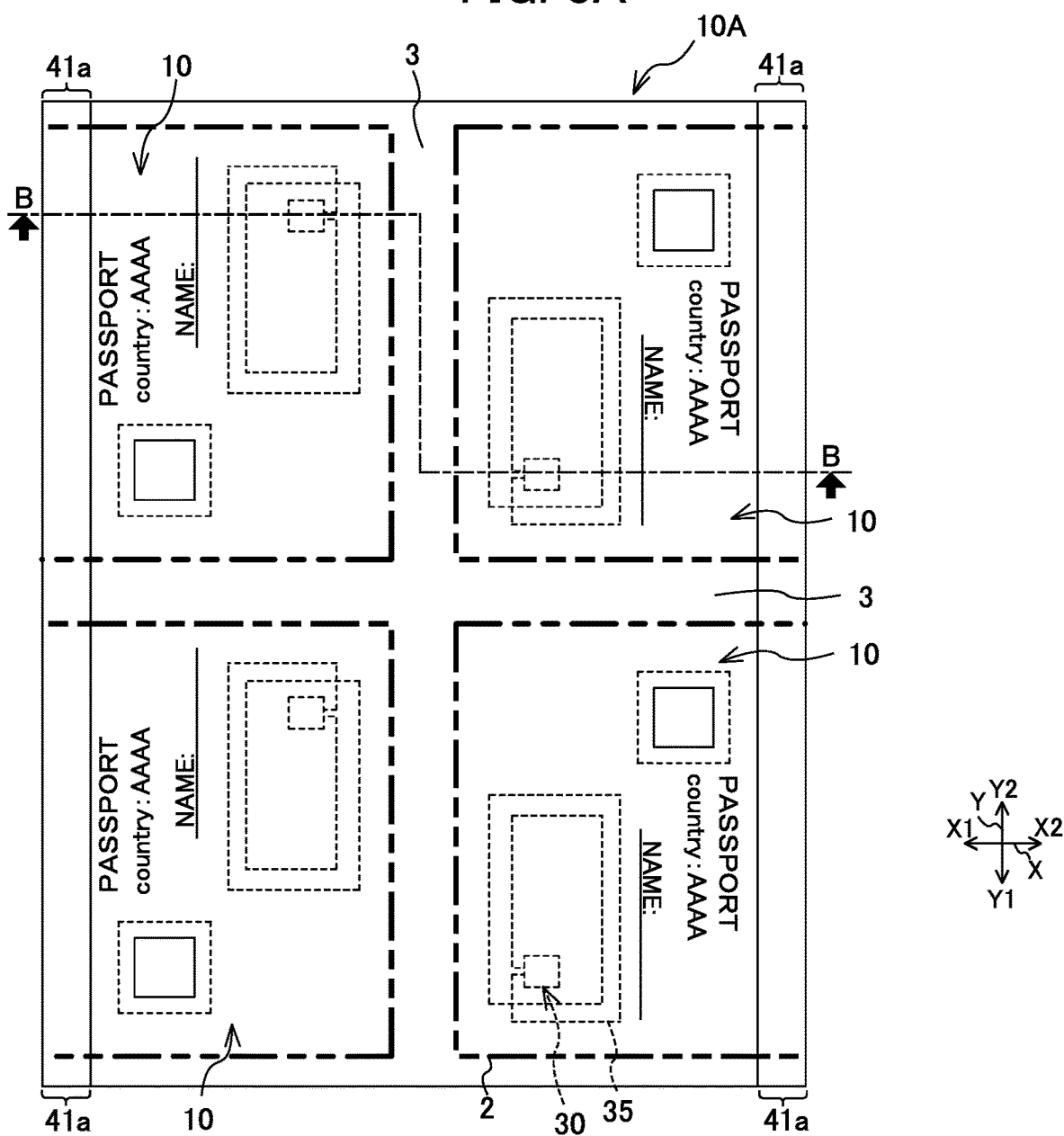

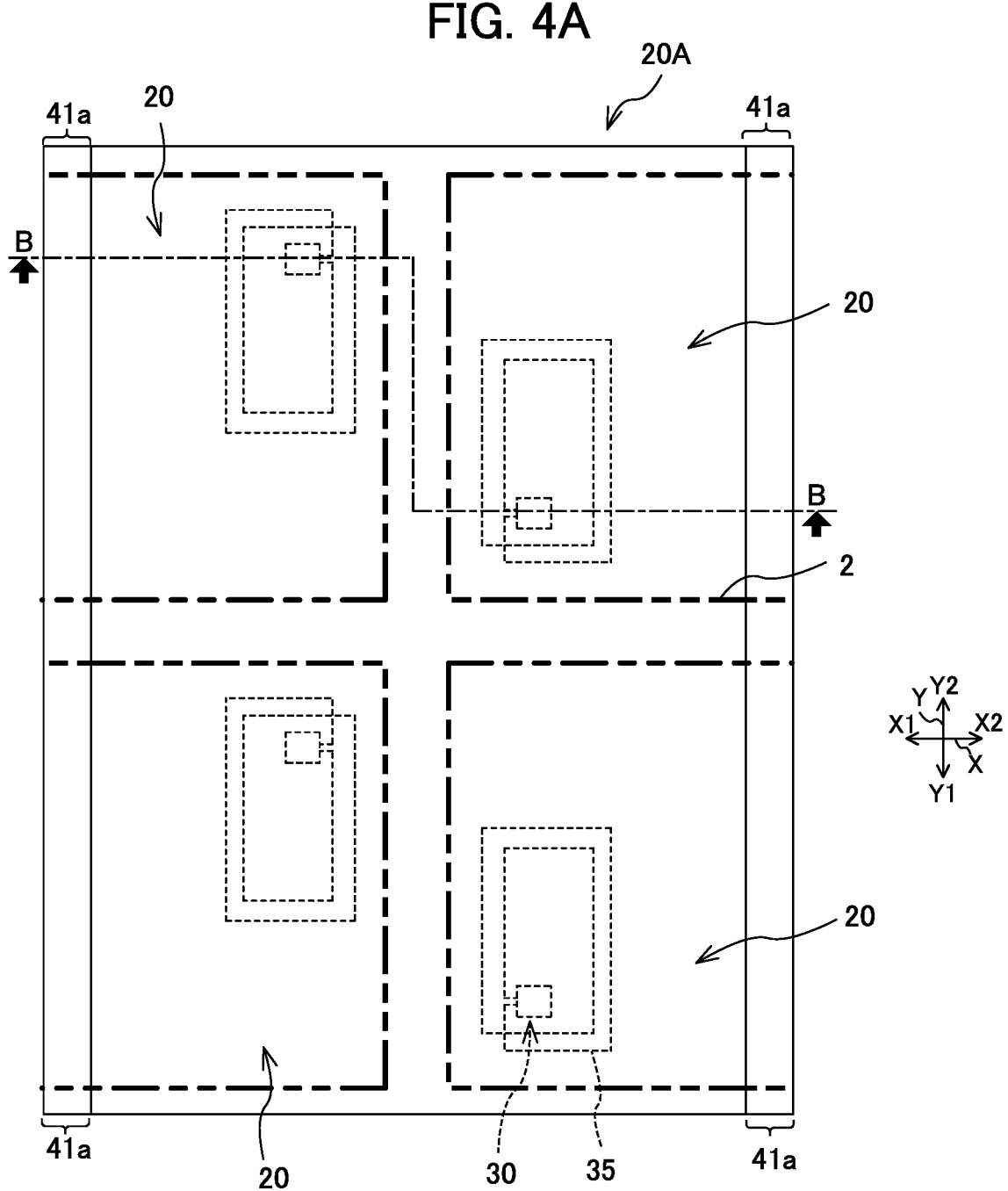

FIG. 8
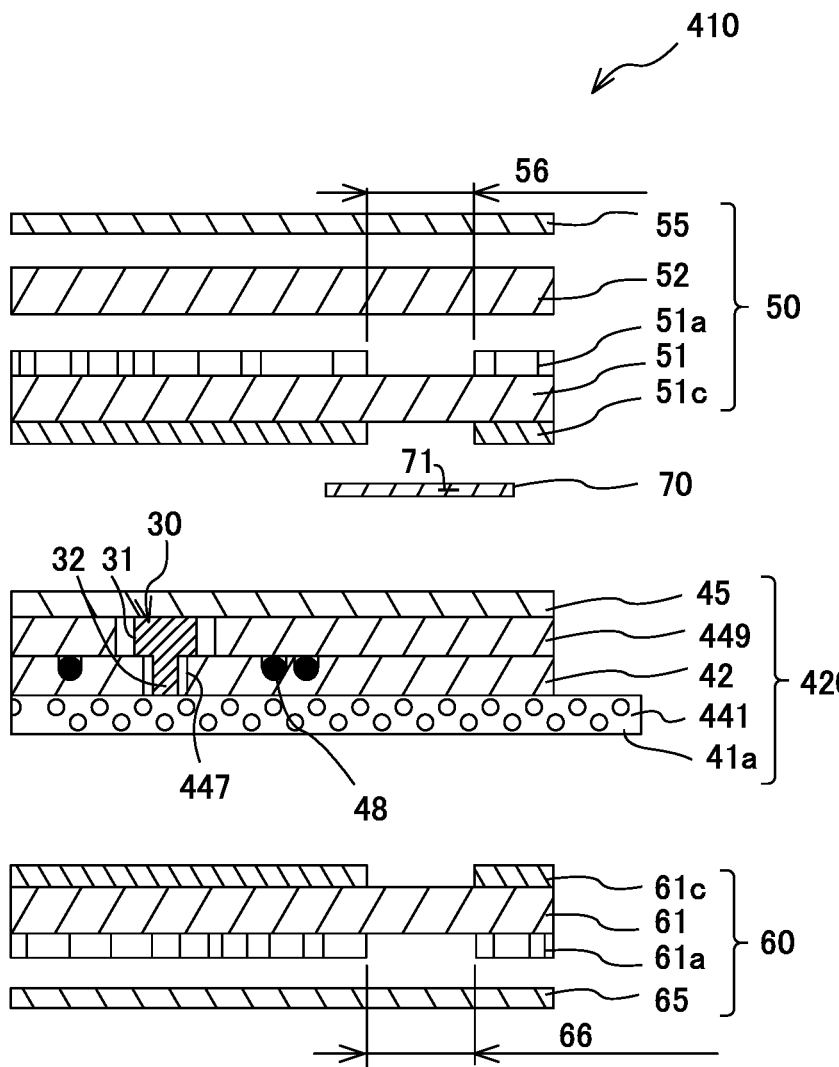
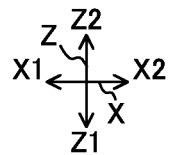

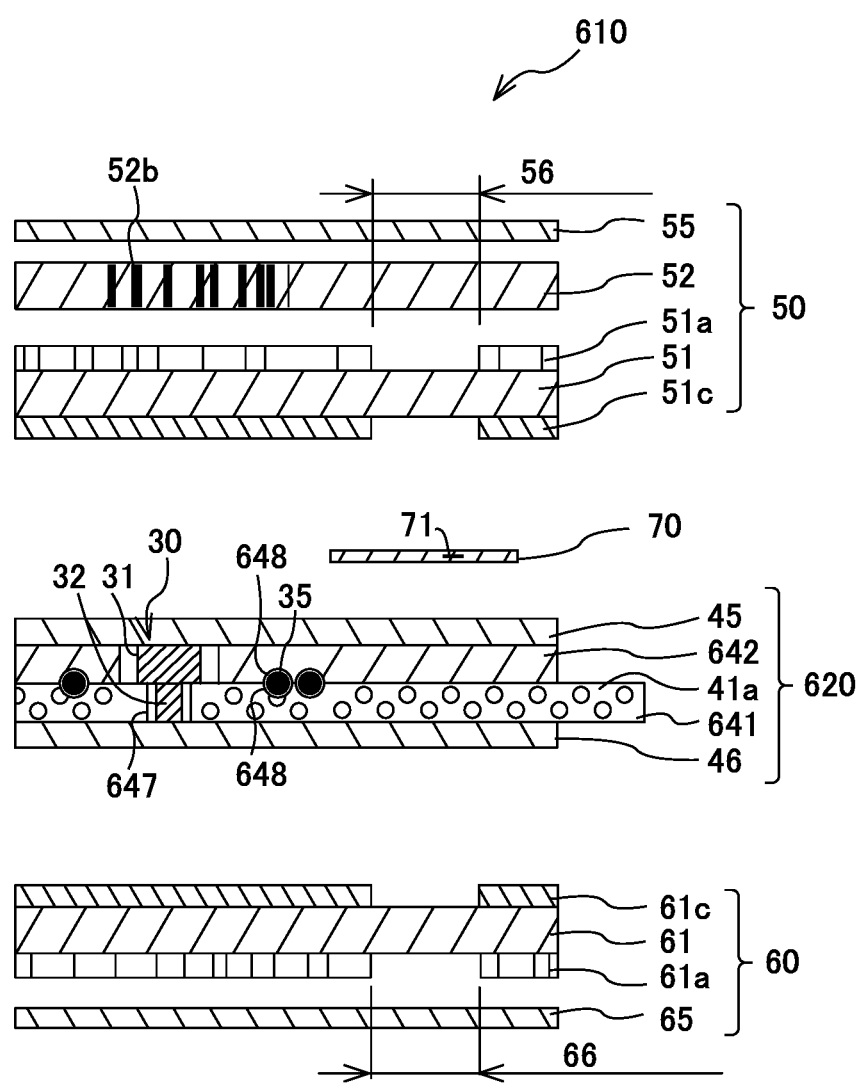

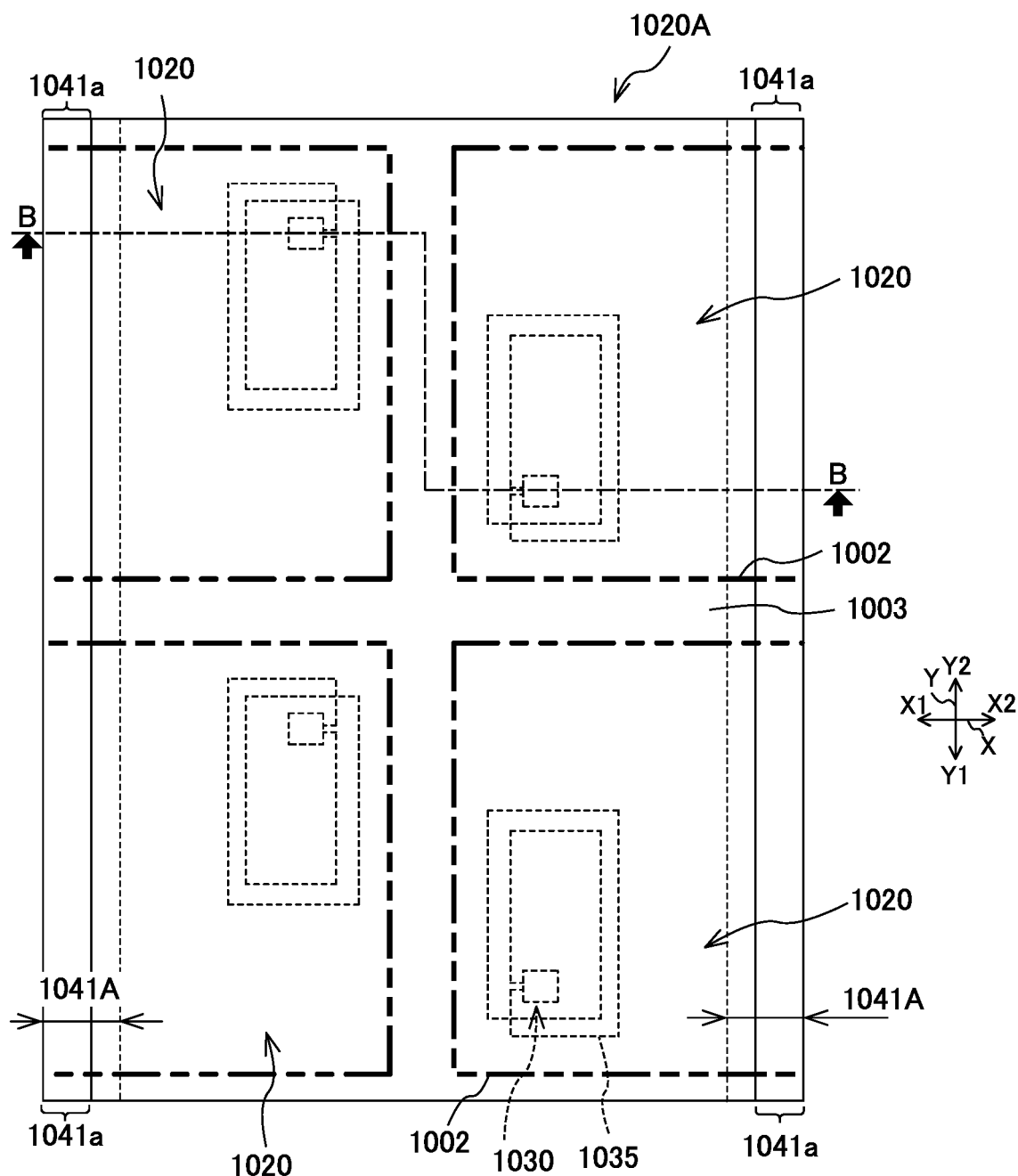

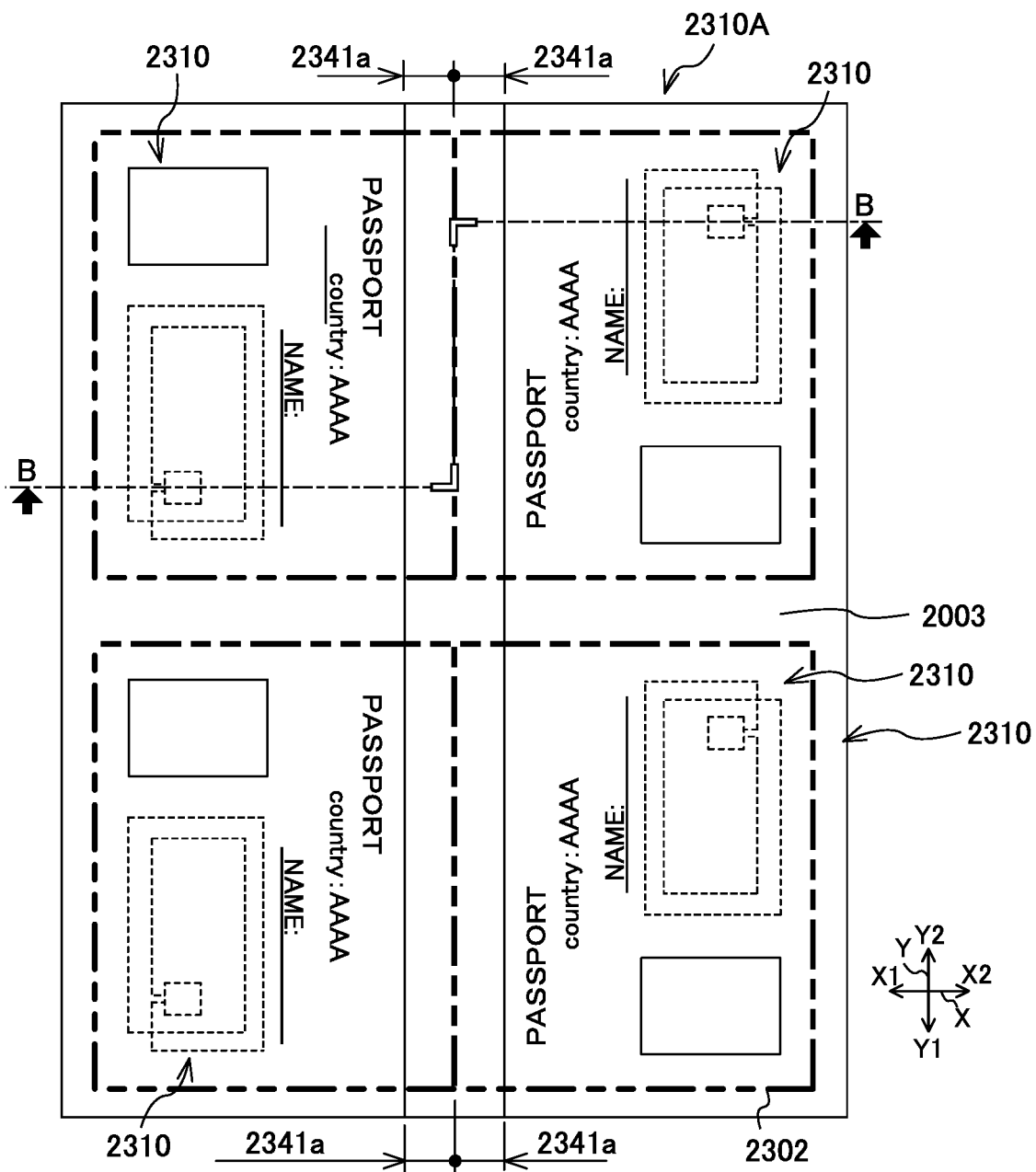

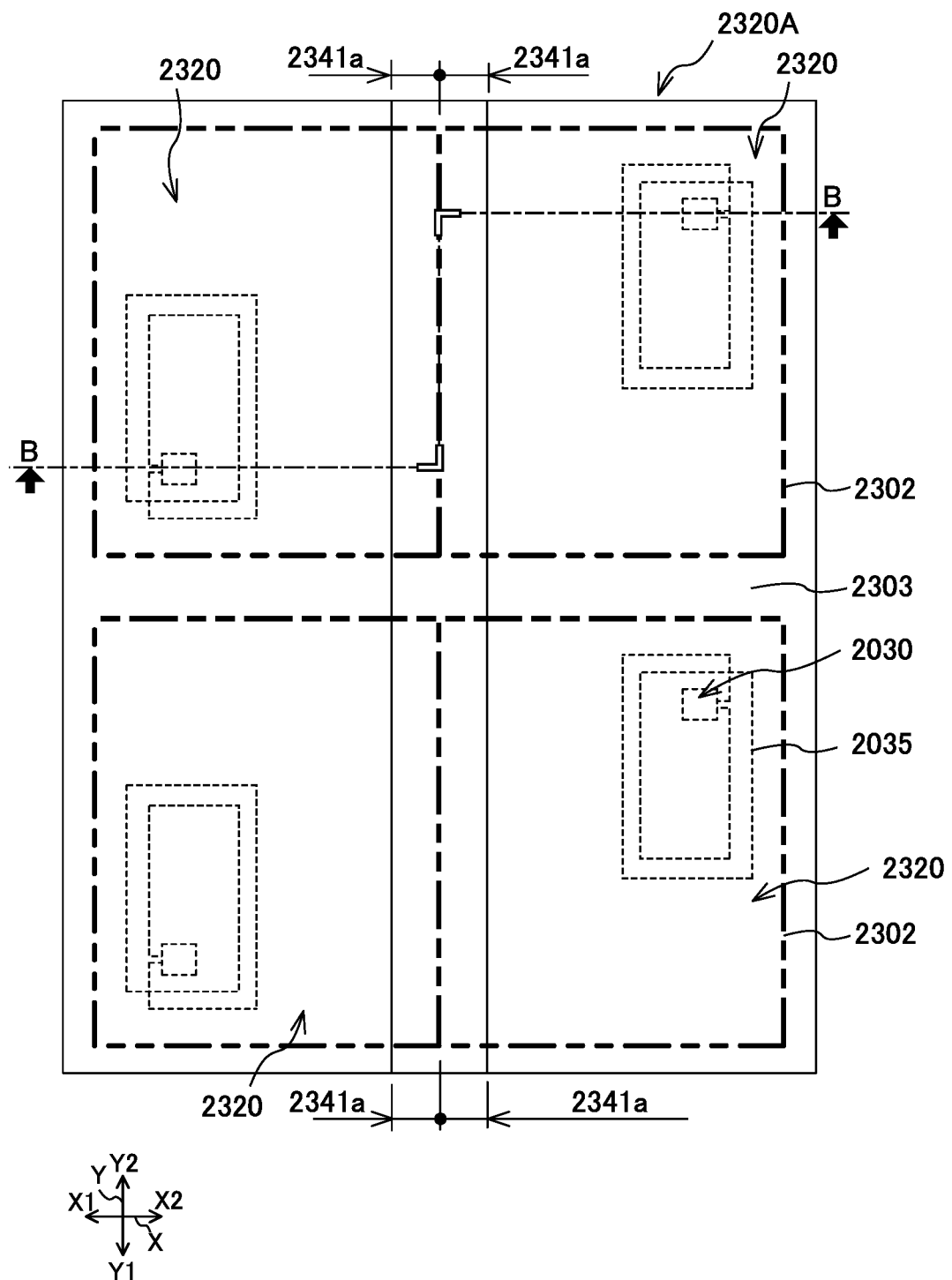

HINGED LAMINATED BODY, LAYOUT SHEET FOR HINGED LAMINATED BODY, AND MANUFACTURING METHOD FOR HINGED LAMINATED BODY

TECHNICAL FIELD

The present invention relates to a hinged laminated body bound into a booklet, a layout sheet for the hinged laminated body, and a method of manufacturing the hinged laminated body.

BACKGROUND ART

Conventionally, there has been an inlet which has an electronic component and is bound into a booklet such as a passport (for example, Patent Document 1).

However, in the conventional inlet, a hinge has been attached by laminating a hinge layer onto a card-like medium having an electronic component. For this reason, the conventional inlet has a large overall thickness.

In addition, conventionally, there has been a data page bound into a booklet such as a passport (for example, Patent Document 2).

However, the data page has a hinge section which is a portion bound into the booklet, and thus manufacture is difficult when compared to an IC card, etc.

Patent Document 1: European Patent Publication, No. 2287012, Specification

Patent Document 2: Japanese Unexamined Patent Application, Publication No. 2012-38324

DISCLOSURE OF THE INVENTION

Problems to be Solved by the Invention

An object of the invention is to provide a thin hinged laminated body and a layout sheet for the hinged laminated body.

Another object of the invention is to provide a layout sheet for a hinged laminated body which is easy to manufacture and a method of manufacturing the hinged laminated body.

Means for Solving the Problems

The invention solves problems using solution means below. Even though a description will be given by assigning reference numerals corresponding to embodiments of the invention to facilitate understanding, the invention is not limited thereto. In addition, a configuration described by assigning a reference numeral thereto may be modified as appropriate, and at least a part thereof may be replaced with another component.

A 1-1st invention is a hinged laminated body including an IC module (30) having an IC chip capable of performing contactless communication, a hinge layer (41, 241, 541, 641) having a hinge section (41*a*) bindable into a booklet, and a non-hinge layer (42, 242, 542, 642) which is laminated on the hinge layer and does not have a hinge section, wherein the hinge layer is provided on an entire surface of the hinged laminated body, the hinge layer and the non-hinge layer have a housing hole (47, 247, 547, 647) penetrating across the two layers, and the IC module is housed and held in the housing hole.

A 1-2nd invention is the hinged laminated body according to the 1-1st invention, wherein the IC module further has a mounted substrate (31) on one surface of which the IC chip (32) is mounted, a width of the mounted substrate is larger than a width of the IC chip in a cross-sectional view, and the housing hole is divided into a first housing hole (47*a*) on a side of the hinge layer and a second housing hole (47*b*) on a side of the non-hinge layer in the cross-sectional view, the first housing hole houses one of the mounted substrate and the IC chip, and the second housing hole houses the other one of the mounted substrate and the IC chip.

A 1-3rd invention is the hinged laminated body according to the 1-2nd invention, wherein the first housing hole or the second housing hole housing the IC chip has an amount of a width not allowing the mounted substrate to be housed.

A 1-4th invention is the hinged laminated body according to any one of the 1-1st invention to the 1-3rd invention, wherein a melting temperature of the hinge layer is different from a melting temperature of the non-hinge layer.

A 1-5th invention is the hinged laminated body according to any one of the 1-1st invention to the 1-4th invention, further including an antenna (35) connected to the IC chip, wherein one of or both the hinge layer and the non-hinge layer have an antenna buried groove (48, 248, 548, 648) in which the antenna is buried.

A 1-6th invention is the hinged laminated body according to any one of the 1-1st invention to the 1-5th invention, further including an upper layer (50) laminated on an upper side of the hinge layer and the non-hinge layer, and a lower layer (60) laminated on a lower side of the hinge layer and the non-hinge layer.

A 1-7th invention is the hinged laminated body according to the 1-6th invention, wherein the hinge layer and the non-hinge layer have translucency, the upper layer includes an upper layer window portion (56) through which a part of one of the hinge layer and the non-hinge layer close to the upper layer is visually recognizable, and the lower layer includes a lower layer window portion (66) through which a part of one of the hinge layer and the non-hinge layer close to the lower layer is visually recognizable and which is provided in a region overlapping the upper layer window portion.

A 1-8th invention is a layout sheet for a hinged laminated body in which a plurality of hinged laminated bodies according to any one of the 1-1st invention to the 1-7th invention is arranged.

A 1-9th invention is a booklet in which the hinged laminated body according to any one of the 1-1st invention to the 1-7th invention is bound at the hinge section included in the hinged laminated body.

A 2-1st invention is a hinged laminated body including an IC module (1030) having an IC chip capable of performing contactless communication, an antenna (1035) connected to the IC chip, and a hinge layer (1041, 1241, 1341, 1441, 1541) having a hinge section (1041*a*) bindable into a booklet, wherein the hinge layer is laminated on a part of the hinged laminated body when an upper surface of the hinged laminated body is viewed in a normal direction, and the hinged laminated body further includes a thickness adjustment layer (1042, 1242, 1342, 1442, 1542) which is laminated at a same position as a position of the hinge layer in a thickness direction, has a thickness corresponding to the hinge layer, and holds at least one of the IC module and the antenna.

A 2-2nd invention is the hinged laminated body according to the 2-1st invention, wherein the thickness adjustment layer (1042, 1242, 1542) forms at least a part of a housing hole (1047) that holds the IC module (1030) by housing the IC module therein.

A 2-3rd invention is the hinged laminated body according to the 2-1st invention, further including a housing hole (1347, 1447) that houses the IC module (1030), wherein the thickness adjustment layer (1342, 1442) covers an opening of the housing hole.

A 2-4th invention is the hinged laminated body according to the 2-1st invention or the 2-3rd invention, further including an antenna buried layer (1043) having an antenna buried groove (1048) in which the antenna (1035) is buried, wherein the thickness adjustment layer (1042) holds the antenna by covering an opening of the antenna buried groove of the antenna buried layer.

A 2-5th invention is the hinged laminated body according to the 2-1st invention or the 2-2nd invention, wherein the thickness adjustment layer (1242, 1542) includes an antenna buried groove (1048, 1248) that holds the antenna (1035) buried therein.

A 2-6th invention is the hinged laminated body according to any one of the 2-1st invention to the 2-5th invention, further including an upper layer (1050) laminated on an upper side of the hinged laminated body (1020, 1220, 1320, 1420, 1520), and a lower layer (1060) laminated on a lower side of the hinged laminated body.

A 2-7th invention is the hinged laminated body according to the 2-6th invention, wherein the hinge layer (1041, 1241, 1341, 1441, 1541) and/or the thickness adjustment layer (1042, 1242, 1342, 1442, 1542) has translucency, the upper layer (1050) includes an upper layer window portion (1056) through which a part of the hinge layer and the thickness adjustment layer is visually recognizable, and the lower layer (1060) includes a lower layer window portion (1066) through which a part of the hinge layer and the thickness adjustment layer is visually recognizable and which is provided in a region overlapping the upper layer window portion.

A 2-8th invention is a layout sheet for a hinged laminated body in which a plurality of hinged laminated bodies (1020, 1220, 1320, 1420, 1520) according to any one of the 2-1st invention to the 2-7th invention is arranged.

A 2-9th invention is a booklet in which the hinged laminated body (1020, 1220, 1320, 1420, 1520) according to any one of the 2-1st invention to the 2-5th invention is bound at the hinge section (1041*a*) included in the hinged laminated body.

A 3-1st invention is a layout sheet for a hinged laminated body (2020A, 2220A) in which a plurality of hinged laminated bodies (2020, 2220) is arranged, wherein the hinged laminated body includes an IC chip (2032) capable of performing contactless communication, an antenna (2035) connected to the IC chip, and a hinge layer (2041) having a hinge section (2041*a*, 2241*a*) bindable into a booklet.

A 3-2nd invention is the layout sheet for a hinged laminated body according to the 3-1st invention, wherein the hinge section (2041*a*, 2241*a*) protrudes at a side surface on a bound side.

A 3-3rd invention is the layout sheet for a hinged laminated body according to the 3-1st invention or the 3-2nd invention, wherein hinge sections (2041*a*, 2241*a*) of adjacent hinged laminated bodies (2020-1 and 2020-2, 2020-3 and 2020-4, 2220) are disposed along at least one side of the layout sheet for a hinged laminated body (2020A, 2220A).

A 3-4th invention is the layout sheet for a hinged laminated body according to any one of the 3-1st invention to the 3-3rd invention, wherein hinge sections (2041*a*, 2241*a*) of adjacent hinged laminated bodies (2020-1 and 2020-3, 2020-2 and 2020-4, 2220) are disposed on opposite sides of the layout sheet for a hinged laminated body (2020A, 2220A).

A 3-5th invention is the layout sheet for a hinged laminated body according to any one of the 3-1st invention to the 3-4th invention, wherein a hinge layer sheet material (2241A) in which hinge layers of the plurality of hinged laminated bodies (2220) are arranged is laminated exclusively at an edge of a side along a side surface from which the hinge section (2241*a*) protrudes.

A 3-6th invention is the layout sheet for a hinged laminated body according to any one of the 3-1st invention to the 3-4th invention, wherein a hinge layer sheet material (2041A) in which hinge layers (2041) of the plurality of hinged laminated bodies (2020) are arranged is larger than an external shape of another sheet material (2042A, 2045A, 2046A) of the layout sheet for a hinged laminated body (2020A) and is laminated on an entire surface of the layout sheet for a hinged laminated body.

A 3-7th invention is the layout sheet for a hinged laminated body according to the 3-1st invention or the 3-2nd invention, wherein hinge sections (2241*a*) of adjacent hinged laminated bodies (2220) are disposed along at least one side of the layout sheet for a hinged laminated body (2220A), and a hinge layer sheet material (2241A) in which hinge layers of the adjacent hinged laminated bodies are arranged is laminated exclusively at an edge along at least the one side.

A 3-8th invention is a layout sheet for a hinged laminated body (2320A, 2420A) in which a plurality of hinged laminated bodies (2320, 2420) is arranged, wherein the hinged laminated body includes an IC chip (2032) capable of performing contactless communication, an antenna (2035) connected to the IC chip, and a hinge layer (2341A, 2441A) having a hinge section (2341*a*, 2441*a*) bindable into a booklet, and hinge sections of adjacent hinged laminated bodies are disposed on an inside of the layout sheet for a hinged laminated body, and the adjacent hinged laminated bodies are connected through the hinge sections thereof.

A 3-9th invention is the layout sheet for a hinged laminated body according to the 3-8th invention, wherein the hinge section (2341*a*, 2441*a*) protrudes at a side surface on a bound side.

A 3-10th invention is the layout sheet for a hinged laminated body according to the 3-8th invention or the 3-9th invention, wherein the hinge layer (2441A) of the hinged laminated body (2420) is laminated exclusively at an edge of a side along a side surface from which the hinge section (2441*a*) protrudes.

A 3-11th invention is the layout sheet for a hinged laminated body according to the 3-8th invention or the 3-9th invention, wherein a hinge layer sheet material (2341A) in which hinge layers of the plurality of hinged laminated bodies (2320) are arranged is larger than an external shape of another sheet material (2342A, 2345A, 2346A) of the layout sheet for a hinged laminated body (2320A) and is laminated on an entire surface of the layout sheet for a hinged laminated body.

A 3-12th invention is a method of manufacturing a hinged laminated body (2020, 2220, 2320, 2420) using the layout sheet for the hinged laminated body according to any one of the 3-1st invention to the 3-11th invention, the method including an individual piece separation process of separating the hinged laminated bodies into individual pieces such that the hinge sections (2041*a*, 2241*a*, 2341*a*, 2441*a*) remain by cutting the layout sheet for the hinged laminated body (2020A, 2220A, 2320A, 2420A).

A 3-13th invention is a method of manufacturing a hinged laminated body (2010, 2210, 2310, 2410) using the layout sheet for the hinged laminated body (2020A, 2220A, 2320A, 2420A) according to any one of the 3-1st invention to the 3-11th invention, the method including an upper layer lamination process of laminating an upper layer layout sheet (2051A, 2052A, 2055A, 2351A, 2352A, 2355A) in which a plurality of upper layers is arranged on the layout sheet for the hinged laminated body, a lower layer lamination process of laminating a lower layer layout sheet in which a plurality of lower layers (2061A, 2065A, 2361A, 2365A) is arranged on the layout sheet for the hinged laminated body, a hot pressing process of thermally welding layers of the layout sheet for the hinged laminated body at interfaces thereof, and the upper layer layout sheet and the lower layer layout sheet, and an individual piece separation process of separating the hinged laminated bodies into individual pieces such that the hinge sections (2041a, 2241a, 2341a, 2441a) remain by cutting the thermally welded layers.

Effects of the Invention

According to the invention, it is possible to provide a thin hinged laminated body and a layout sheet for the hinged laminated body.

In addition, according to the invention, it is possible to provide a layout sheet for a hinged laminated body which is easy to manufacture and a method of manufacturing the hinged laminated body.

BRIEF DESCRIPTION OF THE DRAWINGS

FIG. 3A is a diagram for description of a layout sheet for the hinged laminated body 10A of the 1-1st embodiment;

FIG. 4A is a diagram for description of a configuration of a layout sheet for the hinged laminated body 20A of the 1-1st embodiment;

FIG. 8 is a cross-sectional view of a hinged laminated body 410 of a 1-4th embodiment;

FIG. 10 is a cross-sectional view of a hinged laminated body 610 of a 1-6th embodiment;

FIG. 14A is a diagram for description of a configuration of a layout sheet for the hinged laminated body 1020A of the 2-1st embodiment;

FIG. 27A is a diagram for description of a layout sheet for a hinged laminated body 2310A of a 3-3rd embodiment;

FIG. 28A is a diagram for description of a layout sheet for a hinged laminated body 2320A of the 3-3rd embodiment;

PREFERRED MODE FOR CARRYING OUT THE INVENTION (Embodiments)

Hereinafter, embodiments of the invention will be described with reference to drawings, etc.

(1-1st Embodiment)

[Configuration of Hinged Laminated Body 10 (Single Part)]

Figure 1A:
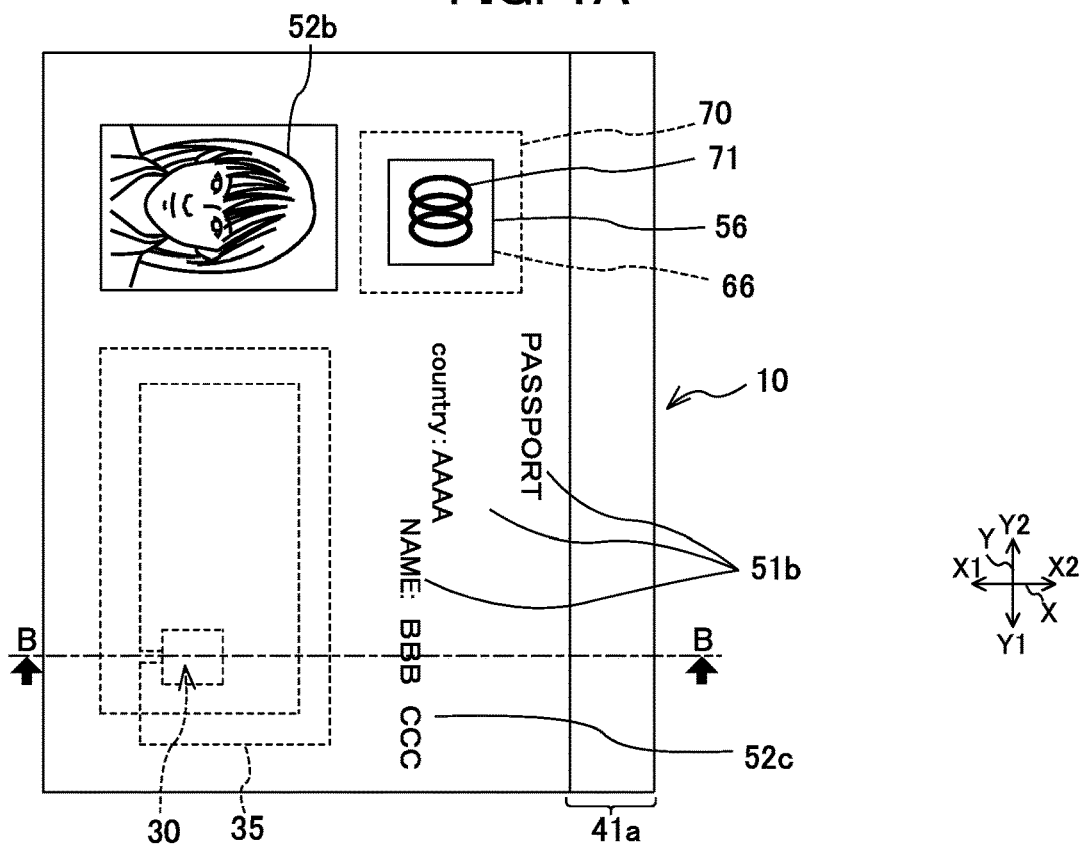
FIG. 1A is a diagram for description of a configuration of a single part of a hinged laminated body 10 of a 1-1st embodiment.
Figure 1B:
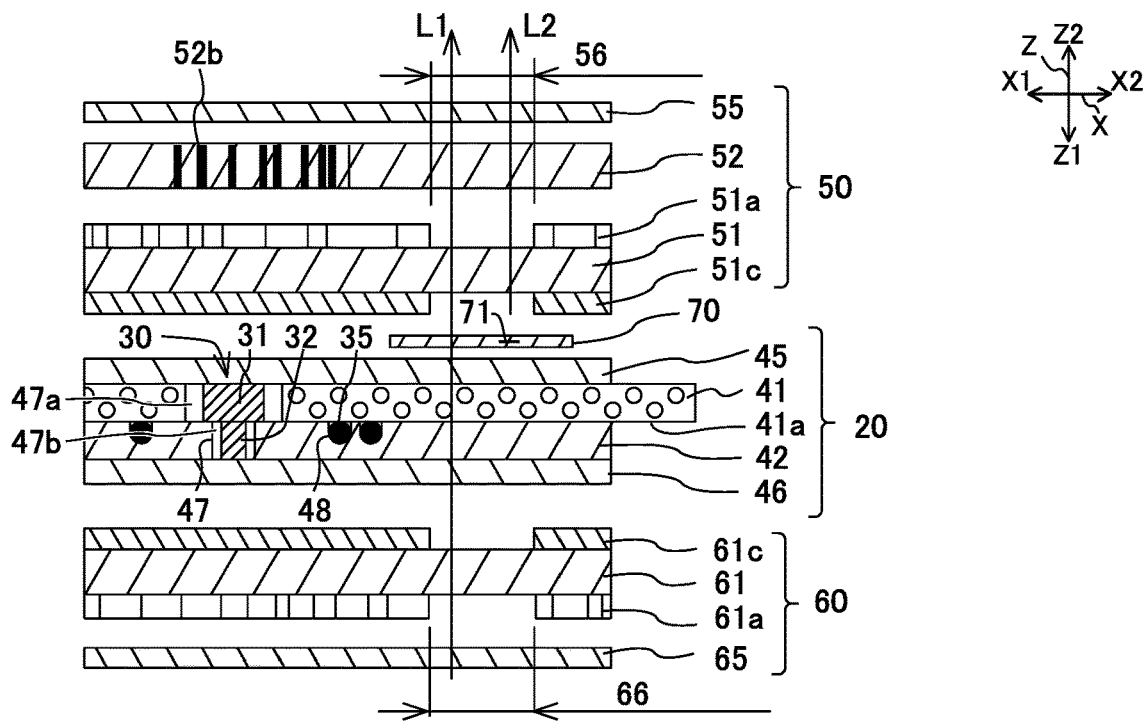
FIG. 1B is a diagram for description of the configuration of the single part of the hinged laminated body 10 of the 1-1st embodiment.

FIG. 1A and FIG. 1B are diagrams for description of a configuration of a single part of a hinged laminated body 10 of a 1-1st embodiment.

FIG. 1A is a diagram of the hinged laminated body 10 viewed from an upper side Z2 in a thickness direction Z (a normal direction of an upper surface).

FIG. 1B is a cross-sectional view (B-B sectional view of FIG. 1A) of the hinged laminated body 10.

FIG. 1B is a cross-sectional view passing through an IC module 30 and illustrates a mode of color development of a laser color development layer 52 and window portions 56 and 66. The above description is applied to the following drawings.

Figure 2A:
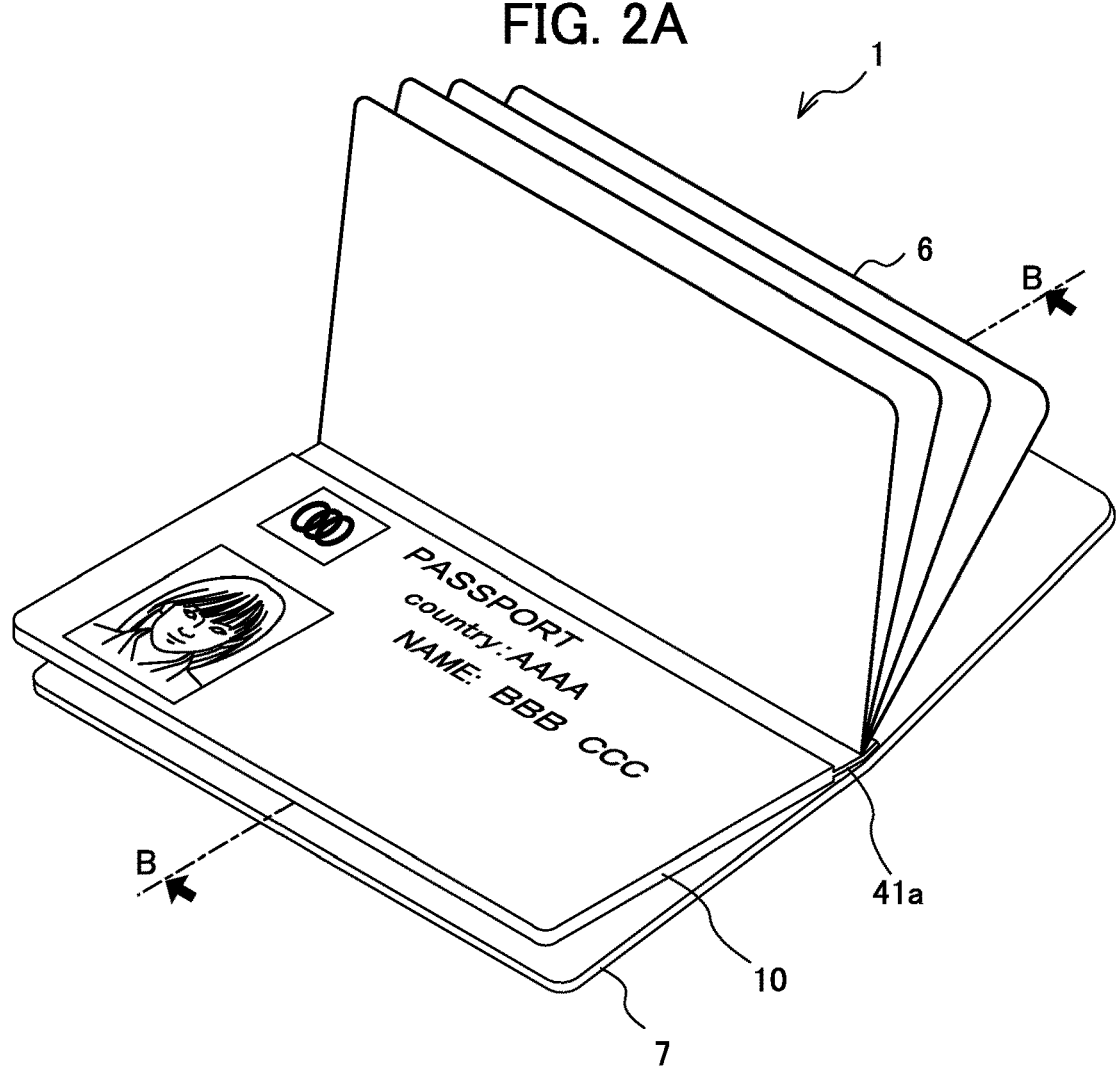
FIG. 2A is a diagram for description of a passport 1 of the 1-1st embodiment.
Figure 2B:
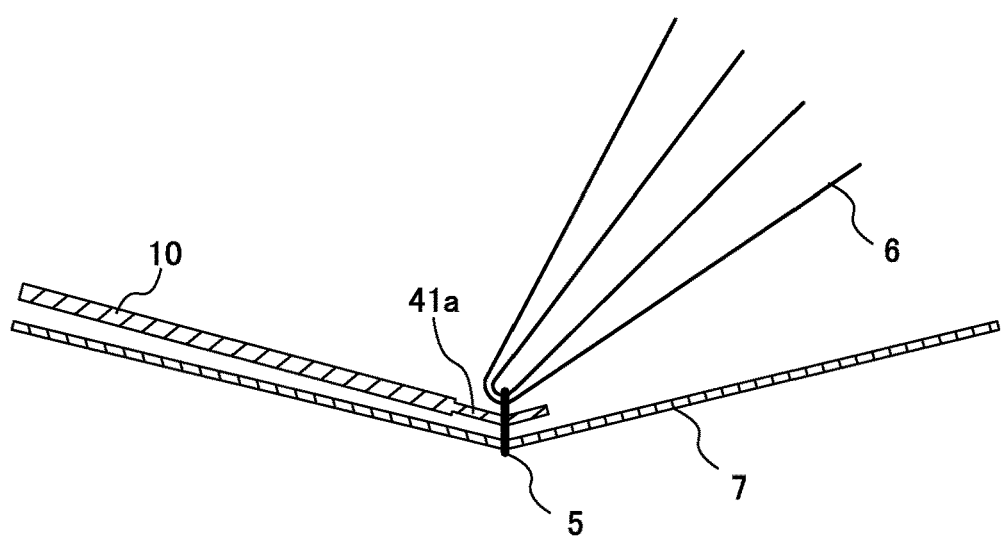
FIG. 2B is a diagram for description of the passport 1 of the 1-1st embodiment.

FIG. 2A and FIG. 2B are diagrams for description of a passport 1 of the 1-1st embodiment.

FIG. 2A is a perspective view of a state in which a page formed by the hinged laminated body 10 is open.

FIG. 2B is a cross-sectional view (B-B sectional view of FIG. 2A) of the state in which the page formed by the hinged laminated body 10 is open.

In embodiments and drawings, an XYZ orthogonal coordinate system is provided to facilitate understanding of description. This coordinate system represents a left-right direction X (left side X1, right side X2), a longitudinal direction Y (lower side Y1, upper side Y2), and the thickness direction Z (lower side Z1, upper side Z2) with reference to the state of FIG. 1A.

The hinged laminated body 10 is bound into the passport 1 of a booklet. That is, the hinged laminated body 10 is used for an identification data page of the passport 1 (also referred to as an IC passport, etc.) incorporating an IC chip 32.

Use of the hinged laminated body 10 is not limited to the passport 1, and the hinged laminated body 10 may be used for, for example, management of a book, etc. by being bound into the book.

The hinged laminated body 10 includes a hinged laminated body 20, an upper layer 50, a lower layer 60, and a hologram layer 70. The hinged laminated body 20 constitutes a part of the hinged laminated body 10 including the upper layer 50, the lower layer 60, the hologram layer 70, etc. When there is a need to distinguish between the hinged laminated body 10 having the upper layer 50 and the lower layer 60 and the hinged laminated body 20 not having the upper layer 50 and the lower layer 60, the hinged laminated body 10 and the hinged laminated body 20 are appropriately referred to as an (upper layer/lower layer-equipped) hinged laminated body (10) and a (non-upper layer/lower layer-equipped) hinged laminated body (20), respectively.

As illustrated in FIG. 2A and FIG. 2B, a hinge section 41a of the hinged laminated body 20 is bound together with other pages 6 and a cover 7 using a thread 5, etc. In this way, the hinged laminated body 10 is bound into the passport 1.

Details of the hinged laminated body 20 are described below.

As illustrated in FIG. 1A and FIG. 1B, the upper layer 50 is laminated on the upper side Z2 of the hinged laminated body 20, and the lower layer 60 is laminated on the lower side Z1 of the hinged laminated body 20.

The hinge section 41a of the hinged laminated body 20 protrudes to the right side X2 from right side surfaces of these layers.

The upper layer 50 includes a base material layer 51, the laser color development layer 52, a transparent protective layer 55, and an upper layer window portion 56. There layers are laminated in this order from the lower side Z1 to the upper side Z2. The base material layer 51, the laser color development layer 52, and the transparent protective layer 55 are formed of a colorless and transparent sheet material having translucency.

The base material layer 51 serves as a base layer of the hinged laminated body 10.

The base material layer 51 includes print layers 51a and 51c.

The print layer 51a is printed on an upper surface of the base material layer 51 by offset printing, etc. Print content of the print layer 51a is a picture, etc., and is, for example, a character, a pattern, a symbol, etc. according to a specification of the passport 1. In the example of FIG. 1A and FIG. 1B, the print content of the print layer 51a is character information 51b of "PASSPORT", "country: AAAA", and "NAME:". The print content is common to all users. That is, this print content does not include individual information of a user (for example, a photograph, a name, etc. of the user).

The print layer 51c is solidly formed on a lower surface of the base material layer 51 by silk printing, etc. It may be preferable to adopt ink which does not transmit light and has a high light concealing property (for example, white and highly concealing ink, etc.) as ink for the print layer 51c.

The print layers 51a and 51c are not provided in a region of the upper layer window portion 56. That is, the print layers 51a and 51c are omitted in the region of the upper layer window portion 56.

The laser color development layer 52 contains a color developer. For this reason, a range of the laser color development layer 52 to which laser light is applied generates heat and develops a black color. In the embodiment, such color development is also referred to as typing or printing.

Print content of the laser color development layer 52 is individual information of the user. In the example of FIG. 1A and FIG. 1B, only a photograph image 52b and information "BBB CCC" of a name 52c of the user are illustrated. However, in practice, information such as a date of birth, a passport number, etc. is printed.

The material of the laser color development layer 52 may not contain the color developer as long as color is developed by irradiation with laser light. In addition, color development may include a color other than black.

FIG. 1A and FIG. 1B illustrate a state in which the hinged laminated body 10 develops color to describe the print content of the laser color development layer 52. However, printing of the laser color development layer 52 may be performed after the hinged laminated body 10 is bound into the passport 1.

The transparent protective layer 55 is a protective layer for protecting the laser color development layer 52.

The upper layer window portion 56 is a rectangular portion in which the print layers 51a and 51c are not provided. For this reason, when viewed in the thickness direction Z, a region in the upper layer window portion 56 is observed to be transparent.

The lower layer 60 includes a base material layer 61, a transparent protective layer 65, and a lower layer window portion 66. These layers are laminated in this order from the upper side Z2 to the lower side Z1.

The base material layer 61 and the transparent protective layer 65 are similar layers to the base material layer 51 and the transparent protective layer 55 of the upper layer 50. That is, a configuration of the base material layer 61 is as follows.

The base material layer 61 is a layer serving as a base material of the hinged laminated body 10 and includes print layers 61a and 61c. The print layer 61a is provided on the lower side Z1 of the base material layer 61, and a picture, etc. corresponding to print content thereof is not illustrated and is common to all users.

The print layer 61c is provided on the upper side Z2 of the base material layer 61 to conceal light. The print layers 61a and 61c are omitted in a region of the lower layer window portion 66.

The transparent protective layer 65 is a protective layer for protecting the base material layer 61 and the print layer 61a thereof.

The lower layer window portion 66 corresponds to a rectangular region in which the print layer 61a and the print layer 61c are not provided, and is observed to be transparent when viewed in the thickness direction Z.

When viewed in the thickness direction Z, an external shape of the upper layer window portion 56 is equal to and aligned with an external shape of the lower layer window portion 66. The invention is not limited to the above described, and the external shape of one of the upper layer window portion 56 and the lower layer window portion 66 may be one size larger than the external shape of the other one.

The hologram layer 70 is laminated between the hinged laminated body 20 and the upper layer 50. When viewed from the upper side Z2, an external shape of the hologram layer 70 is one size larger than the window portions 56 and 66.

The hologram layer 70 is transparent. For example, a hologram image 71 such as a Lippmann hologram, an emboss type hologram, etc. may be recorded in the hologram layer 70. The hologram image 71 is disposed inside the window portions 56 and 66. The hologram image 71 may be translucent.

In the example of FIG. 1B, the hologram layer 70 is disposed on the lower side Z1 of the upper layer window portion 56, and thus overlaps the upper layer window portion 56 in an XY plane when viewed from the upper side Z2. However, the invention is not limited thereto. It may be possible to adopt a mode in which the hologram layer 70 is disposed at a position not overlapping the upper layer window portion 56.

In addition, in the example of FIG. 1B, the hologram layer 70 is disposed on the lower side Z1 of the laser color development layer 52 and the upper side Z2 of the hinged laminated body 20. However, the invention is not limited thereto. It may be possible to adopt a mode in which the hologram layer 70 is disposed on the upper side Z2 of the laser color development layer 52.

According to this arrangement, when laser irradiation is performed to tamper with printing information of the laser color development layer 52, the hologram layer 70 on the upper side Z2 is destroyed. For this reason, it may be possible to increase the effect of preventing falsification.

According to the above configuration, the print content of the laser color development layer 52 in the upper layer 50 is observable through the transparent protective layer 55. The print content of the print layer 51a on the base material layer 51 is observable through the laser color development layer 52 and the transparent protective layer 55. In addition, the print content of the print layer 61a on the base material layer 61 in the lower layer 60 is observable through the transparent protective layer 65.

In addition, since layers other than the print layers 51a, 51c, 61a, and 61c have translucency, an upper surface of the hinged laminated body 20 is visually recognizable in the upper layer window portion 56, when viewed from the upper side Z2. Further, in a part of the window portions 56 and 66 in which the hologram image 71 of the hologram layer 70 is not present, the lower side Z1 of the hinged laminated body 20 (opposite side from an observation side) is observed, that is, the part is observed to be colorless and transparent (see an arrow L1). In addition, in a part of the window portions 56 and 66 in which the hologram image 71 of the hologram layer 70 is present, the hologram image 71 is observable (see an arrow L2).

When observed from the lower side Z1, the lower surface of the hinged laminated body 20 is visually recognizable in the lower layer window portion 66. For this reason, an observation mode in the lower layer window portion 66 is the same as an observation mode in the upper layer window portion 56.

Meanwhile, since the print layers 51c and 61c on the base material layers 51 and 61 have high light concealing property, respectively, the hinged laminated body 20 may not be visually recognized. For this reason, the hinged laminated body 10 may blind a part such as an antenna 35, and an appearance is excellent, accordingly.

[Configuration of Hinged Laminated Body 20 (Single Part)]

The hinged laminated body 20 is laminated substantially at a center of the hinged laminated body 10 in the thickness direction Z.

The hinged laminated body 20 includes an IC module 30, the antenna 35, a hinge layer 41, an intermediate layer 42 (antenna buried layer) as a non-hinge layer, an upper protective layer 45, a lower protective layer 46, an IC module housing hole 47, and an antenna buried groove 48.

The lower protective layer 46, the intermediate layer 42, the hinge layer 41, and the upper protective layer 45 are laminated in this order from the lower side Z1 to the upper side Z2. These layers are joined by thermal welding. For this reason, a sheet material of a resin (for example, PET-G, PVC, PC, etc.) having excellent compatibility with terminal welding is used as these materials. The intermediate layer 42 has a single layer structure or a multi-layer structure of a resin sheet material. The upper protective layer 45 and the lower protective layer 46 each have the similar structure.

External shapes of the intermediate layer 42, the lower protective layer 46, and the upper protective layer 45 are equal to one another. An external shape of the hinge layer 41 is larger than the external shapes of the intermediate layer 42, the lower protective layer 46, and the upper protective layer 45. This dimensionally exceeding part of the hinge layer 41 constitutes the hinge section 41a.

A melting temperature of the hinge layer 41 may be different from a melting temperature of the intermediate layer 42. For example, when a difference between melting temperatures is larger than 50 degrees or more, a resin having a lower melting temperature is more likely to flow into the IC module housing hole 47 (described below) at the time of thermal welding, and a gap between the housing hole 47 and the IC module 30 may be reduced.

For example, a relationship between the hinge layer 41 and the intermediate layer 42, and the upper layer 50 and the lower layer 60 is as follows.

The upper layer 50 is a layer laminated above the hinge layer 41 and the intermediate layer 42. The lower layer 60 is a layer laminated below the hinge layer 41 and the intermediate layer 42.

A part of one of the hinge layer 41 and the intermediate layer 42 which is closer to the upper layer 50 may be visually recognized through the upper layer window portion 56. A part of one of the hinge layer 41 and the intermediate layer 42 which is closer to the lower layer 60 may be visually recognized through the lower layer window portion 66.

The IC module 30 includes a mounted substrate 31 and an IC chip 32.

The mounted substrate 31 is a substrate for mounting the IC chip 32. A lead frame (not illustrated) of the IC chip 32 is connected to the mounted substrate 31.

The IC chip 32 is a semiconductor integrated circuit element and includes a central processing unit (CPU) serving as a controller and a storage device (for example, an EEPROM). Identification information, etc. is stored in the storage device.

The IC chip 32 may be of a type performing contactless communication with an external device such as a reader/writer.

The IC chip 32 is mounted on a lower surface (one surface) of the mounted substrate 31 and is sealed (packaged) with resin, etc.

The antenna 35 may be a winding of a covered conductive wire in a coil shape (spiral shape). The covered conductive wire is configured such that a periphery of the conductive wire is covered with an electrical insulator.

Both ends of the antenna 35 and the lead frame of the IC chip 32 are connected with an electrically conductive paste, etc. In this way, the antenna 35 and the IC chip 32 are electrically connected to each other.

Connection between the IC chip 32 and the antenna 35 is not limited to the above-mentioned mode. For example, the lead frame of the IC chip 32 and the both ends of the antenna 35 may be directly connected to each other.

Communication between the IC module 30 as well as the antenna 35 and an external device is performed through short-range wireless communication based on an electromagnetic induction scheme (for example, a communication scheme according to ISO/IEC14443, ISO/IEC15693, ISO/IEC18092, etc.).

The hinge layer 41 is larger than external shapes of other layers 42, 45, and 46 of the hinged laminated body 20. For this reason, the hinge layer 41 is provided to be laminated on the entire surface of the hinged laminated body 20. "The hinge layer 41 is provided on the entire surface of the hinged laminated body 20." means that the external shape of the hinge layer 41 coincides with the external shape of the hinged laminated body 20. For example, the IC module housing hole 47 and other window portions and openings may be present in the hinge layer 41.

The hinge layer 41 includes a hinge section 41a.

The hinge section 41a is a portion bound into the passport 1 (see FIG. 2B).

The hinge section 41a protrudes from a side surface, which is bound into the passport 1 (a right side surface in FIG. 1A and FIG. 1B), among side surfaces of the hinged laminated body 20. In addition, the hinge layer 41 forms a part of the IC module housing hole 47.

The hinge layer 41 has (i) sufficient flexibility for functioning as a hinge, (ii) sufficient tensile strength for preventing breaking, etc., (iii) sufficient durability for preventing breaking even after repeated bending, etc. For example, the hinge layer 41 may be configured such that a fiber such as PET, polyamide, etc. is disposed in a lattice shape between layers of a plurality of PET-G resin sheets, etc.

The intermediate layer 42 is a layer for adjusting a thickness of the IC chip 32.

The upper protective layer 45 is a sheet material that protects the IC module 30, the hinge layer 41, etc. by being laminated on the upper side Z2 of the hinge layer 41.

Similarly, the lower protective layer 46 is a sheet material that protects the IC module 30, the intermediate layer 42, etc. by being laminated on the lower side Z1 of the intermediate layer 42.

The IC module housing hole 47 is a hole for housing the IC module 30. The IC module housing hole 47 is a through-hole penetrating the hinge layer 41 and the intermediate layer 42. The hinge layer 41 and the intermediate layer 42 hold the IC module 30 by housing the IC module 30 in the IC module housing hole 47. The IC module housing hole 47 may include a bottomed hole.

In a cross-sectional view, a width of the mounted substrate 31 is larger than a width of the IC chip 32. In the cross-sectional view, the housing hole 47 is divided into a first housing hole 47a on the hinge layer 41 side and a second housing hole 47b on the intermediate layer 42 side. The first housing hole 47a houses one of the mounted substrate 31 and the IC chip 32. The second housing hole 47b houses the other one of the mounted substrate 31 and the IC chip 32. In the example of FIG. 1A and FIG. 1B, the mounted substrate 31 is housed in the first housing hole 47a. The IC chip 32 is housed in the second housing hole 47b. It may be preferable that one of the mounted substrate 31 and the IC chip 32 having a thickness close to a thickness of the hinge layer 41 is housed in the first housing hole 47a on the hinge layer 41 side.

The first housing hole 47a or the second housing hole 47b, either of which houses the IC chip 32, has an amount of a width not allowing the mounted substrate 31 to be housed. In the example of FIG. 1A and FIG. 1B, a width of the second housing hole 47b is smaller than a width of the mounted substrate 31, and the mounted substrate 31 may not be housed in the second housing hole 47b.

The antenna buried groove 48 is a groove provided on an upper surface of the intermediate layer 42. As described below, the antenna buried groove 48 is formed by burying the antenna 35 using hot pressing in a state in which the antenna 35 is disposed. For this reason, when viewed from the upper side Z2, the antenna buried groove 48 is located the same as the antenna 35. The hinge layer 41 is laminated immediately above the intermediate layer 42. For this reason, the intermediate layer 42 houses the antenna 35 in the antenna buried groove 48, and the hinge layer 41 covers an opening of the antenna buried groove 48. In this way, the hinge layer 41 and the intermediate layer 42 may hold the antenna 35.

[Layout Sheet for Hinged Laminated Body 10A]

Figure 3B:
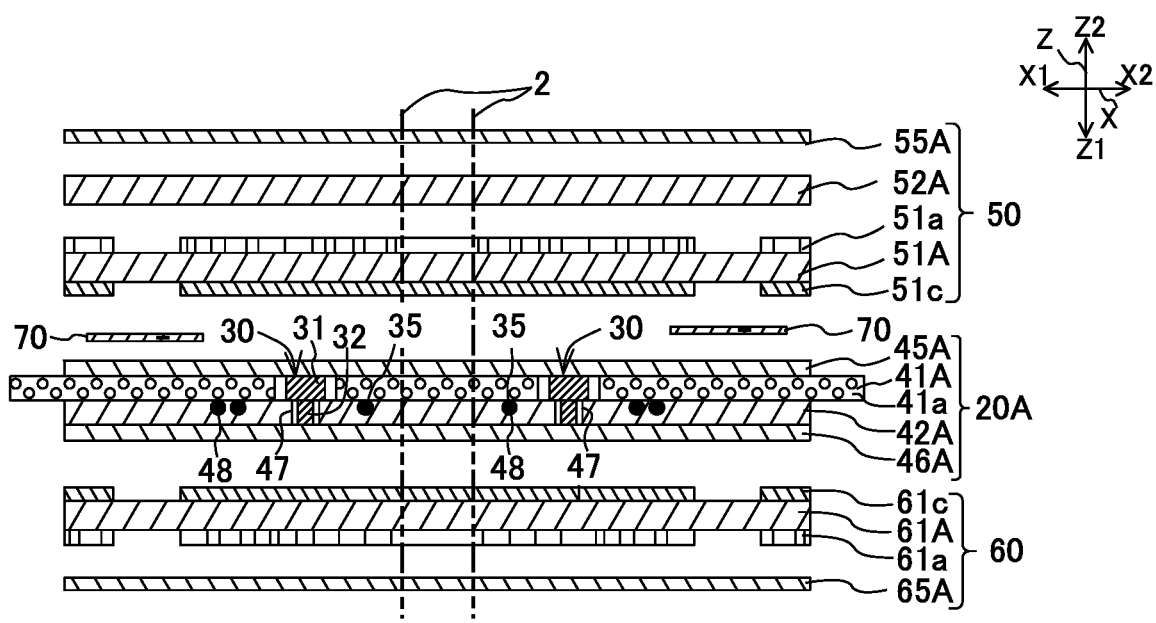
FIG. 3B is a diagram for description of the layout sheet for the hinged laminated body 10A of the 1-1st embodiment.

FIG. 3A and FIG. 3B are diagrams for description of a layout sheet for a hinged laminated body 10A of the 1-1st embodiment.

FIG. 3A is a diagram of the layout sheet for the hinged laminated body 10A viewed from the upper side Z2 in the thickness direction Z (normal direction of the upper surface).

FIG. 3B is a cross-sectional view of the layout sheet for the hinged laminated body 10A (B-B sectional view of FIG. 3A).

In the figures, a cut portion 2 of a cutting process by pressing (that is, the external shape of the hinged laminated body 10) is indicated by a two-dot chain line.

The layout sheet for the hinged laminated body 10A is a sheet material in which a plurality of hinged laminated bodies 10 is arranged.

When viewed from the upper side Z2, a total of four hinged laminated bodies 10 are arranged, two in the longitudinal direction Y and two in the left-right direction X. The number of the hinged laminated bodies 10 in the longitudinal direction Y may be appropriately set according to convenience in manufacturing. In addition, FIG. 3A and FIG. 3B illustrates an example in which a space 3 (blank) is provided between the hinged laminated bodies 10. However, the space 3 may be deleted as appropriate.

Left and right hinge sections 41a protrude from left and right side surfaces of a layout sheet for the hinged laminated body 20A in the state of the layout sheet for the hinged laminated body 10A.

A laminated configuration of the layout sheet for the hinged laminated body 10A corresponds to a laminated configuration of the hinged laminated body 10.

That is, in the layout sheet for the hinged laminated body 10A, a transparent protective layer sheet material 65A, a base material layer sheet material 61A, the layout sheet for the hinged laminated body 20A, the hologram layer 70, a base material layer sheet material 51A, a laser color development layer sheet material 52A, and a transparent protective layer sheet material 55A are laminated in this order from the lower side Z1 to the upper side Z2.

The base material layer sheet material 51A, the laser color development layer sheet material 52A, and the transparent protective layer sheet material 55A correspond to a sheet material (upper layer layout sheet) in which four members forming the upper layer 50 are arranged in an XY plane direction.

That is, the base material layer sheet material 51A is a sheet material in which four base material layers 51 are arranged in the XY plane direction. In addition, the laser color development layer sheet material 52A and the transparent protective layer sheet material 55A are sheet materials in which four laser color development layers 52 and four transparent protective layers 55 are arranged in the XY plane direction, respectively. Arrangement of four members of each of the sheet materials corresponds to arrangement of four hinged laminated bodies 20 of the layout sheet for the hinged laminated body 20A (see FIG. 4A and FIG. 4B).

Similarly, the base material layer sheet material 61A and the transparent protective layer sheet material 65A correspond to a sheet material (lower layer layout sheet) in which four members forming the lower layer 60 are arranged in the XY plane direction at positions corresponding to the hinged laminated bodies 20 of the layout sheet for the hinged laminated body 20A.

[Layout Sheet for Hinged Laminated Body 20A]

Figure 4B:
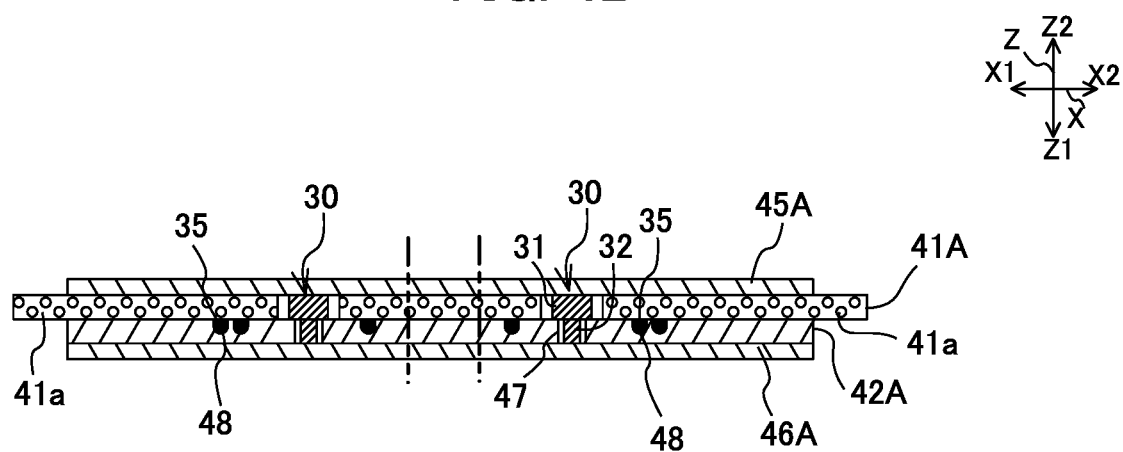
FIG. 4B is a diagram for description of the configuration of the layout sheet for the hinged laminated body 20A of the 1-1st embodiment.

FIG. 4A and FIG. 4B are diagrams for description of a configuration of the layout sheet for the hinged laminated body 20A of the 1-1st embodiment.

FIG. 4A is a diagram of the layout sheet for the hinged laminated body 20A viewed from the upper side Z2 in the thickness direction Z (normal direction of the upper surface).

FIG. 4B is a cross-sectional view of the layout sheet for the hinged laminated body 20A (B-B sectional view of FIG. 4A).

The layout sheet for the hinged laminated body 20A is a sheet material in which a plurality of hinged laminated bodies 20 is arranged.

Arrangement of the hinged laminated bodies 20 of the layout sheet for the hinged laminated body 20A is similar to the layout sheet for the hinged laminated body 10A.

That is, when viewed from the upper side Z2, a total of four hinged laminated bodies 20 are arranged, two in the longitudinal direction Y and two in the left-right direction X. In a hinged laminated body 20 on the left side X1, a hinge section 41a is disposed on the left side X1. Meanwhile, in a hinged laminated body 20 on the right side X2, a hinge section 41a is disposed on the right side X2. Two hinged laminated bodies 20 on the left side X1 and two hinged laminated bodies 20 on the right side X2 are disposed point-symmetrically with respect to the layout sheet for the hinged laminated body 20A. The number of hinged laminated bodies 20 in the longitudinal direction Y and the space 3 may be modified similarly to the layout sheet for the hinged laminated body 10A.

When there is a need to distinguish between the layout sheet for the hinged laminated body 10A having the upper layer 50 and the lower layer 60 and the layout sheet for the hinged laminated body 20A not having the upper layer 50 and the lower layer 60, the layout sheet for the hinged laminated body 10A and the layout sheet for the hinged laminated body 20A are appropriately referred to as an (upper layer/lower layer-equipped) layout sheet for the hinged laminated body (10A) and a (non-upper layer/lower layer-equipped) layout sheet for the hinged laminated body (20A), respectively.

A laminated configuration of the layout sheet for the hinged laminated body 20A corresponds to a laminated configuration of the hinged laminated body 20.

That is, in the layout sheet for the hinged laminated body 20A, a lower protective layer sheet material 46A, an intermediate layer sheet material 42A, a hinge layer sheet material 41A, and an upper protective layer sheet material 45A are laminated in this order from the lower side Z1 to the upper side Z2.

The hinge layer sheet material 41A is a sheet material in which four hinge layers 41 are arranged in the XY plane direction. Similarly, the intermediate layer sheet material 42A, the upper protective layer sheet material 45A, and the lower protective layer sheet material 46A are sheet materials in which members of four intermediate layers 42, four upper protective layers 45, and four lower protective layers 46 are arranged, respectively. Arrangement of the four members of each of the sheet materials corresponds to arrangement of four hinged laminated bodies 20 of the layout sheet for the hinged laminated body 20A.

Left and right hinge sections 41a protrude from left and right side surfaces of the layout sheet for the hinged laminated body 20A in the state of the layout sheet for the hinged laminated body 20A.

[Manufacturing Method]

Figure 5A:
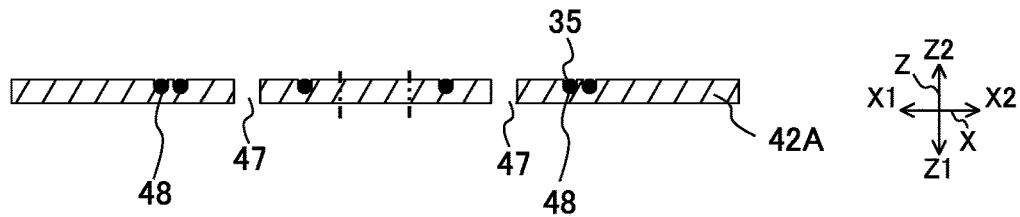
FIG. 5A is a cross-sectional view for description of a method of manufacturing the layout sheet for the hinged laminated body 20A of the 1-1st embodiment.
Figure 5B:
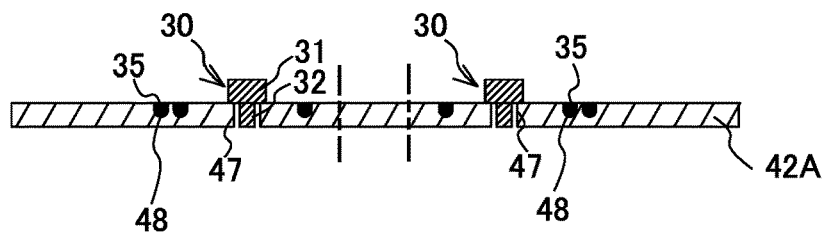
FIG. 5B is a cross-sectional view for description of the method of manufacturing the layout sheet for the hinged laminated body 20A of the 1-1st embodiment.
Figure 5C:
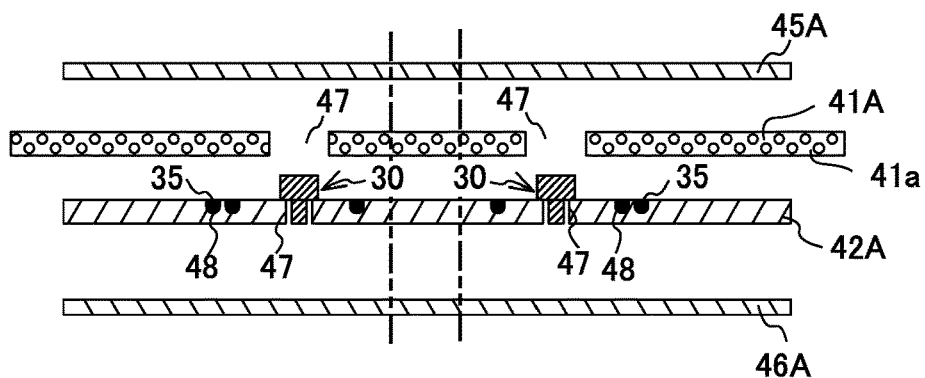
FIG. 5C is a cross-sectional view for description of the method of manufacturing the layout sheet for the hinged laminated body 20A of the 1-1st embodiment.
Figure 5D:
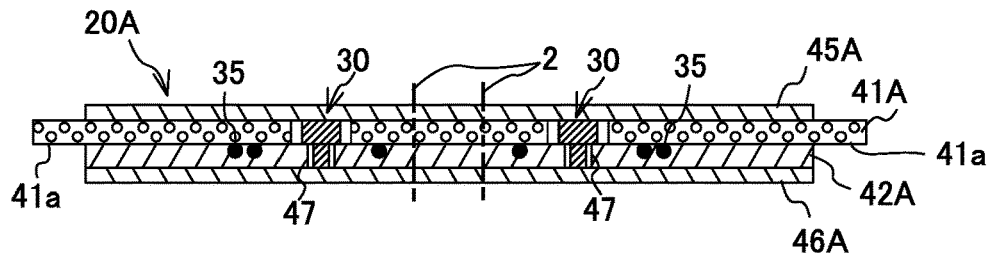
FIG. 5D is a cross-sectional view for description of the method of manufacturing the layout sheet for the hinged laminated body 20A of the 1-1st embodiment.

FIG. 5A and FIG. 5D are cross-sectional views for description of a method of manufacturing the layout sheet for the hinged laminated body 20A of the 1-1st embodiment.

(Method of Manufacturing Layout Sheet for Hinged Laminated Body 20A)

When the layout sheet for the hinged laminated body 20A is manufactured, the hinge layer sheet material 41A, the intermediate layer sheet material 42A, the upper protective layer sheet material 45A, and the lower protective layer sheet material 46A are manufactured in advance in a previous process thereof. A hole is provided by punching in each of the hinge layer sheet material 41A (see FIG. 5A) and the intermediate layer sheet material 42A (see FIG. 5C). The hole forms the IC module housing hole 47.

The layout sheet for the hinged laminated body 20A may be manufactured according to the following processes.

(1) Formation Process of Antenna 35

As illustrated in FIG. 5A, the antenna 35 is buried in the intermediate layer sheet material 42A by hot pressing in a state in which the antenna 35 is disposed in a coil shape on an upper surface of the intermediate layer sheet material 42A. Four antennas 35 may be buried at the same time. Alternatively, the antenna 35 may be buried in the hinge layer sheet material 41A.

In this case, hot pressing may also be performed in a state in which the four antennas 35 are disposed in the hinge layer sheet material 41A.

(2) Connection Process of IC Module 30 and Antenna 35

As illustrated in FIG. 5B, the IC module 30 is housed in the IC module housing hole 47 of the intermediate layer sheet material 42A. In addition, the mounted substrate 31 and the both ends of the antenna 35 are connected electrically and mechanically with each other by an electrically conductive paste, etc.

(3) Lamination Process

As illustrated in FIG. 5C, the hinge layer sheet material 41A, the intermediate layer sheet material 42A, the upper protective layer sheet material 45A, and the lower protective layer sheet material 46A are laminated.

Here, when the hinge layer sheet material 41A and the intermediate layer sheet material 42A are laminated, centers of IC module housing holes 47 of the two sheet materials are positioned to align with each other. In this way, four hinge sections 41a of the hinge layer sheet material 41A protrude the same length from both ends of the intermediate layer sheet material 42A.

In this way, the lamination process of the hinge layer sheet material 41A has excellent workability.

(4) Hot Pressing Process

As illustrated in FIG. 5C and FIG. 5D, hot pressing is performed in a state in which the respective sheet materials are laminated. In this way, the respective layers are thermally welded at interfaces thereof.

Accordingly, it is possible to manufacture the layout sheet for the hinged laminated body 20A.

(Method of Manufacturing Layout Sheet for Hinged Laminated Body 10A and Hinged Laminated Body 10)

When the layout sheet for the hinged laminated body 10A is manufactured, the layout sheet for the hinged laminated body 20A, the base material layer sheet materials 51A and 61A, the laser color development layer sheet material 52A, the transparent protective layer sheet materials 55A and 65A, and the hologram layer 70 are manufactured in advance in a previous process thereof.

The layout sheet for the hinged laminated body 10A may be manufactured according to the following processes.

(1) Lamination Process of Upper Layer 50 (Upper Layer Lamination Process)

The hologram layer 70, the base material layer sheet material 51A, the laser color development layer sheet material 52A, and the transparent protective layer sheet material 55A are laminated on the upper side Z2 of the layout sheet for the hinged laminated body 20A (see FIG. 3B).

(2) Lamination Process of Lower Layer 60 (Lower Layer Lamination Process)

The base material layer sheet material 61A and the transparent protective layer sheet material 65A are laminated on the lower side Z1 of the layout sheet for the hinged laminated body 20A (see FIG. 3B).

(3) Hot Pressing Process

Hot pressing is performed in a state in which the respective members are laminated in the above processes (1) and (2). In this way, the respective layers are thermally welded at interfaces thereof.

Through the processes so far, it is possible to manufacture the layout sheet for the hinged laminated body 10A in which the hinged laminated bodies 10 are arranged.

(4) Individual Piece Separation Process

Separation into individual pieces is performed by cutting through pressing the layout sheet for the hinged laminated body 10A thermally welded in the above process (3) into external shapes of the respective hinged laminated bodies 10. In this way, the four hinged laminated bodies 10 may be manufactured.

In this case, a shape of the cut portion 2 of each hinged laminated body 10 is a U-shape in which the hinge section 41a side is open (see FIG. 3A). In this way, the hinge section 41a remains in each hinged laminated body 10.

In this way, it is possible to manufacture the hinged laminated body 10 in which the hinge section 41a protrudes from a part of a side surface by cutting the layout sheet for the hinged laminated body 10A (that is, the layout sheet for the hinged laminated body 20A) such that four hinge sections 41a remain. For this reason, it is possible to simultaneously manufacture a plurality of hinged laminated bodies 10 similarly with conventional card manufacture. In this way, the hinged laminated body 10 may be manufactured easily and at low cost.

The hinged laminated body 10 after individual piece separation is processed into the passport 1 by binding the hinge section 41a (see FIG. 2A and FIG. 2B). In addition, after (or before) being processed into the passport 1, the hinged laminated body 10 after individual piece separation is irradiated with laser light, so that individual information of the user is printed (the photograph image 52b, the name 52c, etc.) (see FIG. 1A).

Binding may be performed in a mode in which a plurality of passports is arranged (so-called multiple layout), in a state in which the layout sheet for the hinged laminated body 10A is not cut or in a state in which the layout sheet for the hinged laminated body 10A is cut in a form of a layout sheet for a hinged laminated body in which a plurality of (for example, two) hinged laminated bodies 10 is connected to each other. In this case, the layout sheet for the hinged laminated body 10A is separated into individual pieces corresponding to the hinged laminated bodies 10 by separating the passport into individual pieces after binding.

In this case, separation into individual pieces corresponding to the hinged laminated bodies 10 may be performed after binding, and thus a binding process may be performed according to a specification of a binding machine, convenience in manufacturing, etc.

As described above, the hinge layer 41 of the present embodiment not only functions as the hinge section 41a, but also forms a layer for holding electrical components such as the IC module 30, the antenna 35, etc. In addition, the hinged laminated body 20 of the present embodiment includes the intermediate layer 42 which is laminated on the hinge layer 41 and serves as a non-hinge layer not having a hinge section. The hinge layer 41 is provided on the entire surface of the hinged laminated body 20. The hinge layer 41 and the intermediate layer 42 have the housing hole 47 penetrating both layers. The IC module 30 is housed and held in the housing hole 47. For this reason, the thickness of the hinged laminated body 20 is smaller when compared to a mode in which a layer for holding the electrical component is separately provided. In this way, it is possible to reduce the thicknesses of the hinged laminated body 20 and the hinged laminated body 10. Since the IC module 30 is housed in the housing hole 47, it is possible to inhibit a portion in which the IC module 30 is provided from bulging in the thickness direction. Nonetheless, the hinge section 41a may be made thin, and flexibility of the hinge section 41a may be reduced.

(1-2nd Embodiment)

Next, a description will be given of a 1-2nd embodiment of the invention.

In the following description and drawings, a portion having the same function as that of the above-described 1-1st embodiment will be appropriately denoted by the same reference numeral or the same suffix (last two digits), and a repeated description will be appropriately omitted. In addition, in the following description and drawings, a configuration of a hinged laminated body will be mainly described, and a configuration of a layout sheet for the hinged laminated body in which a plurality of hinged laminated bodies is arranged will not be described. The hinged laminated body may be manufactured by separating the layout sheet for the hinged laminated body having a laminated configuration corresponding to laminated configurations of these hinged laminated bodies into individual pieces.

Figure 6:
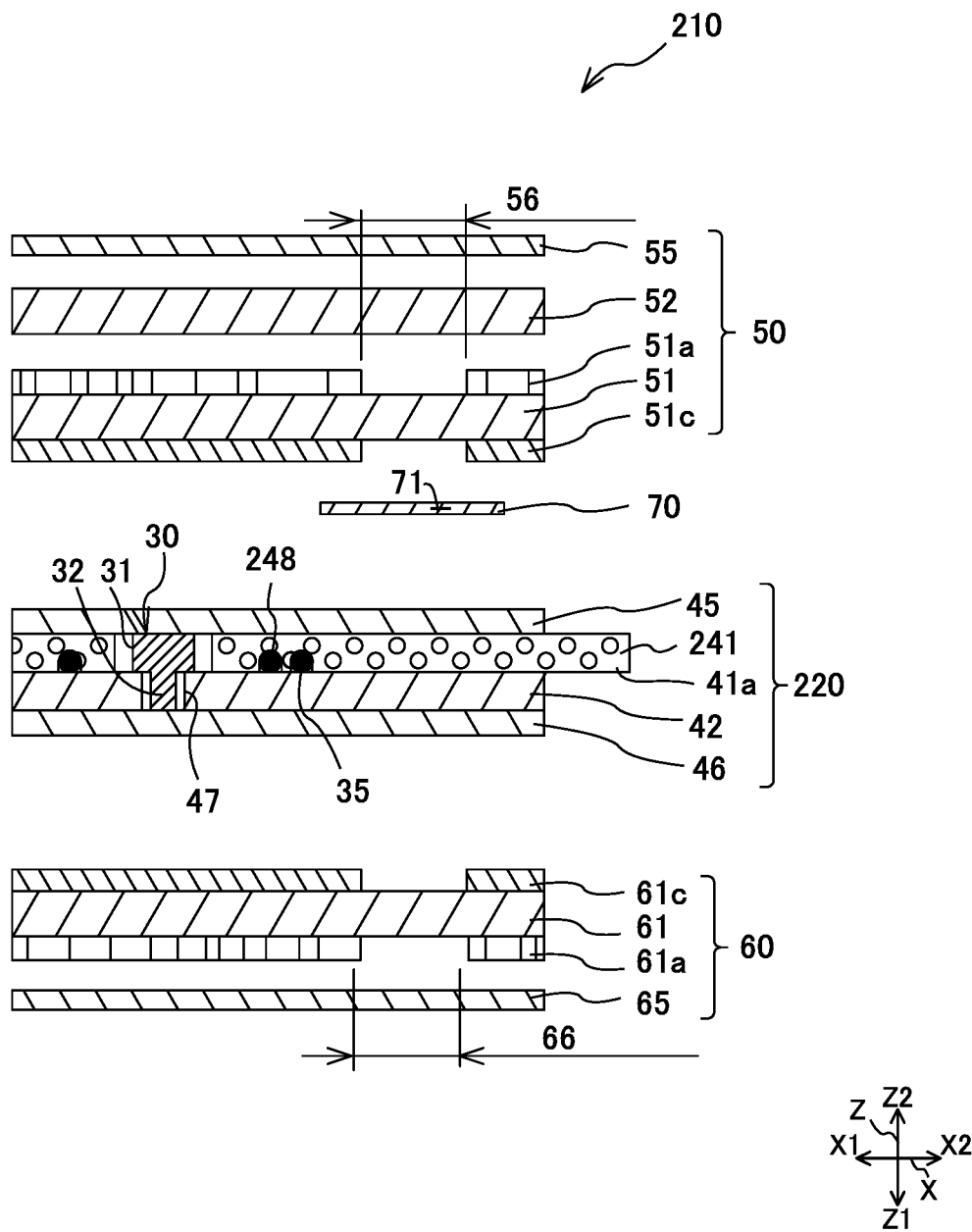
FIG. 6 is a cross-sectional view of a hinged laminated body 210 of a 1-2nd embodiment.

FIG. 6 is a cross-sectional view of a hinged laminated body 210 of the 1-2nd embodiment.

As illustrated in FIG. 6, an antenna 35 of a hinged laminated body 220 of the present embodiment is buried in a hinge layer 241.

The hinge layer 241 includes an antenna buried groove 248 in which the antenna 35 is buried.

The antenna buried groove 248 is provided on a lower surface of the hinge layer 241. An intermediate layer 42 is provided immediately below the hinge layer 241.

For this reason, the hinge layer 241 houses the antenna 35 in the antenna buried groove 248, and the intermediate layer 42 covers an opening of the antenna buried groove 248. In this way, the hinge layer 241 and the intermediate layer 42 hold the antenna 35.

The antenna buried groove 248 of the hinge layer 241 may be formed similarly to a method of forming an antenna housing groove on the intermediate layer in the 1-1st embodiment (see FIG. 5A to FIG. 5D). That is, hot pressing may be performed in a state in which the antenna 35 is disposed on a lower surface of a hinge layer sheet material.

As described above, in the hinge layer 241 of the present embodiment, similarly to the 1-1st embodiment, a layer for holding an electrical component such as the antenna 35 is formed, and thus thicknesses of the hinged laminated body 220 and the hinged laminated body 210 may be reduced.

(1-3rd Embodiment)

Next, a description will be given of a 1-3rd embodiment of the invention. The 1-3rd embodiment is a reference form of the invention.

Figure 7:
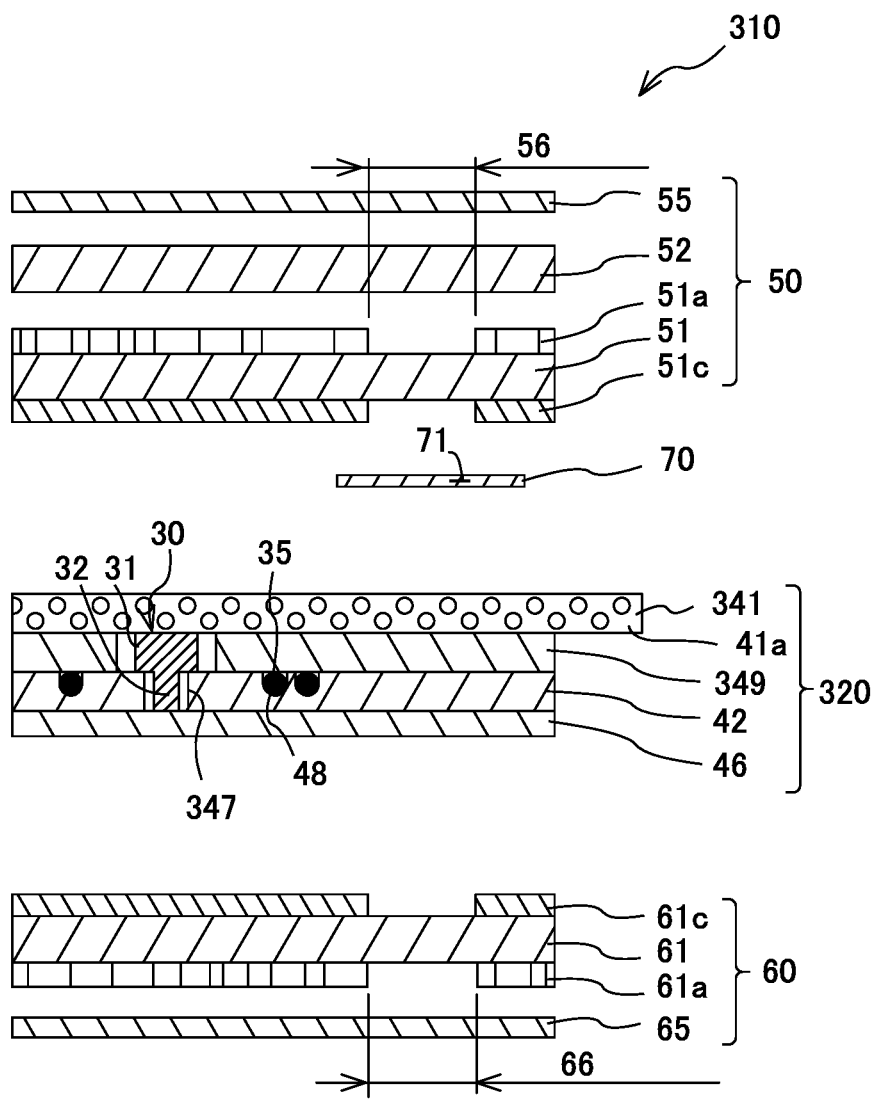
FIG. 7 is a cross-sectional view of a hinged laminated body 310 of a 1-3rd embodiment.

FIG. 7 is a cross-sectional view of a hinged laminated body 310 of the 1-3rd embodiment.

As illustrated in FIG. 7, in a hinged laminated body 320 of the present embodiment, a lower protective layer 46, an intermediate layer 42, an intermediate layer 349, and a hinge layer 341 are laminated in this order from a lower side Z1 to an upper side Z2.

For this reason, the hinge layer 341 is laminated instead of an upper protective layer as an uppermost layer of the hinged laminated body 320.

The intermediate layer 349 may be formed of the same resin sheet material as that of the intermediate layer 42. Similarly to the hinge layer of the 1-1st embodiment, the intermediate layer 349 holds the antenna 35 by covering an antenna buried groove 48 of the intermediate layer 42. In addition, the intermediate layer 349 and the intermediate layer 42 form an IC module housing hole 347 for housing an IC module 30.

The hinge layer 341 is laminated immediately above the intermediate layer 349, and thus covers an opening of the IC module housing hole 347. In this way, the hinge layer 341, the intermediate layer 42, and the intermediate layer 349 may hold the IC module 30.

As described above, the hinge layer 341 of the present embodiment forms a layer for holding the IC module 30, and thus the hinged laminated body 320 does not require an upper protective layer. In this way, it is possible to reduce thicknesses of the hinged laminated body 320 and the hinged laminated body 310.

(1-4th Embodiment)

Next, a description will be given of a 1-4th embodiment of the invention. The 1-4th embodiment is a reference form of the invention.

FIG. 8 is a cross-sectional view of a hinged laminated body 410 of the 1-4th embodiment.

As illustrated in FIG. 8, in a hinged laminated body 420 of the present embodiment, a hinge layer 441, an intermediate layer 42, an intermediate layer 449, and an upper protective layer 45 are laminated in this order from a lower side Z1 to an upper side Z2.

For this reason, the hinge layer 441 is laminated instead of a lower protective layer as a lowermost layer of the hinged laminated body 420. That is, while the hinge layer of the 1-3rd embodiment is laminated as the uppermost layer of the hinged laminated body, the hinge layer 441 of the present embodiment is laminated as the lowermost layer of the hinged laminated body 420.

Similarly to the 1-3rd embodiment, the intermediate layer 449 and the intermediate layer 42 form an IC module housing hole 447 for housing an IC module 30.

The hinge layer 441 is laminated immediately below the intermediate layer 42, and thus covers an opening on the lower side Z1 of the IC module housing hole 447. In this way, the hinge layer 441, the intermediate layer 42, and the intermediate layer 449 may hold the IC module 30.

As described above, the hinged laminated body 420 of the present embodiment does not require the lower protective layer, and thus it is possible to reduce thicknesses of the hinged laminated body 410 and the hinged laminated body 420 similarly to the 1-3rd embodiment.

(1-5th Embodiment)

Next, a description will be given of a 1-5th embodiment of the invention.

Figure 9:
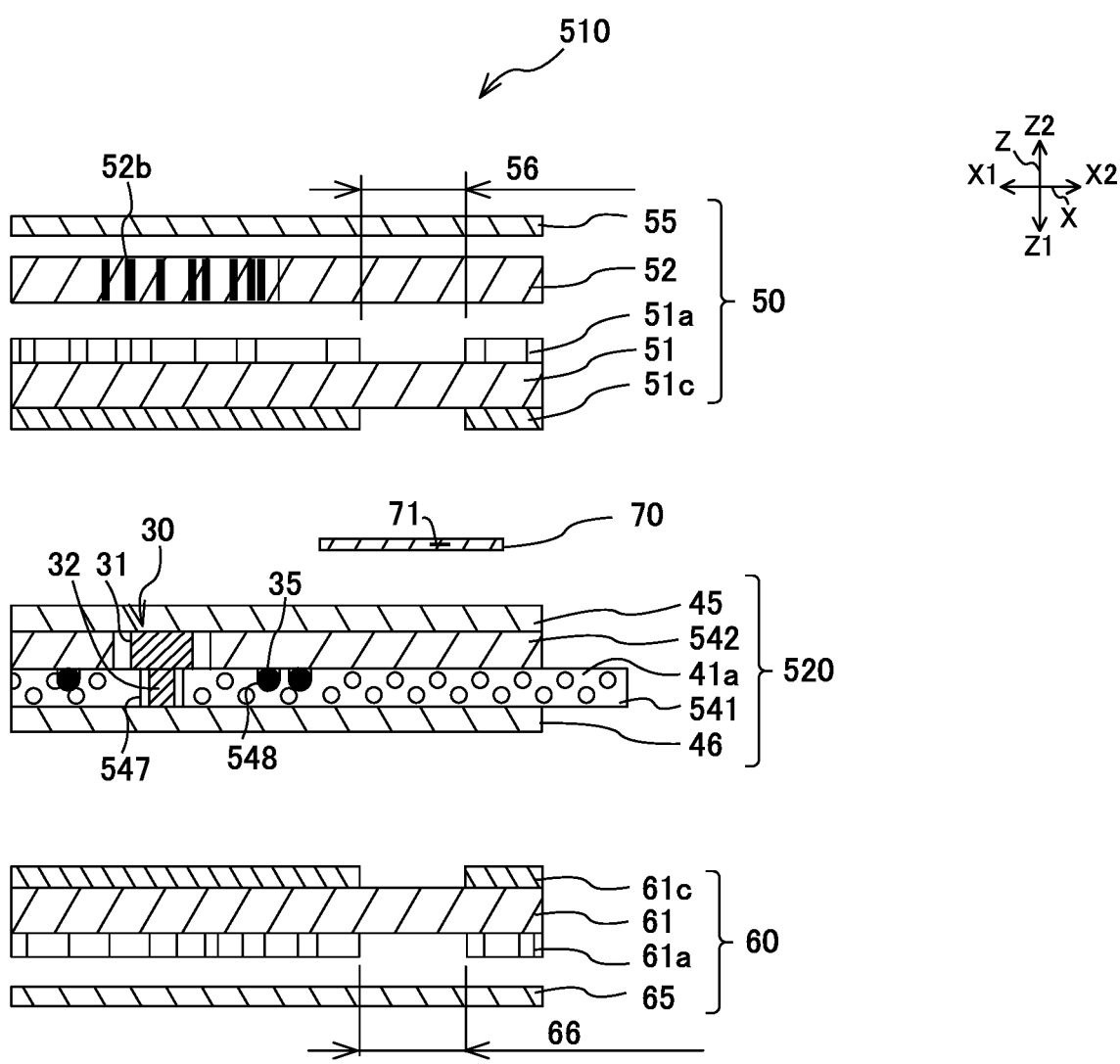
FIG. 9 is a cross-sectional view of a hinged laminated body 510 of a 1-5th embodiment.

FIG. 9 is a cross-sectional view of a hinged laminated body 510 of the 1-5th embodiment.

As illustrated in FIG. 9, in a hinged laminated body 520 of the present embodiment, a lower protective layer 46, a hinge layer 541, an intermediate layer 542, and an upper protective layer 45 are laminated in this order from a lower side Z1 to an upper side Z2. For this reason, an IC module hole 547 penetrates the intermediate layer 542 and the hinge layer 541 in this order from the upper side Z2.

In addition, an antenna buried hole 548 is provided on an upper surface of the hinge layer 541. Similarly to the 1-2nd embodiment, the antenna buried hole 548 may be hot-pressed in a state in which the antenna 35 is disposed on an upper surface of a hinge layer sheet material.

In this way, a laminated configuration of the hinged laminated body 520 may be modified according to a specification, etc.

(1-6th Embodiment)

Next, a description will be given of a 1-6th embodiment of the invention.

FIG. 10 is a cross-sectional view of a hinged laminated body 610 of the 1-6th embodiment.

As illustrated in FIG. 10, in a hinged laminated body 620 of the present embodiment, a lower protective layer 46, a hinge layer 641, an intermediate layer 642, and an upper protective layer 45 are laminated in this order from a lower side Z1 to an upper side Z2. For this reason, an IC module hole 647 penetrates the intermediate layer 642 and the hinge layer 641 in this order from the upper side Z2.

In addition, an antenna buried hole 648 is provided across both an upper surface of the hinge layer 641 and a lower surface of the intermediate layer 642. When hot-press is performed in a state in which the antenna 35 is disposed on an upper surface of a hinge layer sheet material or a lower surface of an intermediate layer sheet material, the sheet material on the opposite side is recessed by the antenna 35, thereby forming the antenna buried hole 648.

In this way, a laminated configuration of the hinged laminated body 620 may be modified according to a specification, etc.

The embodiments of the invention have been described above. However, the invention is not limited to the above-described embodiments. For example, various modifications and changes can be made as in modifications, etc. described below, which are within a technical scope of the invention. In addition, effects described in the embodiments merely list most suitable effects produced by the invention, and effects of the invention are not limited to those described in the embodiments. The above-described embodiments and the modifications described below may be appropriately combined and used. However, a detailed description thereof will be omitted.

(Modifications)

(1) In the embodiments, an example in which the (upper layer/lower layer-equipped) layout sheet for the hinged laminated body is cut to separate the (upper layer/lower layer-equipped) hinged laminated bodies into individual pieces has been shown. However, the invention is not limited thereto. The (non-upper layer/lower layer-equipped) hinged laminated bodies may be separated into individual pieces by cutting a single part of the (non-upper layer/lower layer-equipped) layout sheet for the hinged laminated body into external shapes of the (non-upper layer/lower layer-equipped) hinged laminated bodies (individual piece separation process).

In this mode, for example, it is possible to manufacture the (upper layer/lower layer-equipped) hinged laminated body by laminating another layer (for example, an upper layer 50 and a lower layer 60) on the (non-upper layer/lower layer-equipped) hinged laminated body corresponding to an individual piece. In addition, the (non-upper layer/lower layer-equipped) hinged laminated body may be used for management of a booklet, etc. by binding the (non-upper layer/lower layer-equipped) hinged laminated body corresponding to an individual piece into the booklet without change.

In addition, when the (non-upper layer/lower layer-equipped) hinged laminated body is bound into the booklet without being changed to the (upper layer/lower layer-equipped) hinged laminated body as described above, similarly to the description of the individual piece separation process of the 1-1st embodiment, binding may be performed in a state in which the (non-upper layer/lower layer-equipped) layout sheet for the hinged laminated body is not cut or in a state in which the (non-upper layer/lower layer-equipped) layout sheet for the hinged laminated body is punched to form a (non-upper layer/lower layer-equipped) layout sheet for a hinged laminated body in which a plurality of (for example, two) (non-upper layer/lower layer-equipped) hinged laminated bodies is connected to each other, thereby performing binding and individual piece separation.

(2) In the embodiments, an example in which the base material layer and the (non-upper layer/lower layer-equipped) hinged laminated body have translucency, and the opposite side is observable through the base material layer at the window portion has been shown. However, the invention is not limited thereto. The base material layer and the (non-upper layer/lower layer-equipped) hinged laminated body may not have translucency.

For example, the base material layer may alternatively correspond to a sheet material of white, etc. having a light concealing property. In this case, the hologram image is observable at this window portion when the window portion is provided only in the upper layer. In this mode, a solid print layer of white, etc. for concealing light is unnecessary in the base material layer.

(3) In the embodiments, an example in which the hinged laminated bodies are arranged in both the left-right direction and the longitudinal direction in the layout sheet for the hinged laminated body has been shown. However, the invention is not limited thereto. It may be alternatively possible to adopt a mode in which the hinged laminated bodies are arranged in one of the left-right direction and the longitudinal direction in the layout sheet for the hinged laminated body.

(4) The laminated configuration of the hinged laminated body of the embodiments may be appropriately modified. For example, the configuration of FIG. 1A and FIG. 1B may be modified as below.

The print layer 51a may not be provided on the base material layer 51, and a transparent layer printed with the same content as that of the print layer 51a may be laminated on the lower side of the transparent protective layer 55 (that is, between the laser color development layer 52 and the transparent protective layer 55). In this case, a security film such as a hologram layer may be laminated between the laser color development layer 52 and the printed transparent layer.

The description of the above embodiments may be appropriately cited in description of embodiments below. In particular, in many cases, a constituent element denoted by the same reference numeral except for thousands digit substantially corresponds to the same constituent element.

(2-1st Embodiment)
[Configuration of Hinged Laminated Body 1010 (Single Part)]

Figure 11A:
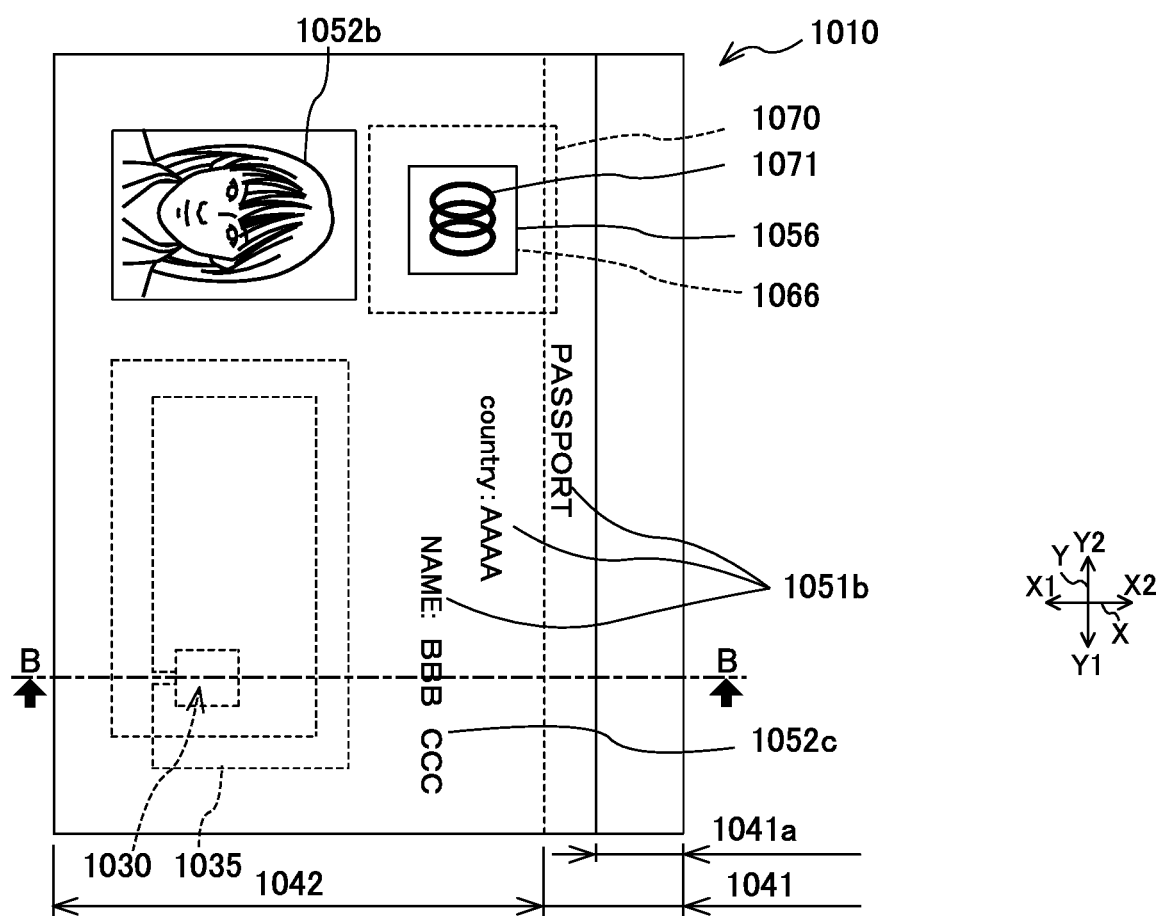
FIG. 11A is a diagram for description of a configuration of a single part of a hinged laminated body 1010 of a 2-1st embodiment.
Figure 11B:
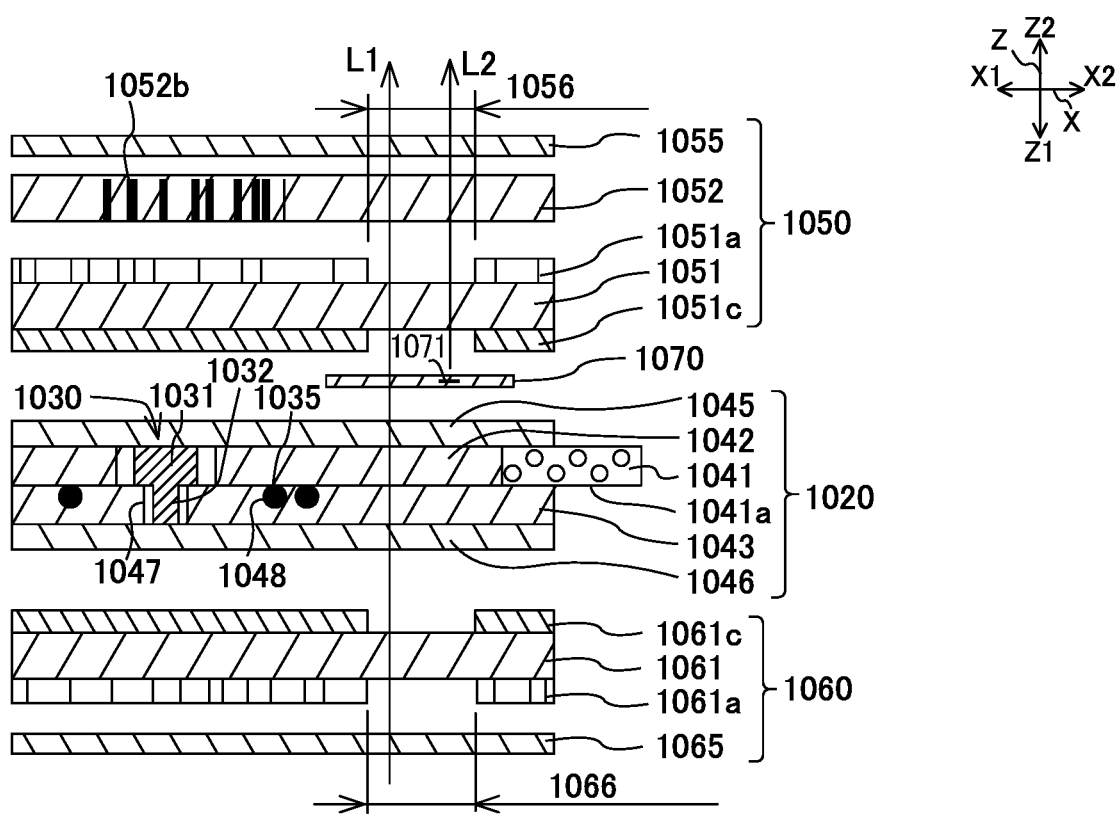
FIG. 11B is a diagram for description of the configuration of the single part of the hinged laminated body 1010 of the 2-1st embodiment.

FIG. 11A and FIG. 11B are diagrams for description of a configuration of a single part of a hinged laminated body 1010 of a 2-1st embodiment.

FIG. 11A is a diagram of the hinged laminated body 1010 viewed from an upper side Z2 in a thickness direction Z (that is, a normal direction of upper surfaces of the hinged laminated body 1010 and a hinged laminated body 1020).

FIG. 11B is a cross-sectional view of the hinged laminated body 1010 (B-B sectional view of FIG. 11A).

FIG. 11B illustrates a state in which some of layers are separated from each other. However, in practice, all layers are joined by thermal welding. In addition, FIG. 11B illustrates a shape of a cut surface passing through an IC module 1030. Window portions 1056 and 1066, a photograph image 1052b of a laser color development layer 1052, etc. are not located on B-B line, but are illustrated in FIG. 11B for convenience. This description is applied to sectional views of subsequent drawings.

Figure 12A:
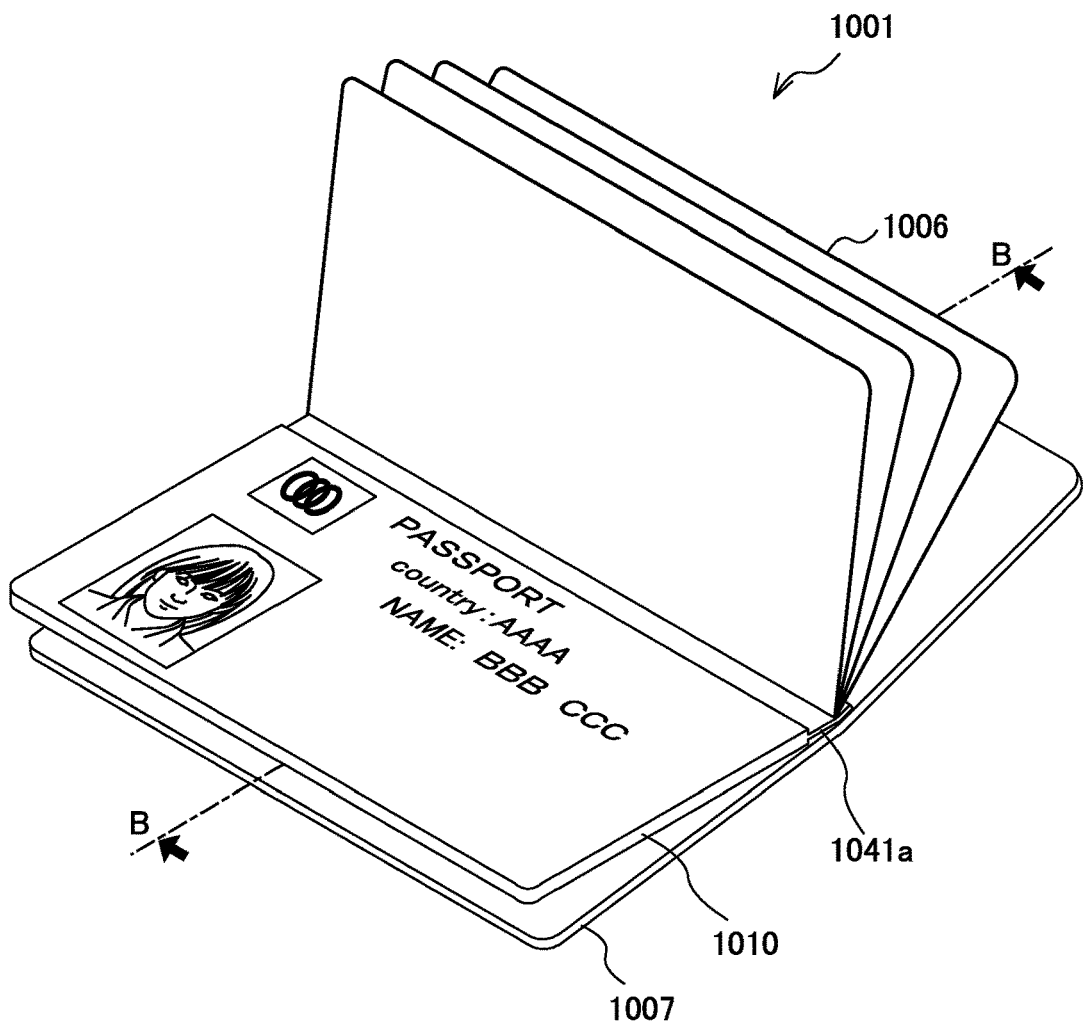
FIG. 12A is a diagram for description of a passport 1001 of the 2-1st embodiment.
Figure 12B:
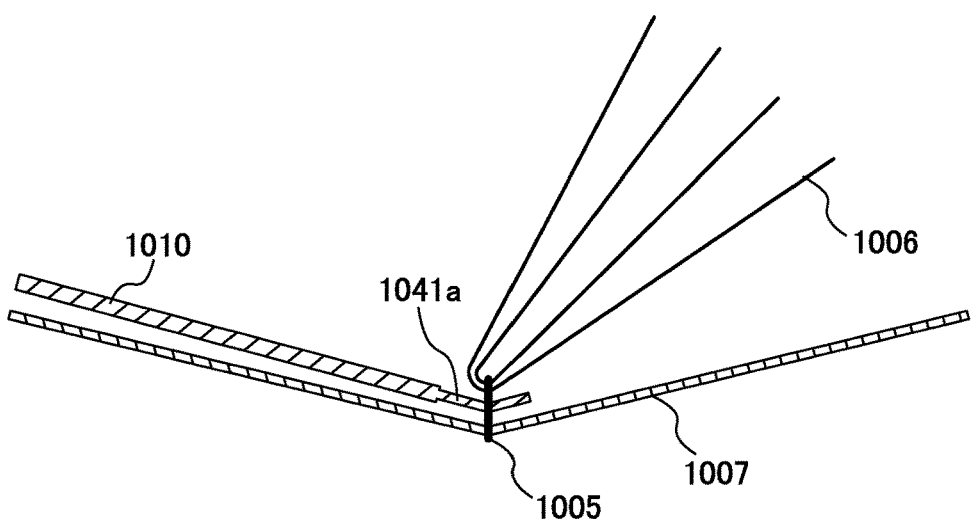
FIG. 12B is a diagram for description of the passport 1001 of the 2-1st embodiment.

FIG. 12A and FIG. 12B are diagrams for description of a passport 1001.

FIG. 12A is a perspective view of a state in which a page formed by the hinged laminated body 1010 is open.

FIG. 12B is a cross-sectional view of the state in which the page formed by the hinged laminated body 1010 is open (B-B sectional view of FIG. 12A).

In embodiments and drawings, an XYZ orthogonal coordinate system is provided to facilitate understanding of description. This coordinate system represents a left-right direction X (left side X1, right side X2), a longitudinal direction Y (lower side Y1, upper side Y2), and a thickness direction Z (lower side Z1, upper side Z2) with reference to the state of FIG. 11A.

The hinged laminated body 1010 is bound into the passport 1001 corresponding to a booklet (see FIG. 12A and FIG. 12B). That is, the hinged laminated body 1010 is used for an identification data page of the passport 1001 (also referred to as an IC passport, etc.) incorporating an IC chip 1032.

Use of the hinged laminated body 1010 is not limited to the passport 1001, and the hinged laminated body 1010 may be used for, for example, management of a book, etc. by being bound into the book.

The (upper layer/lower layer-equipped) hinged laminated body 1010 includes the (non-upper layer/lower layer-equipped) hinged laminated body 1020, an upper layer 1050, a lower layer 1060, and a hologram layer 1070.

As illustrated in FIG. 12B, a hinge section 1041a of the hinged laminated body 1020 is bound together with other pages 1006 and a cover 1007 using a thread 1005, etc. In this way, the hinged laminated body 1010 is bound into the passport 1001.

The hinge section 1041a of the hinged laminated body 1020 protrudes to the right side X2 from right side surfaces of the upper layer 1050 and the lower layer 1060. Details of the hinged laminated body 1020 will be described below.

As illustrated in FIG. 11A and FIG. 11B, the upper layer 1050 is laminated on the upper side Z2 of the hinged laminated body 1020, and the lower layer 1060 is laminated on the lower side Z1 of the hinged laminated body 1020.

The upper layer 1050 includes a base material layer 1051, a laser color development layer 1052, a transparent protective layer 1055, and an upper layer window portion 1056. These layers are laminated in this order from the lower side Z1 to the upper side Z2. The base material layer 1051, the laser color development layer 1052, and the transparent protective layer 1055 are formed of a colorless and transparent sheet material having translucency.

The base material layer 1051 is a layer corresponding to a base material of the hinged laminated body 1010.

The base material layer 1051 includes print layers 1051a and 1051c.

The print layer 1051a is printed on an upper surface of the base material layer 1051 by offset printing, etc. Print content of the print layer 1051a is a picture, etc., and is, for example, a character, a pattern, a symbol, etc. according to a specification of the passport 1001. In the example of FIG. 11A and FIG. 11B, the print content of the print layer 1051a is character information 1051b of "PASSPORT", "country: AAAA", and "NAME:". The print content is common to all users. That is, this print content does not include individual information of a user (for example, a photograph, a name, etc. of the user).

The print layer 1051c is solidly formed on a lower surface of the base material layer 1051 by silk printing, etc. Ink of the print layer 1051c may preferably correspond to ink which does not transmit light and has a high light concealing property (for example, white and highly concealing ink, etc.).

The print layers 1051a and 1051c are not provided in a region of the upper layer window portion 1056. That is, the print layers 1051a and 1051c are omitted in the region of the upper layer window portion 1056.

The laser color development layer 1052 contains a color developer. For this reason, a range of the laser color development layer 1052 irradiated with laser light generates heat and develops a black color. In the embodiment, such color development is also referred to as typing or printing.

Print content of the laser color development layer 1052 is individual information of the user. In the example of FIG. 11A and FIG. 11B, only a photograph image 1052b and information "BBB CCC" of a name 1052c of the user are illustrated. However, in practice, information such as a date of birth, a passport number, etc. is printed.

The material of the laser color development layer 1052 may not contain the color developer as long as color is developed by irradiation with laser light. In addition, color development may correspond to a color other than black.

In addition, FIG. 11A and FIG. 11B illustrate a state in which the hinged laminated body 1010 develops color to describe the print content of the laser color development layer 1052. However, printing of the laser color development layer 1052 may be performed after the hinged laminated body 1010 is bound into the passport 1001.

The transparent protective layer 1055 is a protective layer for protecting the laser color development layer 1052.

The upper layer window portion 1056 is a rectangular portion in which the print layers 1051a and 1051c are not provided. When viewed in the thickness direction Z, a region within the upper layer window portion 1056 is observed to be transparent.

The lower layer 1060 includes a base material layer 1061, a transparent protective layer 1065, and a lower layer window portion 1066. These layers are laminated in this order from the upper side Z2 to the lower side Z1.

The base material layer 1061 and the transparent protective layer 1065 are similar layers to the base material layer 1051 and the transparent protective layer 1055 of the upper layer 1050. That is, a configuration of the base material layer 1061 is as follows.

The base material layer 1061 is a layer to serve as a base material of the hinged laminated body 1010 and includes print layers 1061a and 1061c.

The print layer 1061a is provided on the lower side Z1 of the base material layer 1061. A picture, etc. corresponding to print content thereof, which is not illustrated, is common to all users. The print layer 1061c is provided on the upper side Z2 of the base material layer 1061 to conceal light. The print layers 1061a and 1061c are omitted in a region of the lower layer window portion 1066.

The transparent protective layer 1065 is a protective layer for protecting the base material layer 1061 and the print layer 1061a thereof.

The lower layer window portion 1066 corresponds to a rectangular region in which the print layers 1061a and 1061c are not provided, and is observed to be transparent when viewed in the thickness direction Z.

When viewed in the thickness direction Z, an external shape of the upper layer window portion 1056 is equal to and aligned with an external shape of the lower layer window portion 1066. The invention is not limited to this form, and the external shape of one of the upper layer window portion 1056 and the lower layer window portion 1066 may be larger one size than the external shape of the other one.

The hologram layer 1070 is laminated between the hinged laminated body 1020 and the upper layer 1050. When viewed from the upper side Z2, an external shape of the hologram layer 1070 is larger one size than the window portions 1056 and 1066.

The hologram layer 1070 is transparent. For example, a hologram image 1071 such as a Lippmann hologram, an emboss type hologram, etc. may be recorded in the hologram layer 1070. The hologram image 1071 is disposed inside the window portions 1056 and 1066. In this connection, the hologram image 1071 may be translucent.

In the example of FIG. 11B, the hologram layer 1070 is disposed on the lower side Z1 of the upper layer window portion 1056, and thus overlaps the upper layer window portion 1056 in the XY plane when viewed from the upper side Z2. However, the invention is not limited thereto. It is possible to adopt a mode in which the hologram layer 1070 is disposed at a position not overlapping the upper layer window portion 1056.

In addition, in the example of FIG. 11B, the hologram layer 1070 is disposed on the lower side Z1 of the laser color development layer 1052 and the upper side Z2 of the hinged laminated body 1020. However, the invention is not limited thereto. For example, it may be alternatively possible to adopt a mode in which the hologram layer 1070 is disposed on the upper side Z2 of the laser color development layer 1052.

According to this arrangement, when laser irradiation is performed to tamper with printing information of the laser color development layer 1052, the hologram layer 1070 on the upper side Z2 is destroyed. For this reason, it is possible to increase the effect of prevention of falsification.

According to the above configuration, the print content of the laser color development layer 1052 in the upper layer 1050 is observable through the transparent protective layer 1055. The print content of the print layer 1051a on the base material layer 1051 is observable through the laser color development layer 1052 and the transparent protective layer 1055. In addition, the print content of the print layer 1061a on the base material layer 1061 in the lower layer 1060 is observable through the transparent protective layer 1065.

In addition, since layers other than the print layers 1051a, 1051c, 1061a, and 1061c have translucency, an upper surface of the hinged laminated body 1020 is visually recognizable in the upper layer window portion 1056 when viewed from the upper side Z2. Further, in a part of the window portions 1056 and 1066 in which the hologram image 1071 of the hologram layer 1070 is not present, the lower side Z1 of the hinged laminated body 1020 (opposite side from an observation side) is observed, that is, the part is observed to be colorless and transparent (see an arrow L1). In addition, in a part of the window portions 1056 and 1066 in which the hologram image 1071 of the hologram layer 1070 is present, the hologram image 1071 is observable (see an arrow L2).

When observed from the lower side Z1, the lower surface of the hinged laminated body 1020 is visually recognizable in the lower layer window portion 1066. For this reason, an observation mode in the lower layer window portion 1066 is the same as an observation mode in the upper layer window portion 1056.

Meanwhile, since the print layers 1051c and 1061c on the base material layers 1051 and 1061 have high light concealing property, the hinged laminated body 1020 may not be visually recognized. For this reason, the hinged laminated body 1010 may blind a part such as an antenna 1035, and thus an appearance is excellent.

[Configuration of Hinged Laminated Body 1020 (Single Part)]

The (non-upper layer/lower layer-equipped) hinged laminated body 1020 is laminated substantially at a center of the (upper layer/lower layer-equipped) hinged laminated body 1010 in the thickness direction Z.

The hinged laminated body 1020 includes the IC module 1030, the antenna 1035, a hinge layer 1041, a thickness adjustment layer 1042, an intermediate layer 1043 (antenna buried layer), an upper protective layer 1045, a lower protective layer 1046, an IC module housing hole 1047, and an antenna buried groove 1048.

The lower protective layer 1046, the intermediate layer 1043, the hinge layer 1041, the thickness adjustment layer 1042, and the upper protective layer 1045 are laminated in this order from the lower side Z1 to the upper side Z2. That is, the hinge layer 1041 and the thickness adjustment layer 1042 are laminated between the intermediate layer 1043 and the upper protective layer 1045 and disposed at the same position in the thickness direction Z.

The respective layers of the hinged laminated body 1020 are joined by thermal welding at interfaces thereof. For this reason, a sheet material of a resin (for example, PET-G, PVC, PC, etc.) having excellent compatibility with terminal welding is used as these materials. The intermediate layer 1043 has a single layer structure or a multi-layer structure of a resin sheet material. This description is applied to the upper protective layer 1045 and the lower protective layer 1046.

External shapes of the intermediate layer 1043, the lower protective layer 1046, and the upper protective layer 1045 are equal to one another. A combined external shape of two layers corresponding to the hinge layer 1041 and the thickness adjustment layer 1042 is larger than an external shape of the intermediate layer 1043, the lower protective layer 1046, and the upper protective layer 1045.

The IC module 1030 includes a mounted substrate 1031 and the IC chip 1032.

The mounted substrate 1031 is a substrate for mounting the IC chip 1032. A lead frame (not illustrated) of the IC chip 1032 is connected to the mounted substrate 1031.

The IC chip 1032 is a semiconductor integrated circuit element and includes a central processing unit (CPU) corresponding to a controller and a storage device (for example, an EEPROM). Identification information, etc. is stored in the storage device. The IC chip 1032 is a type performing contactless communication with an external device such as a reader/writer.

The IC chip 1032 is mounted on a lower surface of the mounted substrate 1031 and is sealed (packaged) with resin, etc.

The antenna 1035 is a winding of a covered conductive wire in a coil shape (spiral shape). The covered conductive wire is formed by covering a periphery of the conductive wire with an insulator.

Both ends of the antenna 1035 and the lead frame of the IC chip 1032 are connected by an electrically conductive paste, etc. In this way, the antenna 1035 and the IC chip 1032 are electrically connected to each other.

Connection between the IC chip 1032 and the antenna 1035 is not limited to the above-mentioned mode. For example, the lead frame of the IC chip 1032 and the both ends of the antenna 1035 may be directly connected to each other.

Communication between the IC module 1030 as well as the antenna 1035 and external devices includes short-range wireless communication based on an electromagnetic induction scheme (for example, a communication scheme according to ISO/IEC14443, ISO/IEC15693, ISO/IEC18092, etc.).

The hinge layer 1041 is disposed only at an edge of a side on the right side X2. That is, the hinge layer 1041 is disposed only at an edge in the longitudinal direction Y along a right side surface corresponding to a side surface from which the hinge section 1041a protrudes and disposed across the entire edge in the longitudinal direction Y. For this reason, in the XY plane, the hinge layer 1041 is laminated only in a part of the hinged laminated body 1020.

The hinge section 1041a is a portion bound into the passport 1001 (see FIG. 12B).

The hinge section 1041a protrudes from a side surface on a side bound into the passport 1001 (a right side surface in FIG. 11A and FIG. 11B) among side surfaces of the hinged laminated body 1020.

The hinge layer 1041 has (i) sufficient flexibility for functioning as a hinge, (ii) sufficient tensile strength for preventing breaking, etc., (iii) sufficient durability for preventing breaking even after repeated bending, etc. For example, a layer in which a fiber such as PET, polyamide, etc. is disposed in a lattice shape between layers of a plurality of PET-G resin sheets, etc. may be used as the hinge layer 1041.

The thickness adjustment layer 1042 is configured to provide an adjustment related to a thickness of the hinge layer 1041. For this reason, a thickness of the thickness adjustment layer 1042 and the thickness of the hinge layer 1041 are the same. The thickness adjustment layer 1042 may be formed of the similar material as that of the intermediate layer 1043. In the left-right direction X, the thickness adjustment layer 1042 and the hinge layer 1041 are in close contact with each other, that is, are adjacent to each other to have almost no gap.

In addition, the thickness adjustment layer 1042 forms a part of the IC module housing hole 1047.

Even when the hinge layer 1041 is disposed only at the edge, the hinged laminated body 1020 may form the upper surface and the lower surface flat by including the thickness adjustment layer 1042. In addition, the hinge layer 1041 of the present embodiment is provided only at the edge of the hinged laminated body 1020, and thus has a smaller external shape when compared to a mode in which the hinge layer 1041 is provided on the entire surface. Even though the material for the hinge layer 1041 is expensive, the hinged laminated body 1020 may be manufactured at low cost by allowing the hinge layer 1041 to be small in this way.

The intermediate layer 1043 is a layer configured to provide an adjustment related to a thickness of the IC chip 1032.

The upper protective layer 1045 is a sheet material that protects the IC module 1030, the hinge layer 1041, etc. by being laminated on the upper side Z2 of the hinge layer 1041 and the thickness adjustment layer 1042.

Similarly, the lower protective layer 1046 is a sheet material that protects the IC module 1030, the intermediate layer 1043, etc. by being laminated on the lower side Z1 of the intermediate layer 1043.

The IC module housing hole 1047 is a hole for housing the IC module 1030. The IC module housing hole 1047 is a through-hole penetrating the thickness adjustment layer 1042 and the intermediate layer 1043. The thickness adjustment layer 1042 and the intermediate layer 1043 hold the IC module 1030 by housing the IC module 1030 in the IC module housing hole 1047. The IC module housing hole 1047 may correspond to a bottomed hole.

The antenna buried groove 1048 is a groove provided on an upper surface of the intermediate layer 1043. As described below, the antenna buried groove 1048 is formed by burying the antenna 1035 using hot pressing in a state in which the antenna 1035 is disposed. For this reason, when viewed from the upper side Z2, arrangement of the antenna buried groove 1048 is the same as arrangement of the antenna 1035. The thickness adjustment layer 1042 is laminated immediately above the intermediate layer 1043. For this reason, the intermediate layer 1043 houses the antenna 1035 in the antenna buried groove 1048, and the thickness adjustment layer 1042 covers an opening of the antenna buried groove 1048. In this way, the thickness adjustment layer 1042 and the intermediate layer 1043 may hold the antenna 1035.

[Layout Sheet for Hinged Laminated Body 1010A]

Figure 13A:
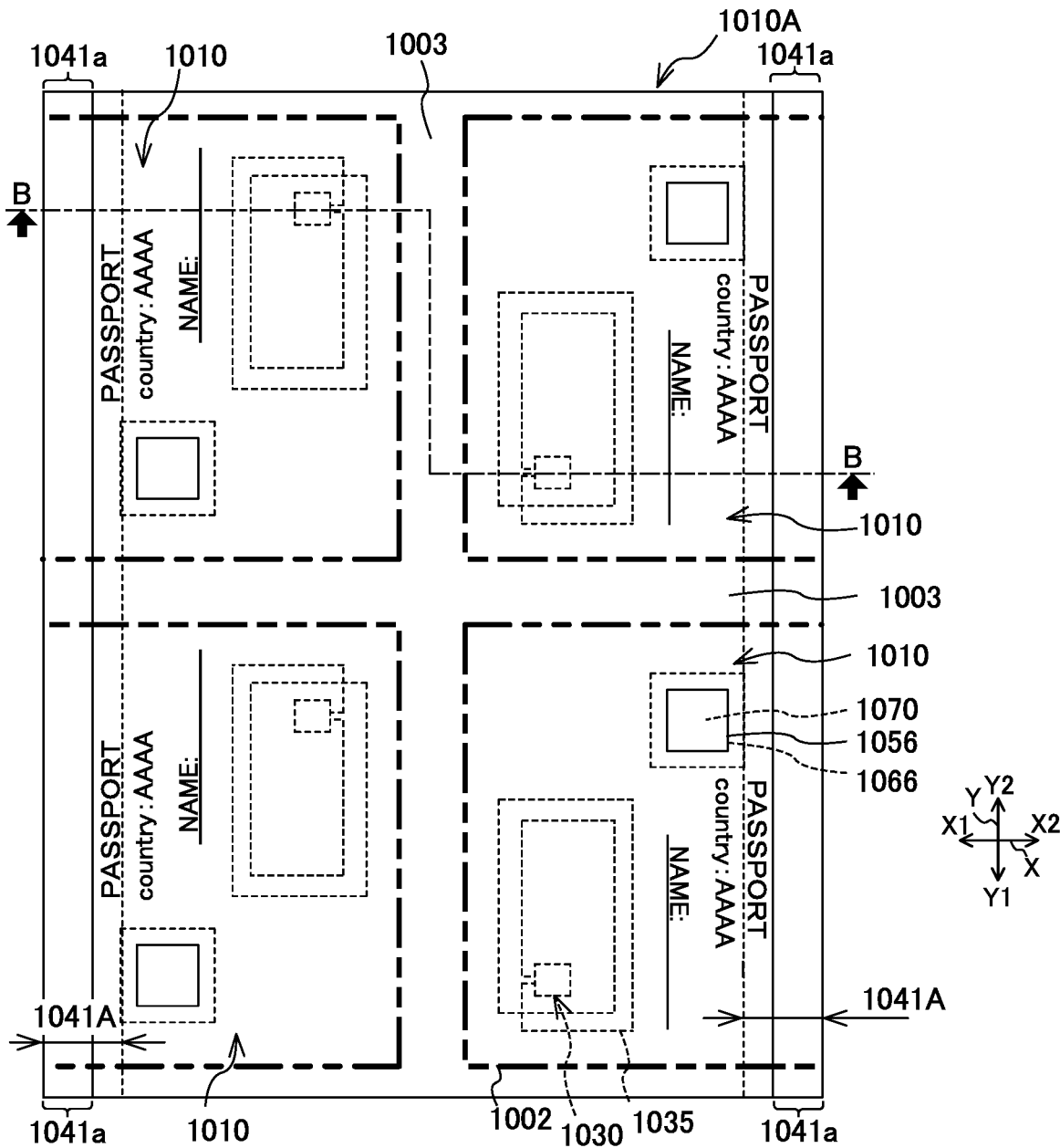
FIG. 13A is a diagram for description of a configuration of a layout sheet for the hinged laminated body 1010A of the 2-1st embodiment.
Figure 13B:
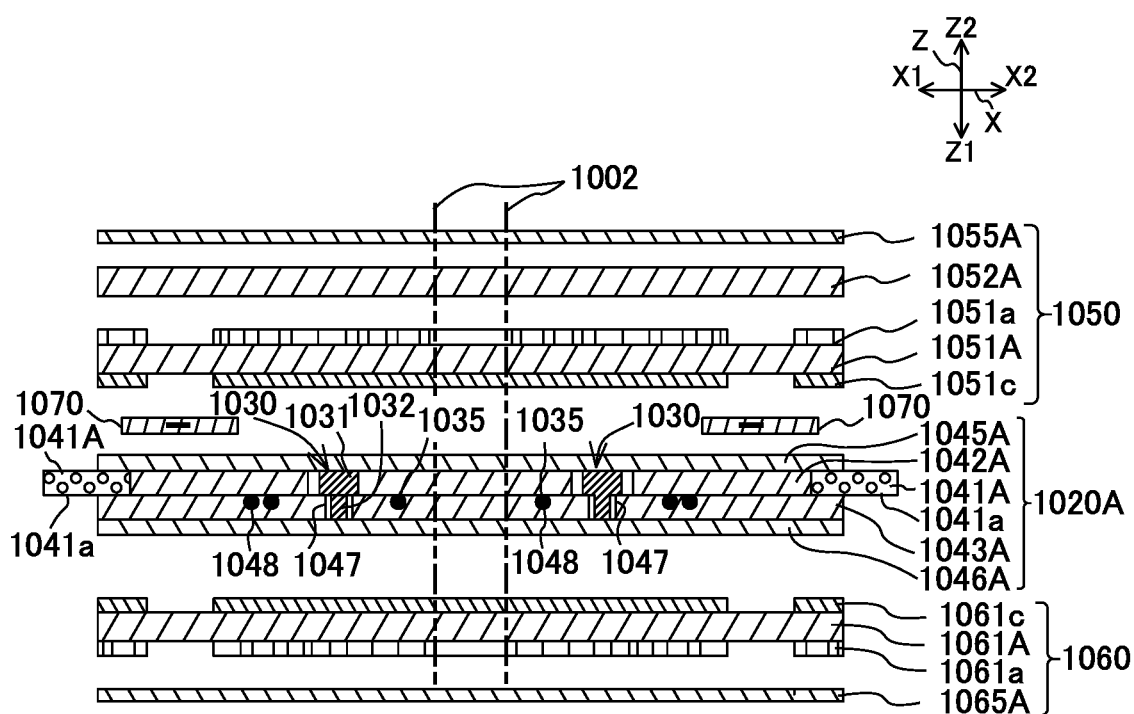
FIG. 13B is a diagram for description of the configuration of the layout sheet for the hinged laminated body 1010A of the 2-1st embodiment.

FIG. 13A and FIG. 13B are diagrams for description of a configuration of a layout sheet for the hinged laminated body 1010A of the 2-1st embodiment.

FIG. 13A is a diagram of the layout sheet for the hinged laminated body 1010A viewed from the upper side Z2 in the thickness direction Z (normal direction of the upper surface).

FIG. 13B is a cross-sectional view of the layout sheet for the hinged laminated body 1010A (B-B sectional view of FIG. 13A).

In the figures, a cut portion 2 of punching by pressing (that is, the external shape of the hinged laminated body 1010) is indicated by a two-dot chain line.

The (upper layer/lower layer-equipped) layout sheet for the hinged laminated body 1010A is a sheet material in which a plurality of (upper layer/lower layer-equipped) hinged laminated bodies 1010 is arranged.

When viewed from the upper side Z2, a total of four hinged laminated bodies 1010 are arranged, two in the longitudinal direction Y and two in the left-right direction X. The number of the hinged laminated bodies 1010 in the longitudinal direction Y may be appropriately set according to convenience in manufacturing. In addition, FIG. 13A and FIG. 13B illustrate an example in which a space 1003 (blank) is provided between the hinged laminated bodies 1010. However, the space 1003 may be deleted as appropriate.

A laminated configuration of the layout sheet for the hinged laminated body 1010A corresponds to a laminated configuration of the hinged laminated body 1010.

That is, in the (upper layer/lower layer-equipped) layout sheet for the hinged laminated body 1010A, a transparent protective layer sheet material 1065A, a base material layer sheet material 1061A, a (non-upper layer/lower layer-equipped) layout sheet for a hinged laminated body 1020A, the hologram layer 1070, a base material layer sheet material 1051A, a laser color development layer sheet material 1052A, and a transparent protective layer sheet material 1055A are laminated in this order from the lower side Z1 to the upper side Z2.

The base material layer sheet material 1051A, the laser color development layer sheet material 1052A, and the transparent protective layer sheet material 1055A correspond to a sheet material (upper layer layout sheet) in which four members forming the upper layer 1050 are arranged in the XY plane direction.

That is, the base material layer sheet material 1051A corresponds to a sheet material in which four base material layers 1051 are arranged in the XY plane direction. In addition, the laser color development layer sheet material 1052A and the transparent protective layer sheet material 1055A correspond to sheet materials in which four laser color development layers 1052 and four transparent protective layers 1055 are arranged in the XY plane direction, respectively. Arrangement of the four members of each sheet material corresponds to arrangement of four hinged laminated bodies 1020 of the layout sheet for the hinged laminated body 1020A (see FIG. 14A and FIG. 14B).

Similarly, the base material layer sheet material 1061A and the transparent protective layer sheet material 1065A correspond to a sheet material (lower layer layout sheet) in which four members forming the lower layer 1060 are arranged in the XY plane direction at positions corresponding to the hinged laminated bodies 1020 of the layout sheet for the hinged laminated body 1020A.

External shapes of the base material layer sheet materials 1051A and 1061A, the laser color development layer sheet material 1052A, and the transparent protective layer sheet materials 1055A and 1065A are equal to one another. Left and right hinge sections 1041a protrude from left and right side surfaces of the layout sheet for the hinged laminated body 1020A in a state of the layout sheet for the hinged laminated body 1010A.

[Layout Sheet for Hinged Laminated Body 1020A]

Figure 14B:
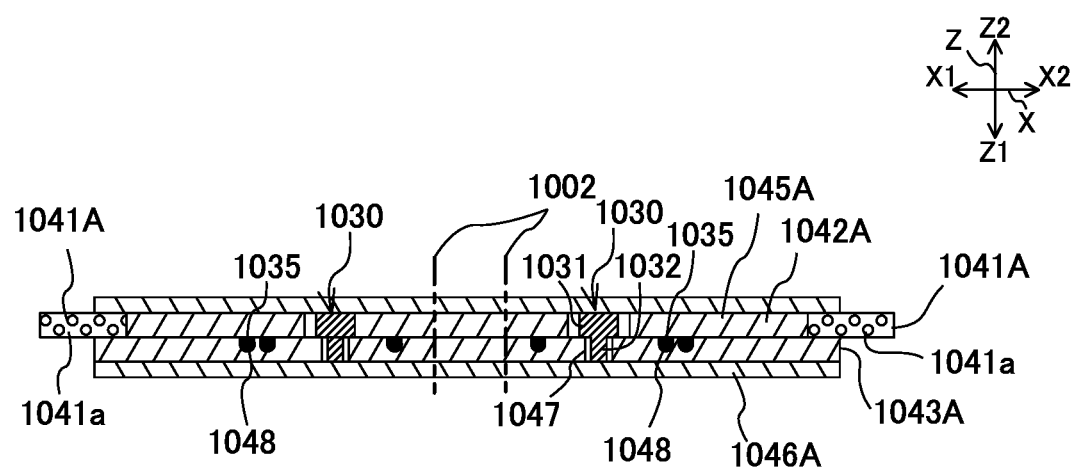
FIG. 14B is a diagram for description of the configuration of the layout sheet for the hinged laminated body 1020A of the 2-1st embodiment.

FIG. 14A and FIG. 14B are diagrams for description of a configuration of the layout sheet for the hinged laminated body 1020A of the 2-1st embodiment.

FIG. 14A is a diagram of the layout sheet for the hinged laminated body 1020A viewed from the upper side Z2 in the thickness direction Z (normal direction of the upper surface).

FIG. 14B is a cross-sectional view of the layout sheet for the hinged laminated body 1020A (B-B sectional view of FIG. 14A).

The (non-upper layer/lower layer-equipped) layout sheet for the hinged laminated body 1020A is a sheet material in which a plurality of (non-upper layer/lower layer-equipped) hinged laminated bodies 1020 is arranged.

Arrangement of the hinged laminated bodies 1020 of the layout sheet for the hinged laminated body 1020A is the same as that of the layout sheet for the hinged laminated body 1010A.

That is, when viewed from the upper side Z2, a total of four hinged laminated bodies 1020 are arranged, two in the longitudinal direction Y and two in the left-right direction X. In the hinged laminated body 1020 on the left side X1, the hinge section 1041a is disposed on the left side X1. Meanwhile, in the hinged laminated body 1020 on the right side X2, the hinge section 1041a is disposed on the right side X2. The two hinged laminated bodies 1020 on the left side X1 and the two hinged laminated bodies 1020 on the right side X2 are disposed point-symmetrically with respect to the layout sheet for the hinged laminated body 1020A. The number of hinged laminated bodies 1020 in the longitudinal direction Y and the space 1003 may be modified similarly to the layout sheet for the hinged laminated body 1010A.

The left and right hinge sections 1041a protrude from the left and right side surfaces of the layout sheet for the hinged laminated body 1020A in a state of the layout sheet for the hinged laminated body 1020A.

A laminated configuration of the layout sheet for the hinged laminated body 1020A corresponds to a laminated configuration of the hinged laminated body 1020.

That is, in the layout sheet for the hinged laminated body 1020A, a lower protective layer sheet material 1046A, an intermediate layer sheet material 1043A, a hinge layer sheet material 1041A, a thickness adjustment layer sheet material 1042A, and an upper protective layer sheet material 1045A are laminated in this order from the lower side Z1 to the upper side Z2.

The hinge layer sheet material 1041A is laminated on each of left and right sides. When viewed in the thickness direction Z (that is, in the XY plane), in one hinge layer sheet material 1041A, two hinge layers 1041 are arranged in the longitudinal direction Y at positions corresponding to arrangement of the layout sheet for the hinged laminated body 1020A.

The thickness adjustment layer sheet material 1042A is a sheet material in which four thickness adjustment layers 1042 are arranged at positions corresponding to arrangement of the layout sheet for the hinged laminated body 1020A. When viewed in the thickness direction Z, the thickness adjustment layer sheet material 1042A is disposed between and in close contact with the left and right hinge layer sheet materials 1041A in the left-right direction X.

Similarly, the intermediate layer sheet material 1043A, the upper protective layer sheet material 1045A, and the lower protective layer sheet material 1046A are sheet materials in which members of four intermediate layers 1043, four upper protective layers 1045, and four lower protective layers 1046 are arranged, respectively.

[Manufacturing Method]

FIG. 15A to FIG. 15F are cross-sectional views for description of a method of manufacturing the layout sheet for the hinged laminated body 1020A of the 2-1st embodiment.

(Method of Manufacturing Layout Sheet for Hinged Laminated Body 1020A)

When the layout sheet for the hinged laminated body 1020A is manufactured, the hinge layer sheet material 1041A, the thickness adjustment layer sheet material 1042A, the intermediate layer sheet material 1043A, the upper protective layer sheet material 1045A, and the lower protective layer sheet material 1046A are manufactured in advance in a previous process thereof. A hole is provided by punching in each of the thickness adjustment layer sheet material 1042A (see FIG. 15C) and the intermediate layer sheet material 1043A (see FIG. 15A). The hole forms the IC module housing hole 1047.

The layout sheet for the hinged laminated body 1020A may be manufactured according to the following processes.

(1) Formation Process of Antenna 1035

Figure 15A:
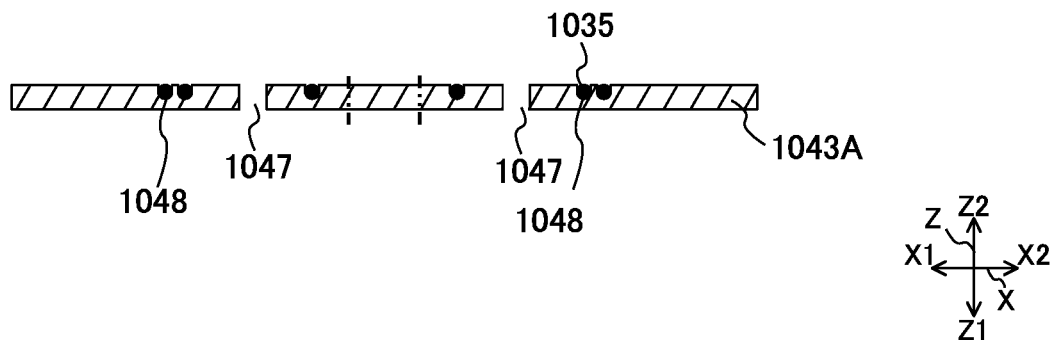
FIG. 15A is a cross-sectional view for description of a method of manufacturing the layout sheet for the hinged laminated body 1020A of the 2-1st embodiment.

As illustrated in FIG. 15A, in a state in which the antenna 1035 is disposed in a coil shape on an upper surface of the intermediate layer sheet material 1043A, the antenna 1035 is buried in the intermediate layer sheet material 1043A by hot pressing. In this way, the antenna buried groove 1048 is formed on the upper surface of the intermediate layer sheet material 1043A, and the antenna 1035 is buried therein.

(2) Connection Process of IC Module 1030 and Antenna 1035

Figure 15B:
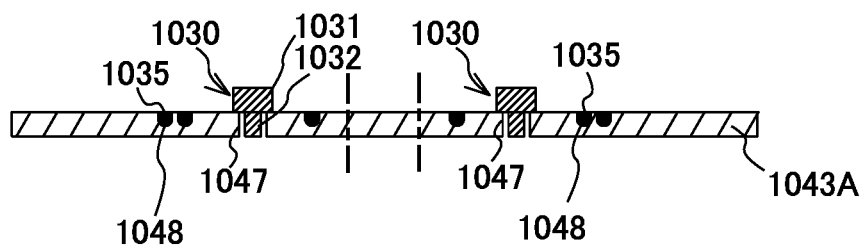
FIG. 15B is a cross-sectional view for description of the method of manufacturing the layout sheet for the hinged laminated body 1020A of the 2-1st embodiment.

As illustrated in FIG. 15B, the IC module 1030 is housed in the IC module housing hole 1047 of the intermediate layer sheet material 1043A. In addition, the mounted substrate 1031 and the both ends of the antenna 1035 are electrically and mechanically connected by an electrically conductive paste, etc.

(3) Lamination Process of Thickness Adjustment Layer Sheet Material 1042A

Figure 15C:
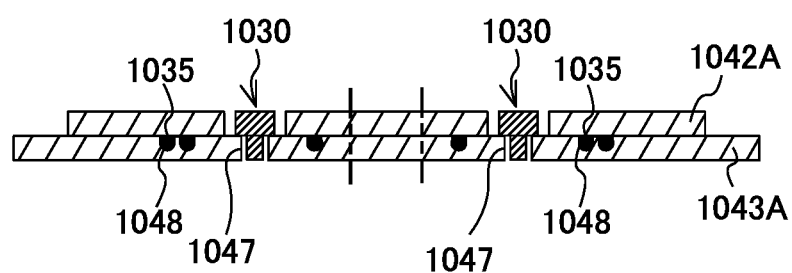
FIG. 15C is a cross-sectional view for description of the method of manufacturing the layout sheet for the hinged laminated body 1020A of the 2-1st embodiment.

As illustrated in FIG. 15C, hot pressing is performed in a state in which the thickness adjustment layer sheet material 1042A and the intermediate layer sheet material 1043A are laminated.

In this way, the thickness adjustment layer sheet material 1042A and the intermediate layer sheet material 1043A are thermally welded at the interface thereof. In addition, the thickness adjustment layer sheet material 1042A holds the antenna 1035 by covering an opening of the antenna buried groove 1048.

Here, when the thickness adjustment layer sheet material 1042A and the intermediate layer sheet material 1043A are laminated, positioning may be performed such that centers of IC module housing holes 1047 of the two sheet materials coincide with each other. For this reason, this positioning process is easily performed.

(4) Lamination Process of Hinge Layer Sheet Material 1041A

Figure 15D:
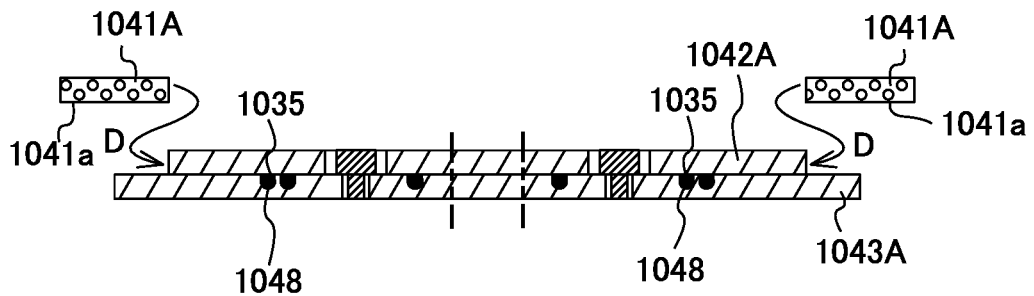
FIG. 15D is a cross-sectional view for description of the method of manufacturing the layout sheet for the hinged laminated body 1020A of the 2-1st embodiment.

As illustrated in FIG. 15D, the hinge layer sheet material 1041A is laminated on each of left and right sides of a laminate produced in processes up to the above process (3).

In this case, positioning of the hinge layer sheet material 1041A and the thickness adjustment layer sheet material 1042A in the left-right direction X is easily performed since it suffices to bring a side surface of the hinge layer sheet material 1041A and a side surface the thickness adjustment layer sheet material 1042A into contact with each other (see an arrow D).

The embodiment shows an example in which thermal welding of the hinge layer sheet material 1041A and the intermediate layer sheet material 1043A is performed together with other sheet materials in process (5) below. However, only the hinge layer sheet material 1041A and the intermediate layer sheet material 1043A may be thermally welded in this process (4).

(5) Hot Pressing Process

Figure 15E:
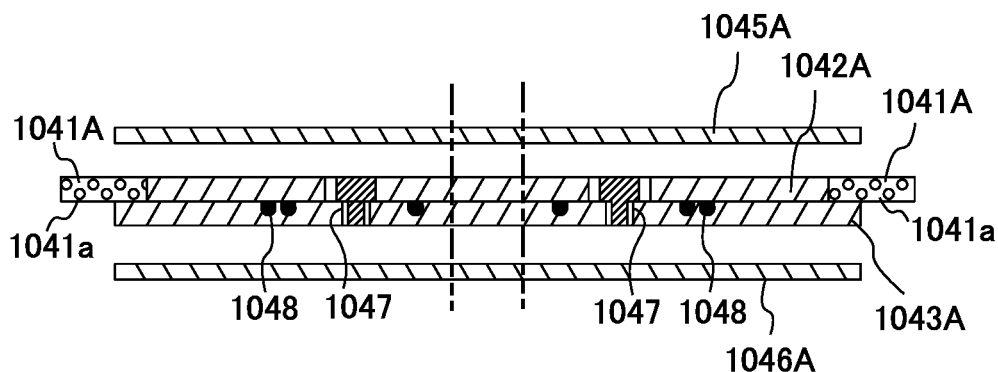
FIG. 15E is a cross-sectional view for description of the method of manufacturing the layout sheet for the hinged laminated body 1020A of the 2-1st embodiment.
Figure 15F:
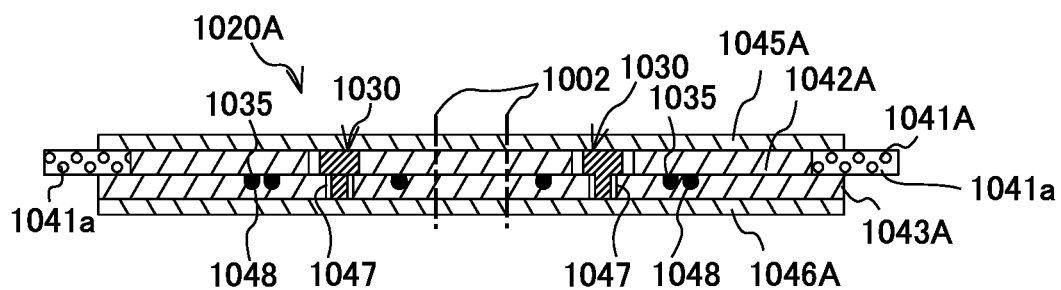
FIG. 15F is a cross-sectional view for description of the method of manufacturing the layout sheet for the hinged laminated body 1020A of the 2-1st embodiment.

As illustrated in FIG. 15E and FIG. 15F, hot pressing is performed in a state in which the upper protective layer sheet material 1045A and the lower protective layer sheet material 1046A are laminated with respect to a laminate produced in processes up to the above process (4). In this way, the respective layers are thermally welded at interfaces thereof.

As described above, it is possible to manufacture the layout sheet for the hinged laminated body 1020A.

(Method of Manufacturing Layout Sheet for Hinged Laminated Body 1010A and Hinged Laminated Body 1010)

When the layout sheet for the hinged laminated body 1010A is manufactured, the layout sheet for the hinged laminated body 1020A, the base material layer sheet materials 1051A and 1061A, the laser color development layer sheet material 1052A, the transparent protective layer sheet materials 1055A and 1065A, and the hologram layer 1070 are manufactured in advance in a previous process thereof.

The layout sheet for the hinged laminated body 1010A may be manufactured according to the following processes.

(1) Lamination Process of Upper Layer 1050 (Upper Layer Lamination Process)

The hologram layer 1070, the base material layer sheet material 1051A, the laser color development layer sheet material 1052A, and the transparent protective layer sheet material 1055A are laminated on the upper side Z2 of the layout sheet for the hinged laminated body 1020A (see FIG. 13B).

(2) Lamination Process of Lower Layer 1060 (Lower Layer Lamination Process)

The base material layer sheet material 1061A and the transparent protective layer sheet material 1065A are laminated on the lower side Z1 of the layout sheet for the hinged laminated body 1020A (see FIG. 13B).

(3) Hot Pressing Process

Hot pressing is performed in a state in which the respective members are laminated in the above processes (1) and (2). In this way, the respective layers are thermally welded at interfaces thereof.

Through the processes so far, it is possible to manufacture the layout sheet for the hinged laminated body 1010A in which the hinged laminated bodies 1010 are arranged.

(4) Individual Piece Separation Process

Separation into individual pieces is performed by cutting the layout sheet for the hinged laminated body 1010A thermally welded in the above process (3) into external shapes of the respective hinged laminated bodies 1010 through punching. In this way, the four hinged laminated bodies 1010 are manufactured.

In this case, a shape of a cut portion 1002 of each hinged laminated body 1010 is a U-shape in which the hinge section 1041a side is open (see FIG. 13A). In this way, the hinge section 1041a remains in each hinged laminated body 1010.

In this way, it is possible to manufacture the hinged laminated body 1010 in which the hinge section 1041a protrudes from a part of a side surface by cutting the layout sheet for the hinged laminated body 1010A (that is, the layout sheet for the hinged laminated body 1020A) such that four hinge sections 1041a remain. For this reason, it is possible to simultaneously manufacture a plurality of hinged laminated bodies 1010 similarly to conventional card manufacture. In this way, the hinged laminated body 1010 may be manufactured easily and at low cost.

The hinged laminated body 1010 after individual piece separation is processed into the passport 1001 by binding the hinge section 1041a (see FIG. 12A and FIG. 12B). In addition, after (or before) being processed into the passport 1001, the hinged laminated body 1010 after individual piece separation is irradiated with laser light, thereby being printed with individual information of the user (the photograph image 1052b, the name 1052c, etc.) (see FIG. 11A).

In a state in which the layout sheet for the hinged laminated body 1010A is not cut or in a state in which the layout sheet for the hinged laminated body 1010A is cut in a form of a layout sheet for a hinged laminated body in which a plurality of (for example, two) hinged laminated bodies 1010 is connected to each other, binding may be performed in a mode in which a plurality of passports is arranged (so-called multiple layout). In this case, after binding, the layout sheet for the hinged laminated body 1010A is separated into individual pieces corresponding to the hinged laminated bodies 1010 by separating the passport into individual pieces.

In this case, separation into individual pieces corresponding to the hinged laminated bodies 1010 may be performed after binding, and thus a binding process may be performed according to a specification of a binding machine, convenience in manufacturing, etc.

As described above, in the hinged laminated body 1020 of the present embodiment, the hinge layer 1041 and the thickness adjustment layer 1042 are disposed at the same lamination position in the thickness direction Z, and the thickness adjustment layer 1042 forms a layer for holding the electrical component. For this reason, a thickness of the hinged laminated body 1020 is smaller when compared to a mode in which a hinge layer is newly laminated on a card-shaped medium having an electrical component. In this way, it is possible to reduce thicknesses of the hinged laminated body 1020 and the hinged laminated body 1010.

(2-2nd Embodiment)

Next, a description will be given of a 2-2nd embodiment of the invention.

In the following description and drawings, a portion having the same function as that of the above-described 2-1st embodiment will be appropriately denoted by the same reference numeral or the same suffix (last two digits), and a repeated description will be appropriately omitted. In addition, in the following description and drawings, a configuration of a hinged laminated body will be mainly described, and a configuration of a layout sheet for the hinged laminated body in which a plurality of hinged laminated bodies is arranged will not be described. The hinged laminated body may be manufactured by separating the layout sheet for the hinged laminated body having a laminated configuration corresponding to laminated configurations of these hinged laminated bodies into individual pieces.

Figure 16:
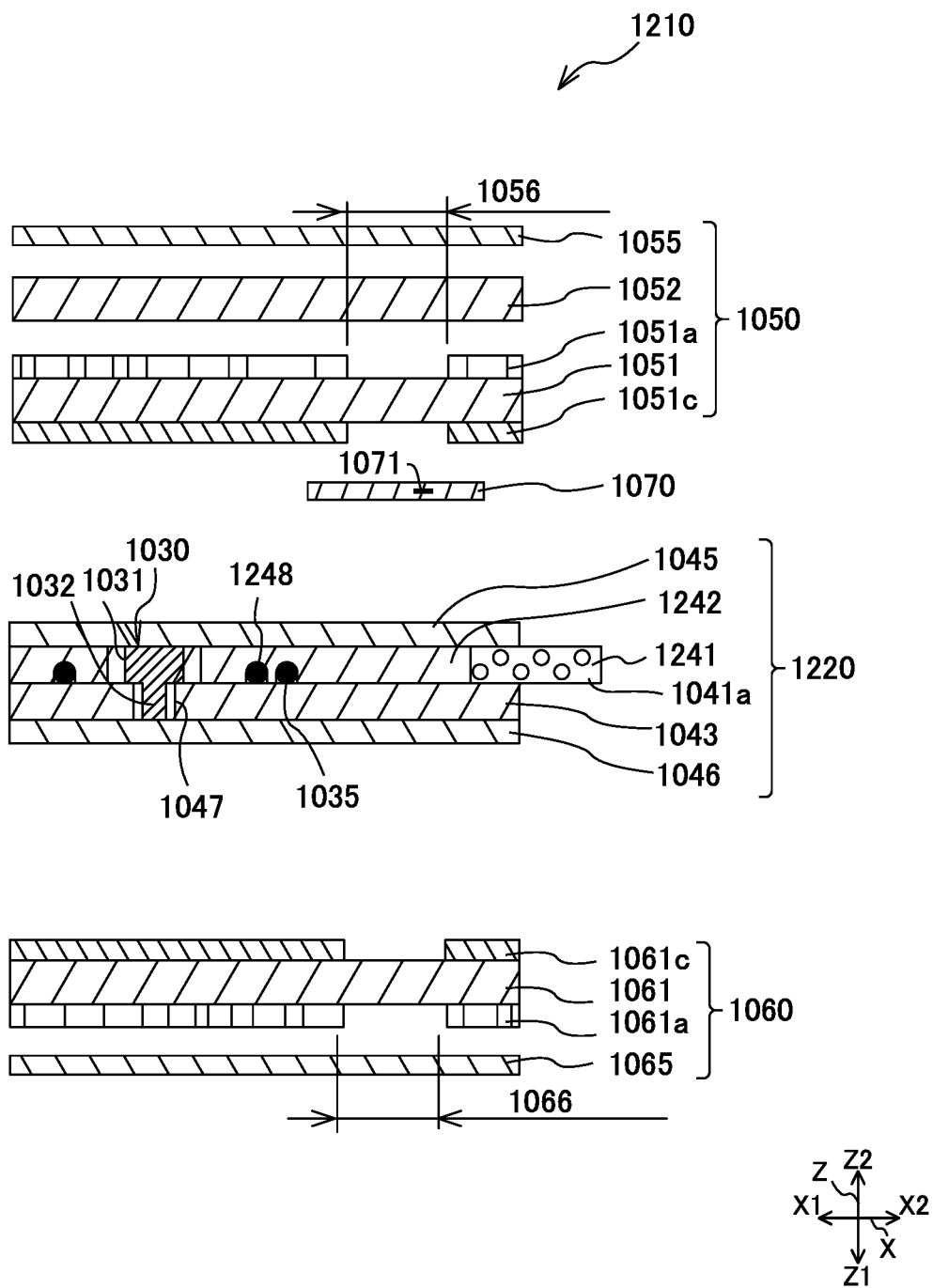
FIG. 16 is a cross-sectional view of a hinged laminated body 1210 of a 2-2nd embodiment.

FIG. 16 is a cross-sectional view of a hinged laminated body 1210 of the 2-2nd embodiment.

As illustrated in FIG. 16, an antenna 1035 of a hinged laminated body 1220 of the present embodiment is buried in a thickness adjustment layer 1242. Arrangement of the thickness adjustment layer 1242 and a hinge layer 1241 is the same as that in the 2-1st embodiment.

The thickness adjustment layer 1242 includes an antenna buried groove 1248 in which the antenna 1035 is buried.

The antenna buried groove 1248 is provided on a lower surface of the thickness adjustment layer 1242. An intermediate layer 1043 is provided immediately below the thickness adjustment layer 1242.

For this reason, the thickness adjustment layer 1242 houses the antenna 1035 in the antenna buried groove 1248, and the intermediate layer 1043 covers an opening of the antenna buried groove 1248. In this way, the thickness adjustment layer 1242 and the intermediate layer 1043 hold the antenna 1035.

The antenna buried groove 1248 of the thickness adjustment layer 1242 may be formed similarly to a method of forming an antenna housing groove on the intermediate layer in the 2-1st embodiment (see FIG. 15A). That is, hot pressing may be performed in a state in which the antenna 1035 is disposed on a lower surface of a thickness adjustment layer sheet material.

As described above, similarly to the 2-1st embodiment, the thickness adjustment layer 1242 of the present embodiment forms a layer for holding the electrical component such as the antenna 1035. In addition, the hinge layer 1241 and the thickness adjustment layer 1242 are laminated at the same position in the thickness direction Z. For this reason, it is possible to reduce thicknesses of the hinged laminated body 1220 and the hinged laminated body 1210.

(2-3rd Embodiment)

Next, a description will be given of a 2-3rd embodiment of the invention.

Figure 17:
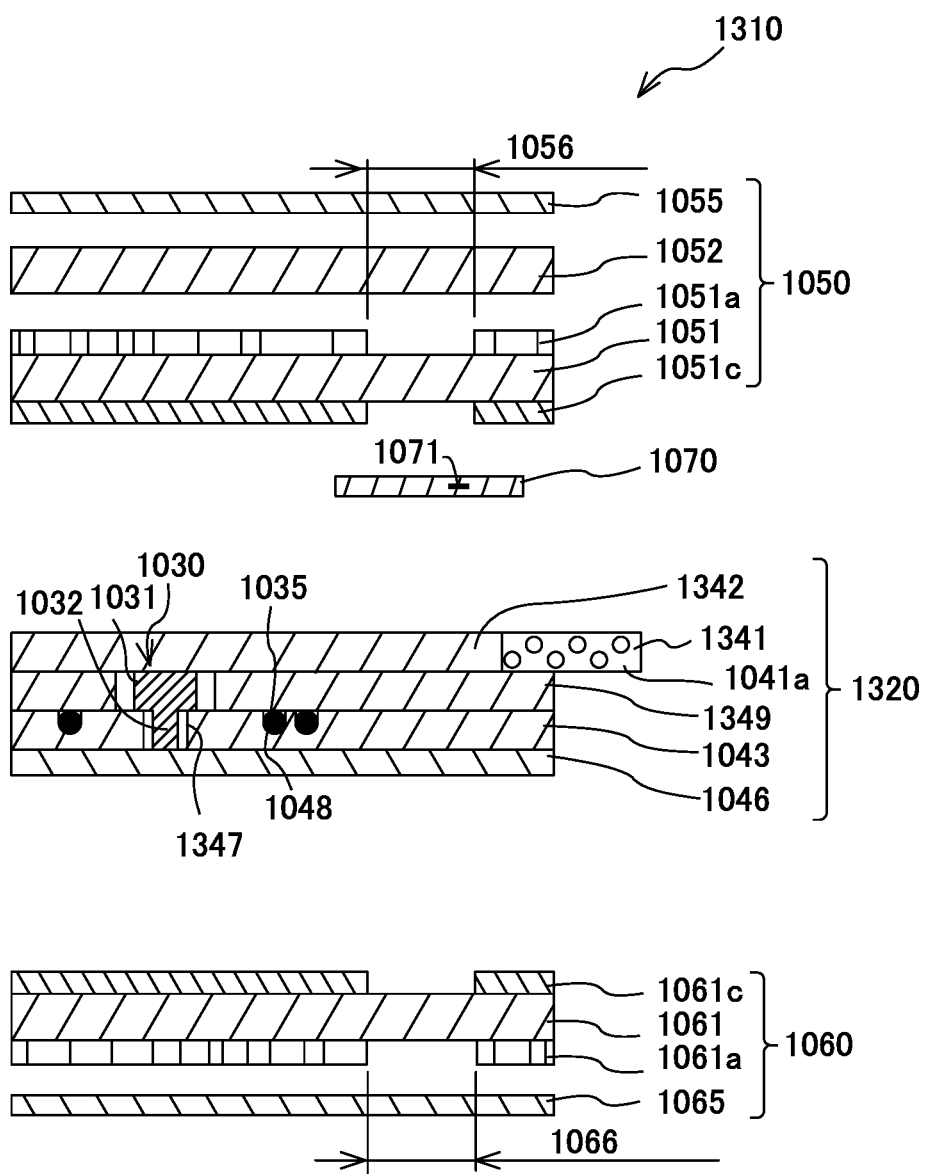
FIG. 17 is a cross-sectional view of a hinged laminated body 1310 of a 2-3rd embodiment.

FIG. 17 is a cross-sectional view of a hinged laminated body 1310 of the 2-3rd embodiment.

As illustrated in FIG. 17, in a hinged laminated body 1320 of the present embodiment, a lower protective layer 1046, an intermediate layer 1043, an intermediate layer 1349, a hinge layer 1341, and a thickness adjustment layer 1342 are laminated in this order from a lower side Z1 to an upper side Z2.

For this reason, as an uppermost layer of the hinged laminated body 1320, the hinge layer 1341 and the thickness adjustment layer 1342 are laminated instead of an upper protective layer.

The intermediate layer 1349 may be formed of the same resin sheet material as that of the intermediate layer 1043. Similarly to the thickness adjustment layer of the 2-1st embodiment, the intermediate layer 1349 holds an antenna 1035 by covering an antenna buried groove 1048 of the intermediate layer 1043. In addition, the intermediate layer 1349 and the intermediate layer 1043 form an IC module housing hole 1347 for housing an IC module 1030.

The thickness adjustment layer 1342 is laminated immediately above the intermediate layer 1349, and thus covers an opening of the IC module housing hole 1347. In this way, the thickness adjustment layer 1342, the intermediate layer 1043, and the intermediate layer 1349 may hold the IC module 1030.

As described above, the hinge layer 1341 and the thickness adjustment layer 1342 of the present embodiment are laminated as the uppermost layer of the hinged laminated body 1320, and the thickness adjustment layer 1342 forms a layer for holding the IC module 1030. For this reason, the hinged laminated body 1320 does not require the upper protective layer. In this way, it is possible to reduce thicknesses of the hinged laminated body 1320 and the hinged laminated body 1310.

(2-4th Embodiment)

Next, a description will be given of a 2-4th embodiment of the invention.

Figure 18:
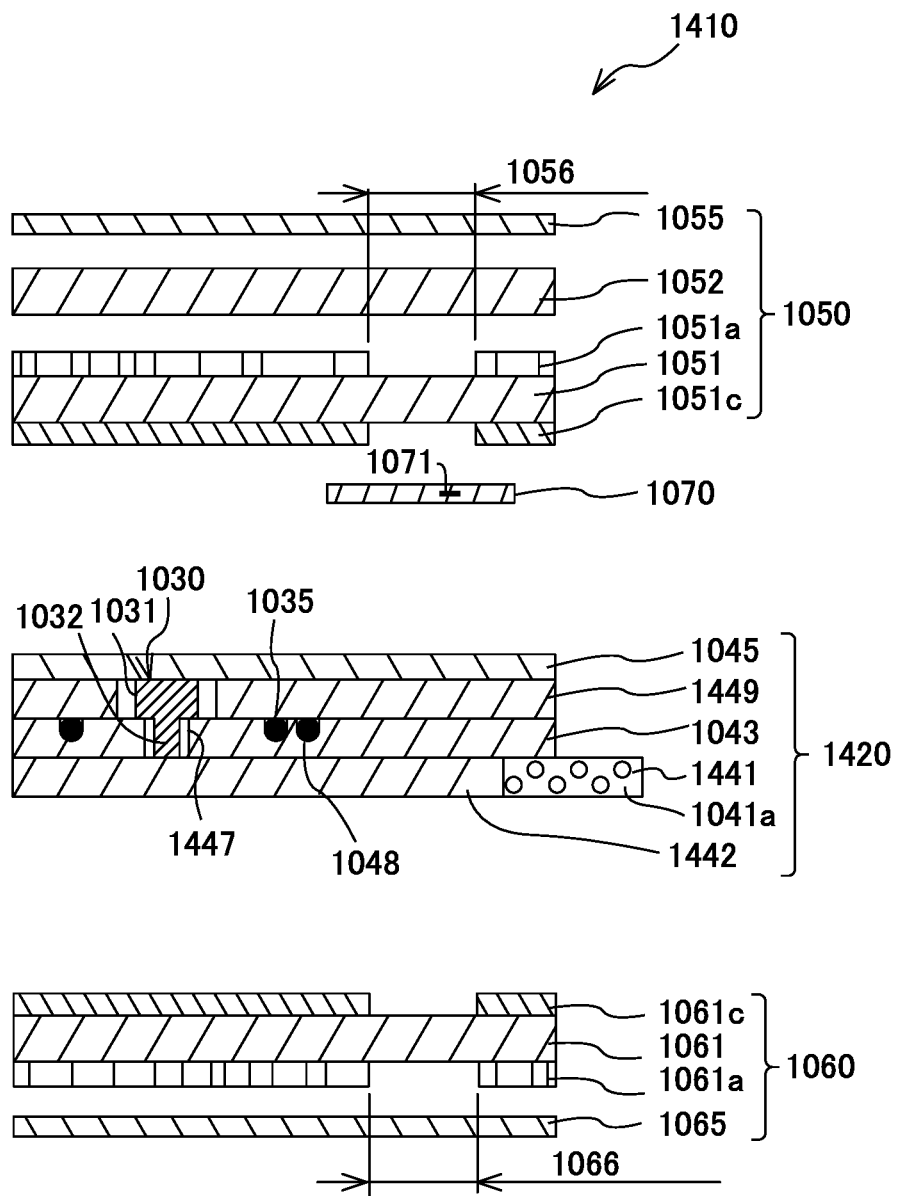
FIG. 18 is a cross-sectional view of a hinged laminated body 1410 of a 2-4th embodiment.

FIG. 18 is a cross-sectional view of a hinged laminated body 1410 of the 2-4th embodiment.

As illustrated in FIG. 18, in a hinged laminated body 1420 of the present embodiment, a hinge layer 1441, a thickness adjustment layer 1442, an intermediate layer 1043, an intermediate layer 1449, and an upper protective layer 1045 are laminated in this order from a lower side Z1 to an upper side Z2.

For this reason, as a lowermost layer of the hinged laminated body 1420, the hinge layer 1441 and the thickness adjustment layer 1442 are laminated instead of a lower protective layer. That is, while the hinge layer and the thickness adjustment layer of the 2-3rd embodiment are laminated as the uppermost layer of the hinged laminated body, the hinge layer 1441 and the thickness adjustment layer 1442 of the present embodiment are laminated as the lowermost layer of the hinged laminated body 1420.

Similarly to the 2-3rd embodiment, the intermediate layer 1449 and the intermediate layer 1043 form an IC module housing hole 1447 for housing an IC module 1030.

The thickness adjustment layer 1442 is laminated immediately below the intermediate layer 1043, and thus covers an opening on the lower side Z1 of the IC module housing hole 1447. In this way, the thickness adjustment layer 1442, the intermediate layer 1043, and the intermediate layer 1449 may hold the IC module 1030.

As described above, the hinged laminated body 1420 of the present embodiment does not require the lower protective layer, and thus it is possible to reduce thicknesses of the hinged laminated body 1410 and the hinged laminated body 1420 similarly to the 2-3rd embodiment.

(2-5th Embodiment)

Next, a description will be given of a 2-5th embodiment of the invention.

Figure 19:
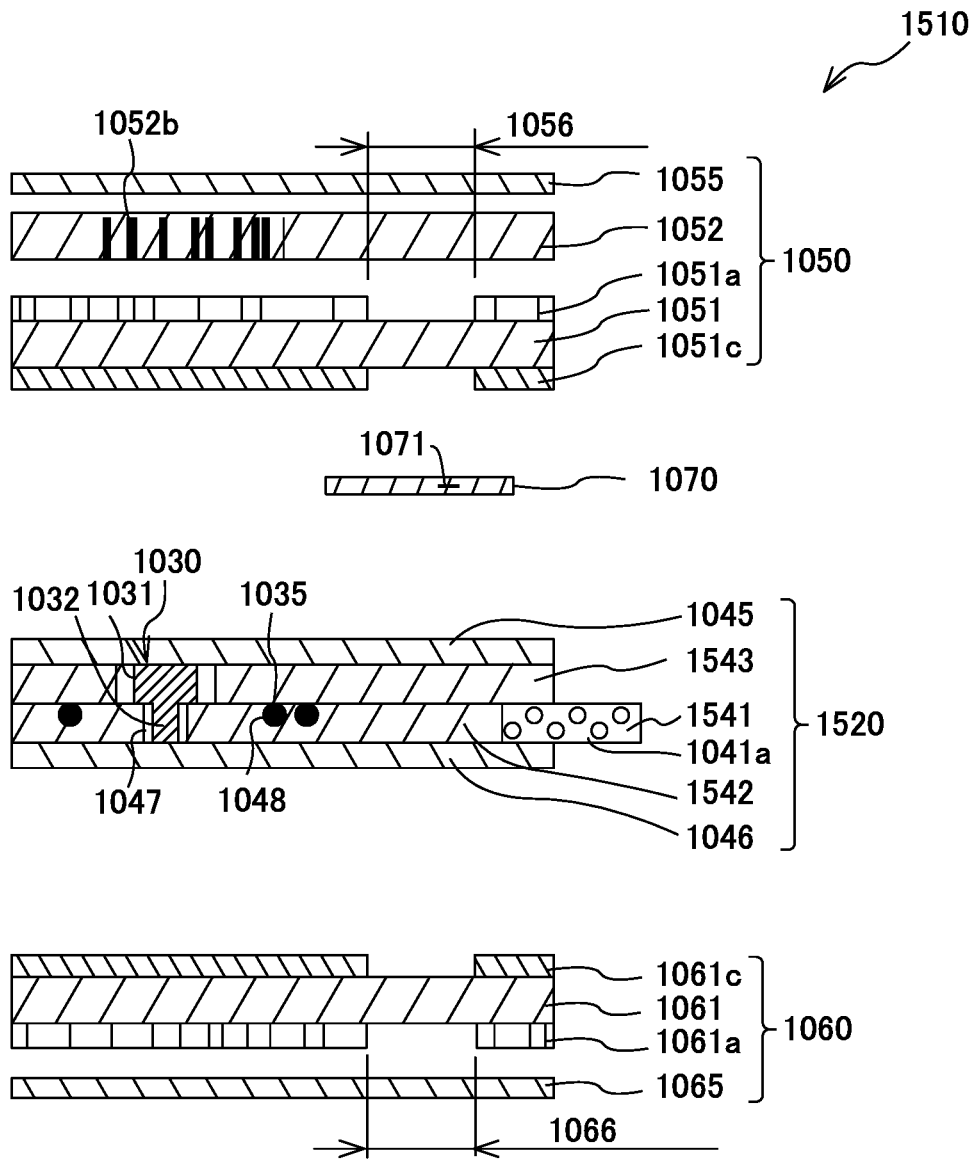
FIG. 19 is a cross-sectional view of a hinged laminated body 1510 of a 2-5th embodiment.

FIG. 19 is a cross-sectional view of a hinged laminated body 1510 of the 2-5th embodiment.

As illustrated in FIG. 19, in a hinged laminated body 1520 of the present embodiment, a lower protective layer 1046, a hinge layer 1541, a thickness adjustment layer 1542, an intermediate layer 1543, and an upper protective layer 1045 are laminated in this order from a lower side Z1 to an upper side Z2. For this reason, an IC module housing hole 1047 penetrates the intermediate layer 1543 and the thickness adjustment layer 1542 in this order from the upper side Z2. In addition, an antenna buried groove 1048 is provided on an upper surface of the thickness adjustment layer 1542.

Similarly to the 2-1st embodiment, the antenna buried groove 1048 may be formed by hot-pressing in a state in which the antenna 1035 is disposed on an upper surface of a thickness adjustment layer sheet material.

In this way, a laminated configuration of the hinged laminated body 1520 may be modified according to a specification, etc.

(Modifications)

(1) In the 2-1st to 2-5th embodiments, an example in which the (upper layer/lower layer-equipped) layout sheet for the hinged laminated body is cut to separate the (upper layer/lower layer-equipped) hinged laminated bodies into individual pieces has been shown. However, the invention is not limited thereto. The (non-upper layer/lower layer-equipped) hinged laminated bodies may be separated into individual pieces by cutting a single part of the (non-upper layer/lower layer-equipped) layout sheet for the hinged laminated body into external shapes of the (non-upper layer/lower layer-equipped) hinged laminated bodies (individual piece separation process).

In this mode, for example, it is possible to manufacture the (upper layer/lower layer-equipped) hinged laminated body by laminating another layer (for example, the upper layer 50 and the lower layer 60) on the (non-upper layer/lower layer-equipped) hinged laminated body corresponding to an individual piece. In addition, the (non-upper layer/lower layer-equipped) hinged laminated body may be used as is for management of a booklet, etc. by binding the (non-upper layer/lower layer-equipped) hinged laminated body corresponding to an individual piece into the booklet.

(2) In the embodiments, an example in which the base material layer and the (non-upper layer/lower layer-equipped) hinge layer for the hinged laminated body and/or the intermediate layer (thickness adjustment layer) have translucency, and the opposite side is observable through the base material layer in the window portion has been shown. However, the invention is not limited thereto. The base material layer and the (non-upper layer/lower layer-equipped) hinged laminated body may alternatively not have translucency.

For example, the base material layer may correspond to a sheet material of white, etc. having a light concealing property. In this case, when the window portion is provided only in the upper layer, the hologram image is observable in this window portion. In this mode, a solid print layer of white, etc. for concealing light is unnecessary in the base material layer.

(3) In the embodiments, an example in which the hinged laminated bodies are arranged in both the left-right direction and the longitudinal direction in the layout sheet for the hinged laminated body has been shown. However, the invention is not limited thereto. It may be possible alternatively to adopt a mode in which the hinged laminated bodies are arranged in one of the left-right direction and the longitudinal direction in the layout sheet for the hinged laminated body.

(4) The laminated configuration of the hinged laminated body of the embodiments may be appropriately modified. For example, the configuration of FIG. 11A and FIG. 11B may be modified as below.

The print layer 1051*a* may not be provided on the base material layer 1051, and a transparent layer printed with the same content as that of the print layer 1051*a* may be alternatively laminated on the lower side of the transparent protective layer 1055 (that is, between the laser color development layer 1052 and the transparent protective layer 1055). In this case, a security film such as a hologram layer may be laminated between the laser color development layer 1052 and the printed transparent layer.

The description of the above embodiments may be appropriately cited in description of embodiments below. In particular, in many cases, a constituent element denoted by the same reference numeral except for thousands digit substantially corresponds to the same constituent element.

(3-1st Embodiment)

Figure 20A:
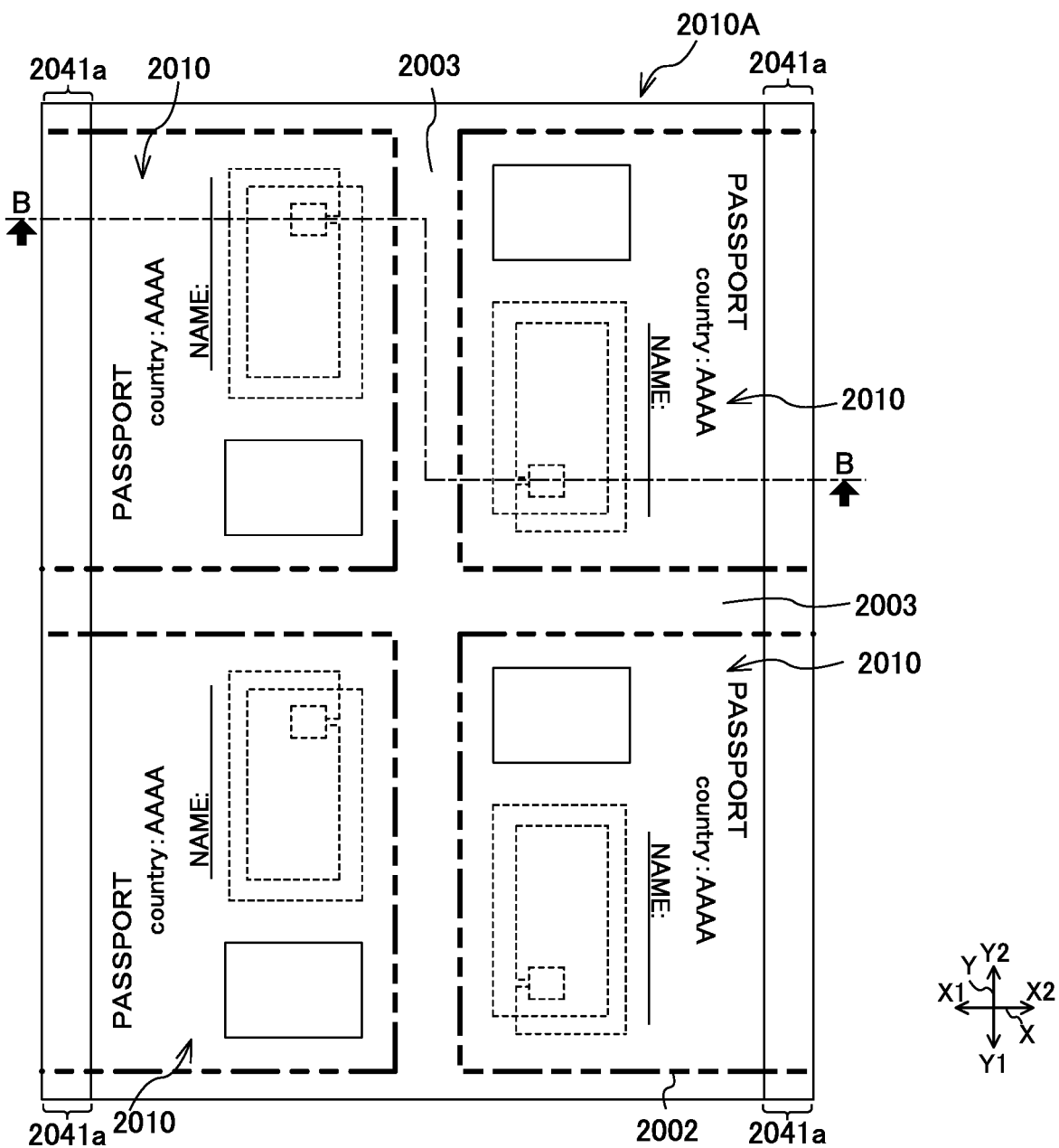
FIG. 20A is a diagram for description of a layout sheet for a hinged laminated body 2010A of a 3-1st embodiment.
Figure 20B:
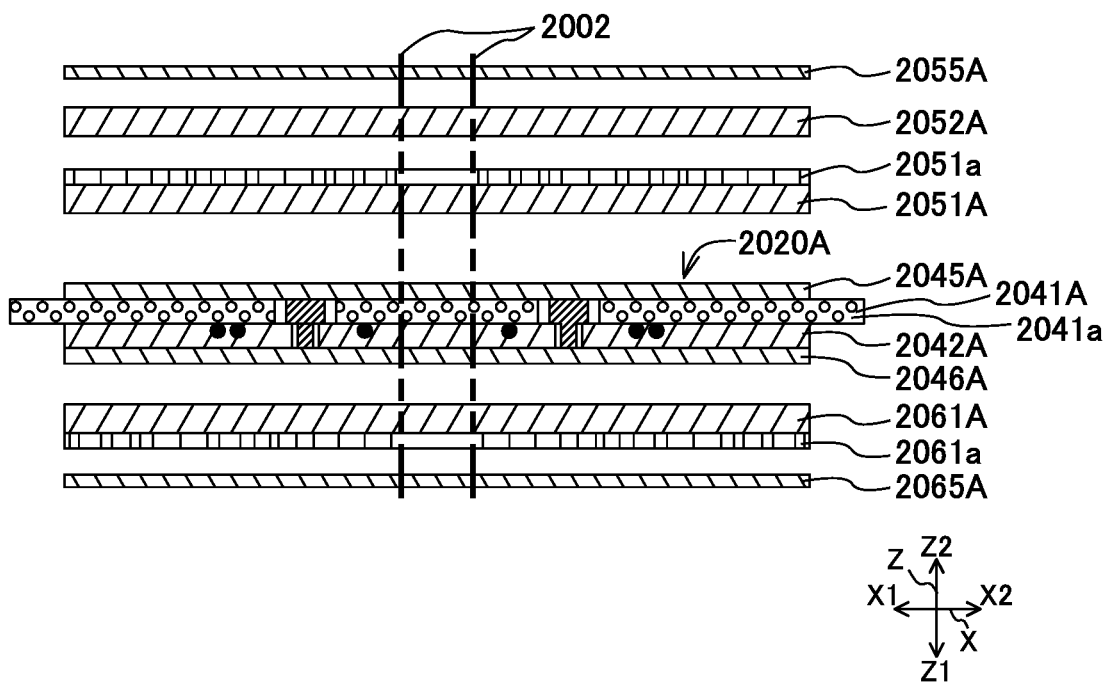
FIG. 20B is a diagram for description of the layout sheet for the hinged laminated body 2010A of the 3-1st embodiment.

FIG. 20A and FIG. 20B are diagrams for description of a layout sheet for a hinged laminated body 2010A of a 3-1st embodiment.

FIG. 20A is a diagram of the layout sheet for the hinged laminated body 2010A viewed from an upper side Z2 in a thickness direction Z (a normal direction of an upper surface).

FIG. 20B is a cross-sectional view of the layout sheet for the hinged laminated body 2010A (B-B sectional view of FIG. 20A).

In embodiments and drawings, an XYZ orthogonal coordinate system is provided to facilitate understanding of description. This coordinate system represents a left-right direction X (left side X1, right side X2), a longitudinal direction Y (lower side Y1, upper side Y2), and a thickness direction Z (lower side Z1, upper side Z2) with reference to the state of FIG. 20A.

In addition, a configuration of the thickness direction Z is illustrated in an exaggerated manner to clearly illustrate the configuration. A cut portion 2002 of punching by pressing (that is, an external shape of a hinged laminated body 2010) is indicated by a two-dot chain line.

The (upper layer/lower layer-equipped) layout sheet for the hinged laminated body 2010A is a sheet material in which a plurality of (upper layer/lower layer-equipped) hinged laminated bodies 2010 is arranged.

As described below, the (upper layer/lower layer-equipped) layout sheet for the hinged laminated body 2010A is manufactured by laminating a (non-upper layer/lower layer-equipped) layout sheet for a hinged laminated body 2020A, sheet materials included in an upper layer 2050, and sheet materials included in a lower layer 2060. Thereafter, the layout sheet for the hinged laminated body 2010A is cut into individual pieces corresponding to the hinged laminated bodies 2010.

The hinged laminated body 2010 includes an IC chip 2032 for storing security information. The hinged laminated body 2010 made into an individual piece is bound into a passport 2001 as a booklet. That is, the hinged laminated body 2010 is used for an identification data page of the passport 2001 (also referred to as an IC passport, etc.) incorporating the IC chip 2032.

Use of the hinged laminated body 2010 is not limited to the passport 2001, and the hinged laminated body 2010 may be used for, for example, management of a book, etc. by being bound into the book.

[Configuration of Single Part of Hinged Laminated Body 2020]

Figure 21A:
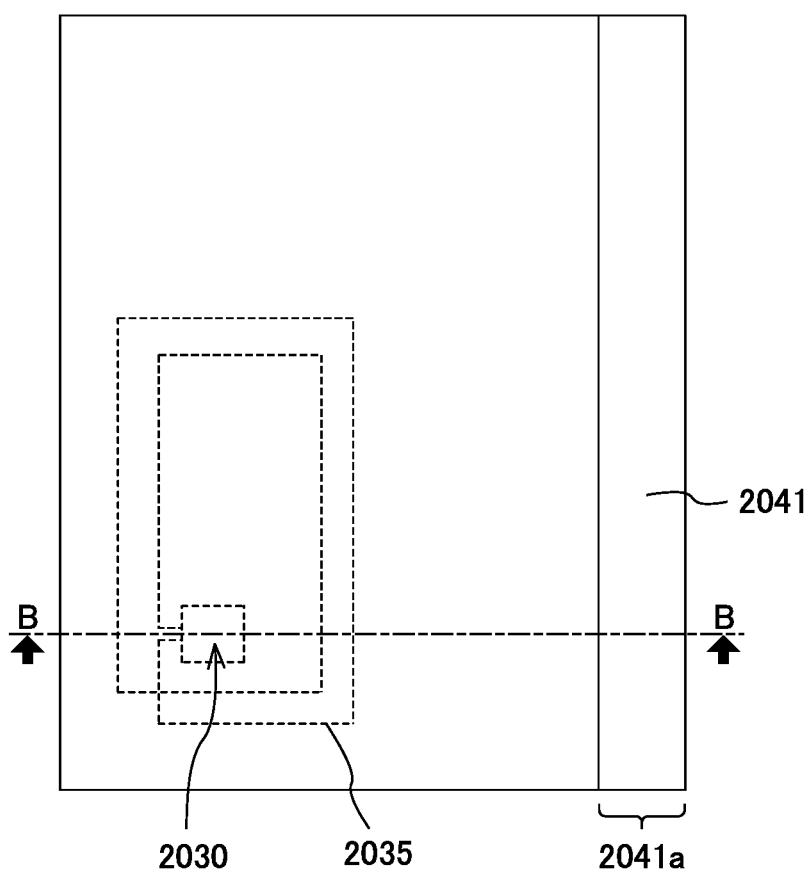
FIG. 21A is a diagram for description of a configuration of a single part of a hinged laminated body 2020 of the 3-1st embodiment.
Figure 21B:
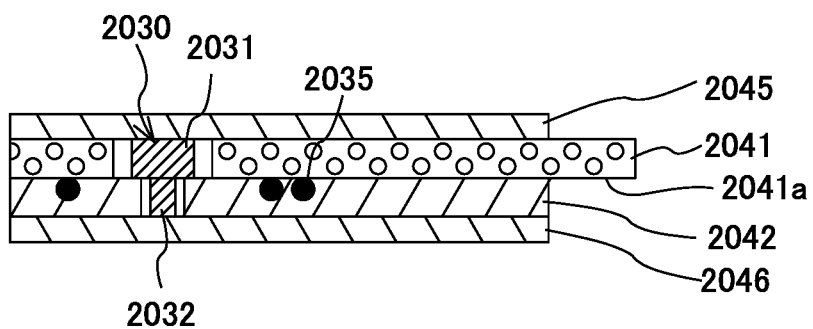
FIG. 21B is a diagram for description of the configuration of the single part of the hinged laminated body 2020 of the 3-1st embodiment.

FIG. 21A and FIG. 21B are diagrams for description of a configuration of a single part of a hinged laminated body 2020 of the 3-1st embodiment.

FIG. 21A is a diagram of the hinged laminated body 2020 viewed from the upper side Z2 in the thickness direction Z (the normal direction of the upper surface).

FIG. 21B is a cross-sectional view (B-B sectional view of FIG. 21A) of the hinged laminated body 2020.

Figure 23A:
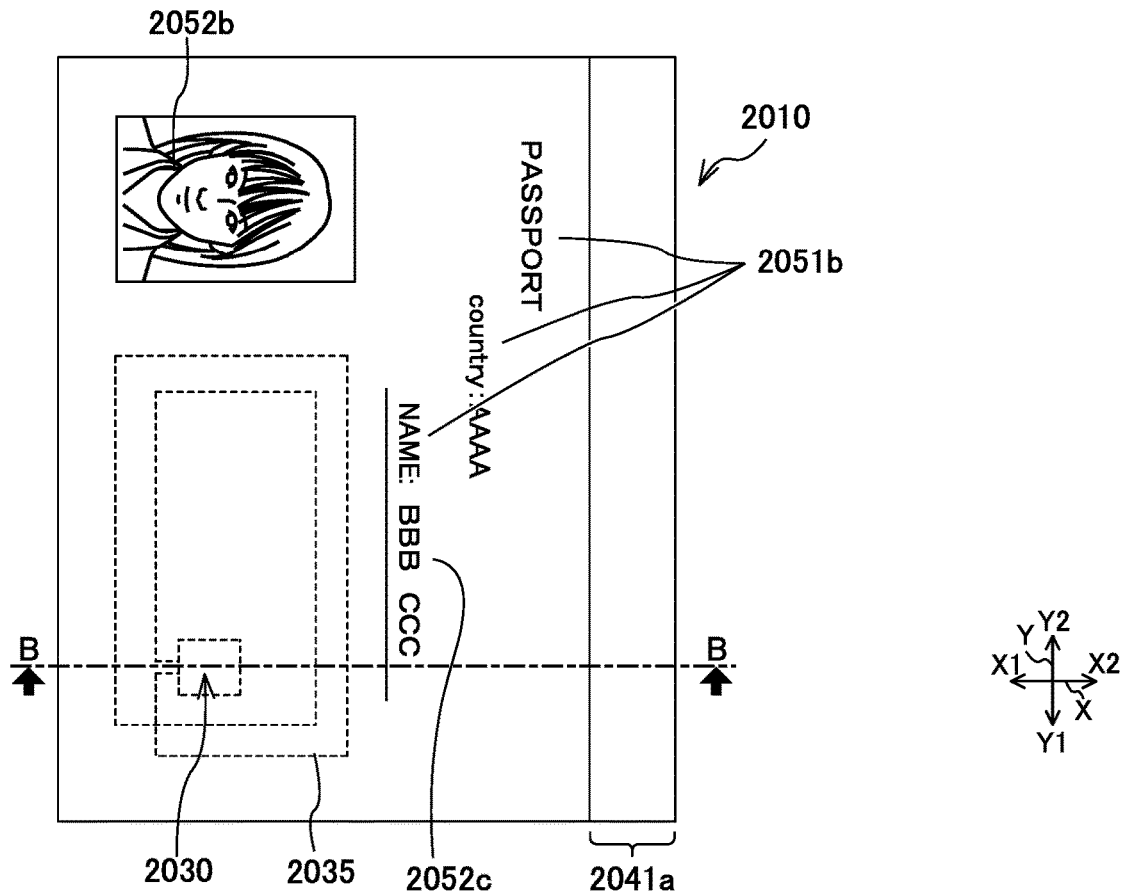
FIG. 23A is a diagram for description of a configuration of a single part of a hinged laminated body 2010 of the 3-1st embodiment.
Figure 23B:
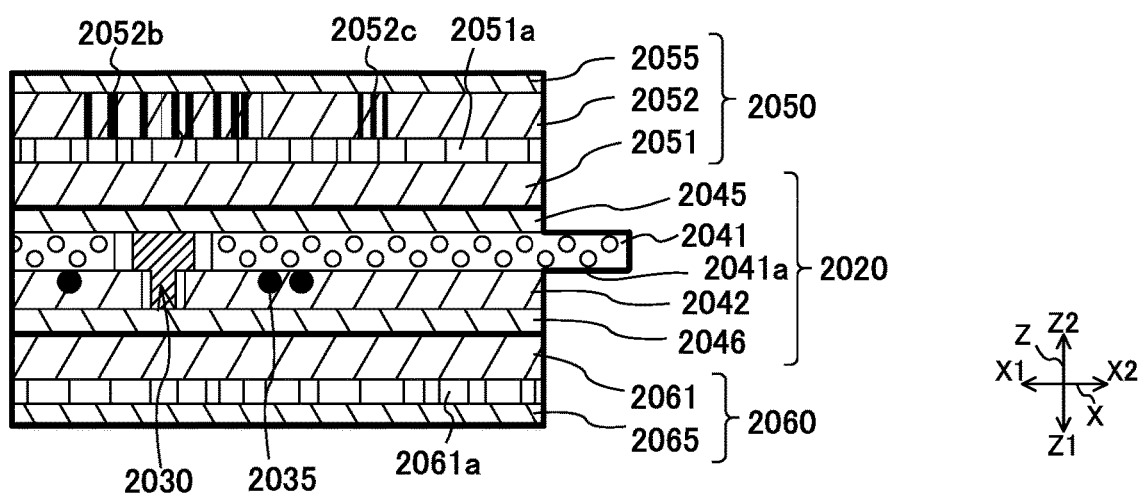
FIG. 23B is a diagram for description of the configuration of the single part of the hinged laminated body 2010 of the 3-1st embodiment.

The hinged laminated body 2020 is laminated substantially at a center of the hinged laminated body 2010 in the thickness direction Z (see FIG. 23A and FIG. 23B).

The hinged laminated body 2020 includes an IC module 2030, an antenna 2035, a hinge layer 2041, an intermediate layer 2042, an upper protective layer 2045, and a lower protective layer 2046.

The lower protective layer 2046, the intermediate layer 2042, the hinge layer 2041, and the upper protective layer 2045 are laminated in this order from the lower side Z1 to the upper side Z2. These layers are joined by thermal welding at interfaces thereof. For this reason, a sheet material of a resin (for example, PET-G, PVC, etc.) having excellent compatibility with terminal welding is used as these materials. The intermediate layer 2042 has a single layer structure or a multi-layer structure of a resin sheet material. This description is applied to the upper protective layer 2045 and the lower protective layer 2046.

External shapes of the intermediate layer 2042, the lower protective layer 2046, and the upper protective layer 2045 are equal to one another. An external shape of the hinge layer 2041 is larger than the external shapes of the intermediate layer 2042, the lower protective layer 2046, and the upper protective layer 2045. This dimensionally exceeding part of the hinge layer 2041 constitutes a hinge section 2041a.

The IC module 2030 includes a mounted substrate 2031 and an IC chip 2032.

The mounted substrate 2031 is a substrate for mounting the IC chip 2032. A lead frame (not illustrated) of the IC chip 2032 is connected to the mounted substrate 2031.

The IC chip 2032 is a semiconductor integrated circuit element and includes a central processing unit (CPU) corresponding to a controller and a storage device (for example, an EEPROM). Identification information, etc. is stored in the storage device. The IC chip 2032 is a type performing contactless communication with an external device such as a reader/writer.

The IC chip 2032 is mounted on a lower surface of the mounted substrate 2031 and is sealed (packaged) with resin, etc.

The antenna 2035 is a winding of a covered conductive wire in a coil shape (spiral shape). The covered conductive wire is formed by covering a periphery of the conductive wire with an electrical insulator.

Both ends of the antenna 2035 and the lead frame of the IC chip 2032 are connected by an electrically conductive paste, etc. In this way, the antenna 2035 and the IC chip 2032 are electrically connected to each other.

Connection between the IC chip 2032 and the antenna 2035 is not limited to the above-mentioned mode. For example, the lead frame of the IC chip 2032 and the both ends of the antenna 2035 may be directly connected to each other.

Communication between the IC module 2030 as well as the antenna 2035 and the external device corresponds to short-range wireless communication based on an electromagnetic induction scheme (for example, a communication scheme according to ISO/IEC14443, ISO/IEC15693, ISO/IEC18092, etc.).

The hinge layer 2041 is larger than external shapes of other layers 2042, 2045, and 2046 of the hinged laminated body 2020.

The hinge layer 2041 includes the hinge section 2041a.

Figure 22A:
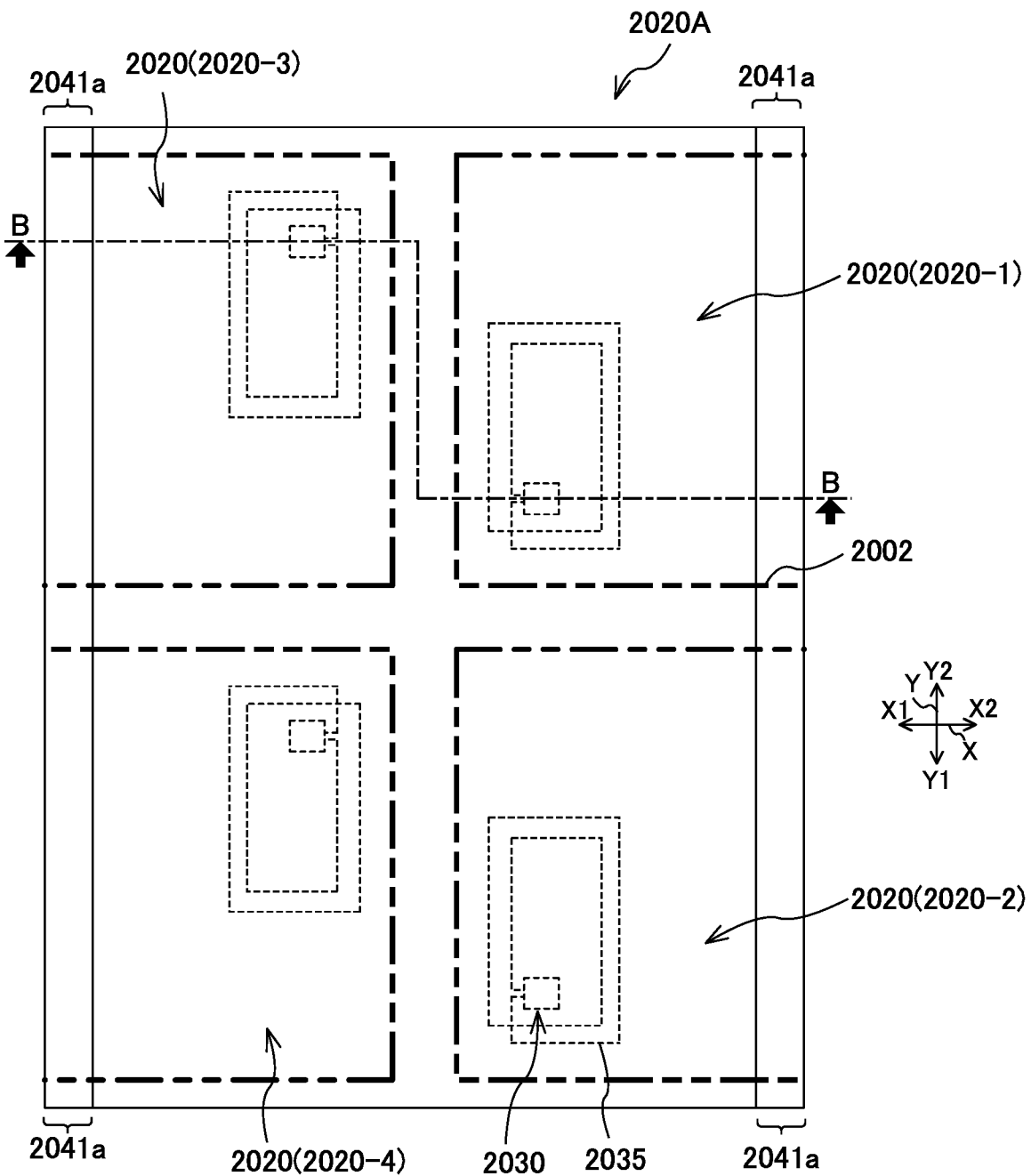
FIG. 22A is a diagram for description of a configuration of a layout sheet for a hinged laminated body 2020A of the 3-1st embodiment.
Figure 22B:
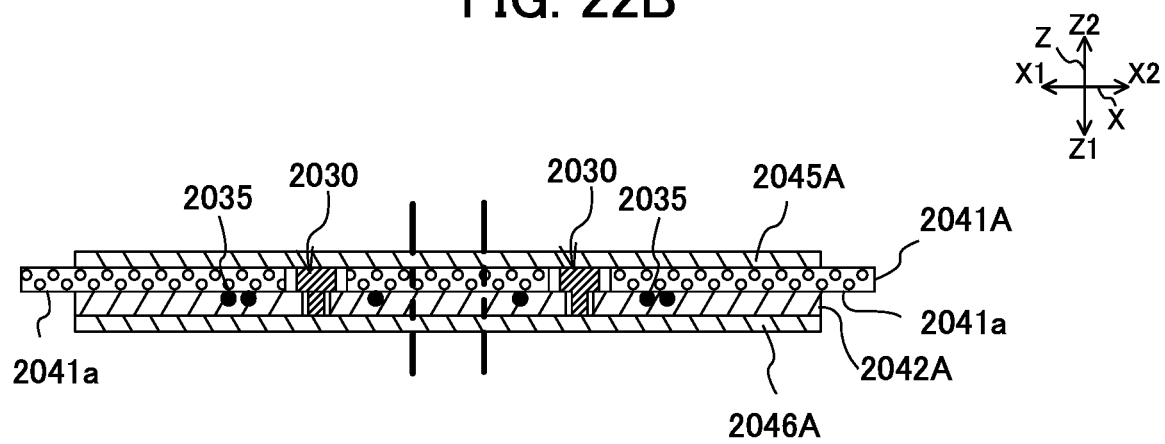
FIG. 22B is a diagram for description of the configuration of the layout sheet for the hinged laminated body 2020A of the 3-1st embodiment.

The hinge section 2041a is a portion bound into the passport 2001 (see FIG. 22B).

The hinge section 2041a protrudes from a side surface on a side bound into the passport 2001 (a right side surface in FIG. 21A and FIG. 21B) among side surfaces of the hinged laminated body 2020.

The hinge layer 2041 has sufficient flexibility for functioning as a hinge, sufficient tensile strength for preventing breaking, etc., sufficient durability for preventing breaking even after repeated bending, etc. For example, a layer in which a fiber such as PET, polyamide, etc. is disposed in a lattice shape between layers of a plurality of PET-G resin sheets, etc. may be used as the hinge layer 2041.

The intermediate layer 2042 is a layer for providing an adjustment related to a thickness of the IC chip 2032.

The upper protective layer 2045 is a sheet material that protects the IC module 2030, the hinge layer 2041, etc. by being laminated on the upper side Z2 of the hinge layer 2041.

Similarly, the lower protective layer 2046 is a sheet material that protects the IC module 2030, the intermediate layer 2042, etc. by being laminated on the lower side Z1 of the intermediate layer 2042.

[Mode of Layout Sheet for Hinged Laminated Body 2020A]

FIG. 22A and FIG. 22B are diagrams for description of a configuration of the layout sheet for the hinged laminated body 2020A of the 3-1st embodiment.

FIG. 22A is a diagram of the layout sheet for the hinged laminated body 2020A viewed from the upper side Z2 in the thickness direction Z (normal direction of the upper surface).

FIG. 22B is a cross-sectional view of the layout sheet for the hinged laminated body 2020A (B-B sectional view of FIG. 22A).

The (non-upper layer/lower layer-equipped) layout sheet for the hinged laminated body 2020A is a sheet material in which a plurality of (non-upper layer/lower layer-equipped) hinged laminated bodies 2020 is arranged.

When the layout sheet for the hinged laminated body 2020A is viewed from the upper side Z2, a total of four hinged laminated bodies 2020 are arranged, two in the longitudinal direction Y and two in the left-right direction X. The number of the hinged laminated bodies 2020 in the longitudinal direction Y may be appropriately set according to convenience in manufacturing. In addition, FIG. 22A and FIG. 22B illustrate an example in which a space 2003 (blank) is provided between adjacent hinged laminated bodies 2020. However, the space 2003 may be deleted as appropriate.

In a hinged laminated body 2020 on the left side X1, a hinge section 2041a is disposed on the left side X1. Meanwhile, in a hinged laminated body 2020 on the right side X2, a hinge section 2041a is disposed on the right side X2. Two hinged laminated bodies 2020 on the left side X1 and two hinged laminated bodies 2020 on the right side X2 are point-symmetrically disposed.

According to the above configuration, in two hinged laminated bodies 2020 (2020-1 and 2020-3) adjacent to each other in the left-right direction X, hinge sections 2041a thereof are disposed on opposite sides of the layout sheet for the hinged laminated body 2020A. This description is applied to two hinged laminated bodies 2020 (2020-2 and 2020-4) adjacent to each other in the left-right direction X.

In addition, in two hinged laminated bodies 2020 (2020-1 and 2020-2) adjacent to each other in the longitudinal direction Y, hinge sections 2041a thereof are disposed along a right side (at least one side) of the layout sheet for the hinged laminated body 2020A. Similarly, in two hinged laminated bodies 2020 (2020-3 and 2020-4) adjacent to each other in the longitudinal direction Y, hinge sections 2041a thereof are disposed along a left side (at least one side) of the layout sheet for the hinged laminated body 2020A.

A laminated configuration of the layout sheet for the hinged laminated body 2020A corresponds to a laminated configuration of the hinged laminated body 2020.

That is, in the layout sheet for the hinged laminated body 2020A, a lower protective layer sheet material 2046A, an intermediate layer sheet material 2042A, a hinge layer sheet material 2041A, and an upper protective layer sheet material 2045A are laminated in this order from the lower side Z1 to the upper side Z2.

The hinge layer sheet material 2041A is a sheet material in which four hinge layers 2041 are arranged in the XY plane direction. Similarly, the intermediate layer sheet material 2042A, the upper protective layer sheet material 2045A, and the lower protective layer sheet material 2046A are sheet materials in which members of four intermediate layers 2042, four upper protective layers 2045, and four lower protective layers 2046 are arranged, respectively. Arrangement of the four members of each of the sheet materials corresponds to arrangement of the four hinged laminated bodies 2020 of the layout sheet for the hinged laminated body 2020A.

External shapes of the intermediate layer sheet material 2042A, the upper protective layer sheet material 2045A, and the lower protective layer sheet material 2046A (hereinafter also referred to as other sheet materials 2042A, 2045A, and 2046A) are equal to one another.

An external shape of the hinge layer sheet material 2041A is larger than the external shapes of other sheet materials 2042A, 2045A, and 2046A.

For this reason, the hinge layer sheet material 2041A is laminated on the entire surface of the layout sheet for the hinged laminated body 2020A. A part of the external shape of the hinge layer sheet material 2041A exceeding the other sheet materials 2042A, 2045A, and 2046A is laminated in a state of protruding from left and right side surfaces. Left and right protruding lengths are equal to each other. A length of the hinge layer sheet material 2041A in the longitudinal direction Y is the same as lengths of the other sheet materials 2042A, 2045A, and 2046A.

[Configuration of Single Part of Hinged Laminated Body 2010]

FIG. 23A and FIG. 23B are diagrams for description of a configuration of a single part of a hinged laminated body 2010 of the 3-1st embodiment.

FIG. 23A is a diagram of the hinged laminated body 2010 viewed from the upper side Z2 in the thickness direction Z (a normal direction of an upper surface).

FIG. 23B is a cross-sectional view (B-B sectional view of FIG. 23A) of the hinged laminated body 2010.

FIG. 23A and FIG. 23B illustrate a state in which the hinged laminated body 2010 develops color to describe print content of a laser color development layer 2052. FIG. 23B is a cross-sectional view passing through an IC module 2030 and illustrates color development of the laser color development layer 2052. Printing of the laser color development layer 2052 may be performed after the hinged laminated body 2010 is bound into the passport 2001.

Figure 24A:
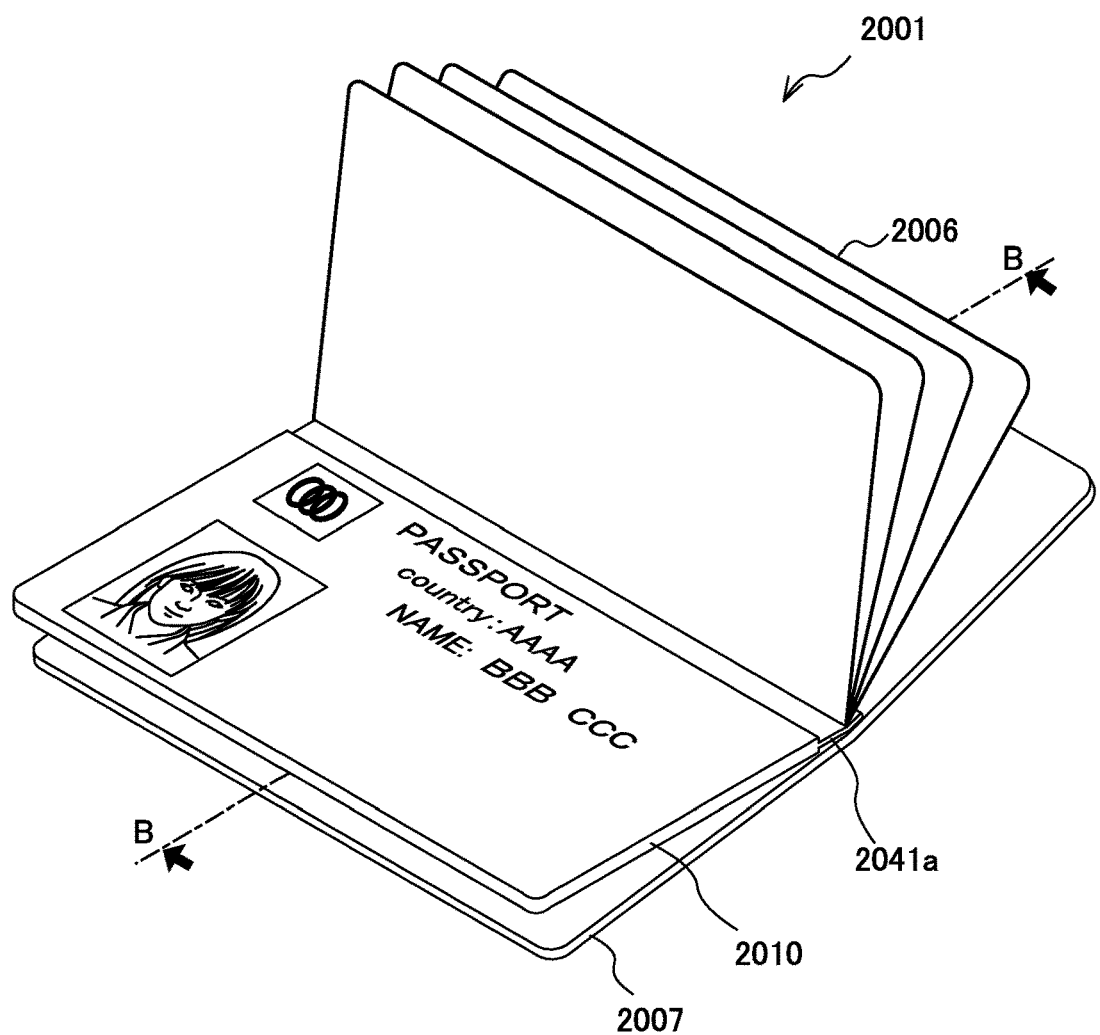
FIG. 24A is a diagram for description of a passport 2001 of the 3-1st embodiment.
Figure 24B:
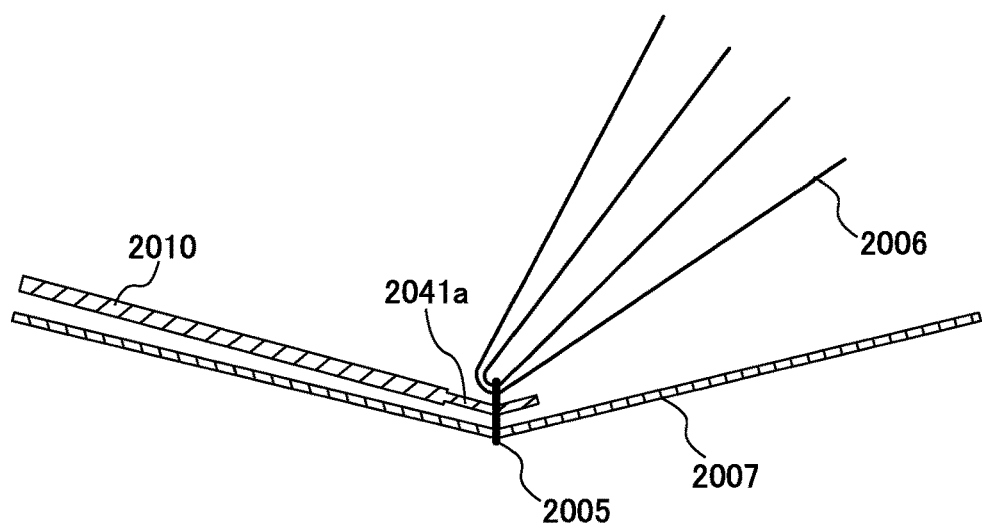
FIG. 24B is a diagram for description of the passport 2001 of the 3-1st embodiment.

FIG. 24A and FIG. 24B are diagrams for description of the passport 2001 of the 3-1st embodiment.

FIG. 24A is a perspective view of a state in which a page formed by the hinged laminated body 2010 is open.

FIG. 24B is a cross-sectional view (B-B sectional view of FIG. 24A) of the state in which the page formed by the hinged laminated body 2010 is open.

The (upper layer/lower layer-equipped) hinged laminated body 2010 includes the (non-upper layer/lower layer-equipped) hinged laminated body 2020, the upper layer 2050, and the lower layer 2060.

As illustrated in FIG. 24A and FIG. 24B, a hinge section 2041a of the hinged laminated body 2020 is bound together with other pages 2006 and a cover 2007 using a thread 2005, etc. In this way, the hinged laminated body 2010 is bound into the passport 2001.

As illustrated in FIG. 23A and FIG. 23B, the upper layer 2050 is laminated on the upper side Z2 of the hinged laminated body 2020, and the lower layer 2060 is laminated on the lower side Z1 of the hinged laminated body 2020.

External shapes of the upper layer 2050 and the lower layer 2060 are equal to external shapes of other sheet materials 2042A, 2045A, and 2046A of the hinged laminated body 2020. For this reason, the hinge section 2041a of the hinged laminated body 2020 protrudes to the right side X2 from right side surfaces of these layers even in a state of the hinged laminated body 2010.

The upper layer 2050 includes a base material layer 2051, the laser color development layer 2052, and a transparent protective layer 2055. These layers are laminated in this order from the lower side Z1 to the upper side Z2.

The base material layer 2051 is a layer corresponding to a base material of the hinged laminated body 2010. A color of the base material layer 2051 preferably has high concealing property not transmitting light (for example, white, etc.).

The base material layer 2051 includes a print layer 2051a on the upper side Z2. The print layer 2051a is printed on the base material layer 2051 by offset printing, etc. Print content of the print layer 2051a is a character, a pattern, a symbol, etc. according to a specification of the passport 2001. In the example of FIG. 23A and FIG. 23B, the print content of the print layer 2051a is character information 2051b of "PASSPORT", "country: AAAA", and "NAME:". The print content is common to all users. That is, this print content does not include individual information of the user (for example, a photograph, a name, etc. of the user).

The laser color development layer 2052 has translucency and is colorless and transparent. The laser color development layer 2052 contains a color developer. For this reason, a range of the laser color development layer 2052 irradiated with laser light generates heat and develops a black color. In the embodiment, such color development is also referred to as typing or printing.

Print content of the laser color development layer 2052 is individual information of the user. In the example of FIG. 23A and FIG. 23B, only a photograph image 2052b and information "BBB CCC" of a name 2052c of the user are illustrated. However, in practice, information such as a date of birth, a passport number, etc. is printed.

Alternatively, the material of the laser color development layer 2052 may not contain the color developer as long as color is developed by irradiation with laser light. In addition, color development may alternatively correspond to a color other than black.

The transparent protective layer 2055 is a layer having translucency. The transparent protective layer 2055 is a protective layer for protecting the laser color development layer 2052.

The lower layer 2060 includes a base material layer 2061 and a transparent protective layer 2065. These layers are laminated in this order from the upper side Z2 to the lower side Z1. The base material layer 2061 and the transparent protective layer 2065 are layers similar to the base material layer 2051 and the transparent protective layer 2055 of the upper layer 2050.

That is, the base material layer 2061 is a layer corresponding to a base material of the hinged laminated body 2010 and has a color of a high concealing property. In addition, the base material layer 2061 includes a print layer 2061a on the lower side Z1. This print content (not illustrated) is common to all users.

In addition, the transparent protective layer 2065, which has translucency, is a protective layer for protecting the base material layer 2061 and the print layer 2061a thereof.

According to the above configuration, the print content of the laser color development layer 2052 of the upper layer 2050 are observable through the transparent protective layer 2055. The print content of the print layer 2051a of the base material layer 2051 is observable through the laser color development layer 2052 and the transparent protective layer 2055. In addition, print content of the print layer 2061a of the base material layer 2061 of the lower layer 2060 is observable through the transparent protective layer 2065.

In addition, since the base material layers 2051 and 2061 have a high light concealing property, the hinged laminated body 2020 may not be visually recognized. For this reason, the hinged laminated body 2010 may blind a part such as the antenna 2035, and thus an appearance is excellent.

[Manufacturing Method]

FIG. 25A to FIG. 25E are cross-sectional views for description of a method of manufacturing the layout sheet for the hinged laminated body 2020A and the layout sheet for the hinged laminated body 2010A of the 3-1st embodiment.

(Method of Manufacturing Layout Sheet for Hinged Laminated Body 2020A)

When the layout sheet for the hinged laminated body 2020A is manufactured, the hinge layer sheet material 2041A, the intermediate layer sheet material 2042A, the upper protective layer sheet material 2045A, and the lower protective layer sheet material 2046A are manufactured in advance in a previous process thereof. A hole 2033 is provided by punching in each of the hinge layer sheet material 2041A and the intermediate layer sheet material 2042A. The hole 2033 forms a hole for housing the IC module 2030.

The layout sheet for the hinged laminated body 2020A may be manufactured according to the following processes.

(1) Formation Process of Antenna 2035

Figure 25A:
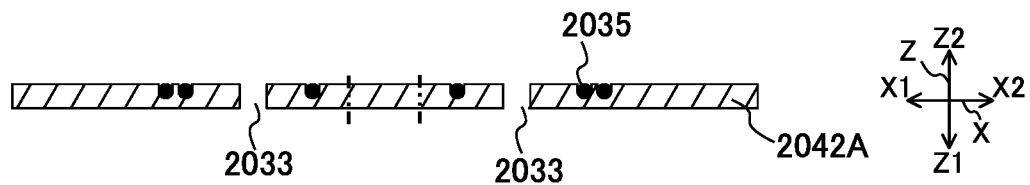
FIG. 25A is a cross-sectional view for description of the layout sheet for the hinged laminated body 2020A and a method of manufacturing the layout sheet for the hinged laminated body 2010A of the 3-1st embodiment.

As illustrated in FIG. 25A, in a state in which the antenna 2035 is disposed in a coil shape on an upper surface of the intermediate layer sheet material 2042A, the antenna 2035 is buried in the intermediate layer sheet material 2042A by hot pressing. Four antennas 2035 may be simultaneously buried. Alternatively, the antenna 2035 may be buried in the hinge layer sheet material 2041A. In this case, hot pressing may be performed in a state in which the four antennas 2035 are disposed in the hinge layer sheet material 2041A.

(2) Connection Process of IC Module 2030 and Antenna 2035

Figure 25B:
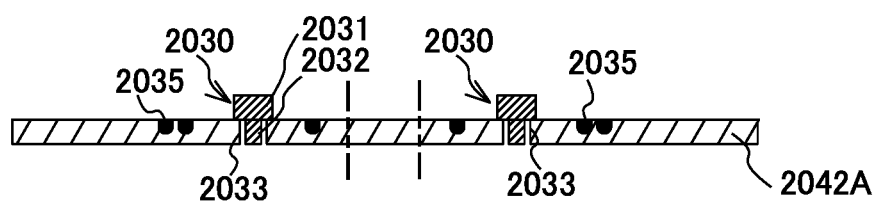
FIG. 25B is a cross-sectional view for description of the layout sheet for the hinged laminated body 2020A and the method of manufacturing the layout sheet for the hinged laminated body 2010A of the 3-1st embodiment.

As illustrated in FIG. 25B, the IC module 2030 is housed in the hole 2033 of the intermediate layer sheet material 2042A. In addition, the mounted substrate 2031 and the both ends of the antenna 2035 are electrically and mechanically connected by an electrically conductive paste, etc.

(3) Lamination Process

Figure 25C:
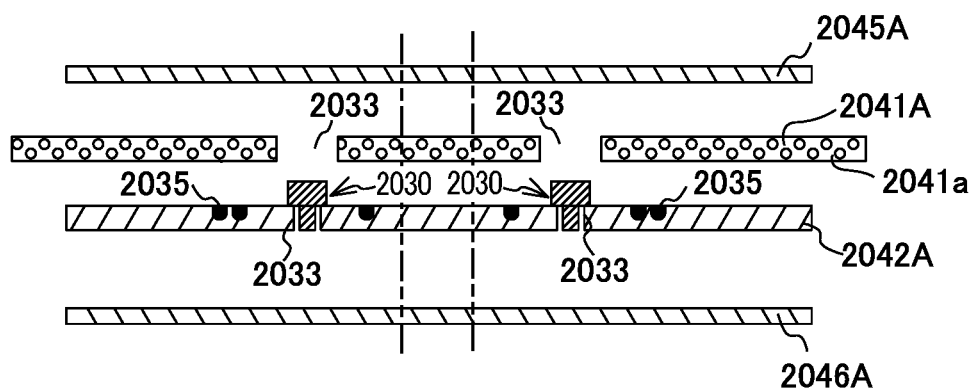
FIG. 25C is a cross-sectional view for description of the layout sheet for the hinged laminated body 2020A and the method of manufacturing the layout sheet for the hinged laminated body 2010A of the 3-1st embodiment.

As illustrated in FIG. 25C, the hinge layer sheet material 2041A, the intermediate layer sheet material 2042A, the upper protective layer sheet material 2045A, and the lower protective layer sheet material 2046A are laminated. Here, when the hinge layer sheet material 2041A and the intermediate layer sheet material 2042A are laminated, positioning is performed such that centers of holes 2033 of the two sheet materials align with each other. In this way, four hinge sections 2041a of the hinge layer sheet material 2041A protrude the same length from both ends of the intermediate layer sheet material 2042A.

In this way, the lamination process of the hinge layer sheet material 2041A has excellent workability.

(4) Hot Pressing Process

Figure 25D:
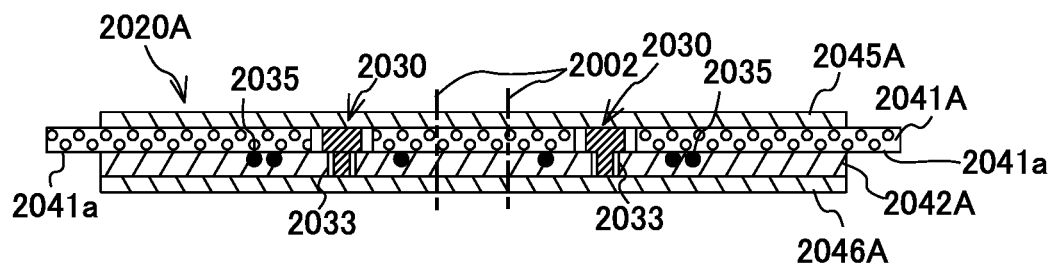
FIG. 25D is a cross-sectional view for description of the layout sheet for the hinged laminated body 2020A and the method of manufacturing the layout sheet for the hinged laminated body 2010A of the 3-1st embodiment.

As illustrated in FIG. 25C and FIG. 25D, hot pressing is performed in a state in which the respective sheet materials are laminated. In this way, the respective layers are thermally welded at interfaces thereof.

As described above, it is possible to manufacture the layout sheet for the hinged laminated body 2020A.

(Method of Manufacturing Layout Sheet for Hinged Laminated Body 2010A and Hinged Laminated Body 2010)

When the (upper layer/lower layer-equipped) layout sheet for the hinged laminated body 2010A is manufactured, the (non-upper layer/lower layer-equipped) layout sheet for the hinged laminated body 2020A, base material layer sheet materials 2051A and 2061A, a laser color development layer sheet material 2052A, and transparent protective layer sheet materials 2055A and 2065A are manufactured in advance in a previous process thereof.

The base material layer sheet material 2051A, the laser color development layer sheet material 2052A, and the transparent protective layer sheet material 2055A correspond to a sheet material (upper layer layout sheet) in which four members forming the upper layer 2050 are arranged in the XY plane direction at positions corresponding to the hinged laminated bodies 2020 of the layout sheet for the hinged laminated body 2020A. Similarly, the base material layer sheet material 2061A and the transparent protective layer sheet material 2065A correspond to a sheet material (lower layer layout sheet) in which four members forming the lower layer 2060 are arranged in the XY plane direction at positions corresponding to the hinged laminated bodies 2020 of the layout sheet for the hinged laminated body 2020A.

External shapes of the base material layer sheet materials 2051A and 2061A, the laser color development layer sheet material 2052A, and the transparent protective layer sheet materials 2055A and 2065A are equal to external shapes of other sheet materials 2042A, 2045A and 2046A of the layout sheet for the hinged laminated body 2020A.

The layout sheet for the hinged laminated body 2010A may be manufactured according to the following processes.

(1) Lamination Process of Upper Layer 2050 (Upper Layer Lamination Process)

The base material layer sheet material 2051A, the laser color development layer sheet material 2052A, and the transparent protective layer sheet material 2055A are laminated on the upper side Z2 of the layout sheet for the hinged laminated body 2020A (see FIG. 20B).

(2) Lamination Process of Lower Layer 2060 (Lower Layer Lamination Process)

The base material layer sheet material 2061A and the transparent protective layer sheet material 2065A are laminated on the lower side Z1 of the layout sheet for the hinged laminated body 2020A (see FIG. 20B).

(3) Hot Pressing Process

Figure 25E:
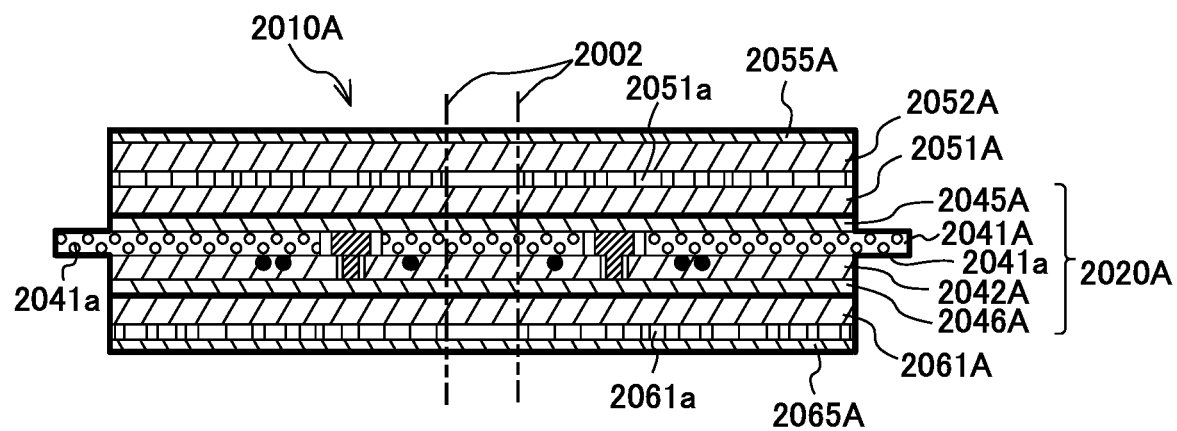
FIG. 25E is a cross-sectional view for description of the layout sheet for the hinged laminated body 2020A and the method of manufacturing the layout sheet for the hinged laminated body 2010A of the 3-1st embodiment.

As illustrated in FIG. 25E, hot pressing is performed in a state in which the respective members are laminated in the above processes (1) and (2). In this way, the respective layers are thermally welded at interfaces thereof.

Through the processes so far, it is possible to manufacture the layout sheet for the hinged laminated body 2010A in which the hinged laminated bodies 2010 are arranged.

(4) Individual Piece Separation Process

Separation into individual pieces is performed by cutting through punching the layout sheet for the hinged laminated body 2010A thermally welded in the above process (3) into external shapes of the respective hinged laminated bodies 2010. In this way, the four hinged laminated bodies 2010 may be manufactured.

In this case, a shape of the cut portion 2002 of each hinged laminated body 2010 is a U-shape in which the hinge section 2041a side is open (see FIG. 20A). In this way, the hinge section 2041a remains in each hinged laminated body 2010.

In this way, it is possible to manufacture the hinged laminated body 2010 in which the hinge section 2041a protrudes from a part of a side surface by cutting the layout sheet for the hinged laminated body 2010A (that is, the layout sheet for the hinged laminated body 2020A) such that four hinge sections 2041a remain. For this reason, it is possible to simultaneously manufacture a plurality of hinged laminated bodies 2010 similarly with conventional card manufacturing. In this way, the hinged laminated body 2010 may be manufactured easily and at low cost.

The hinged laminated body 2010 after individual piece separation is processed into the passport 2001 by binding the hinge section 2041a (see FIG. 24B). In addition, after (or before) being processed into the passport 2001, the hinged laminated body 2010 after individual piece separation is irradiated with laser light, thereby being printed with individual information of the user (the photograph image 2052b, the name 2052c, etc.) (see FIG. 23A).

In a state in which the layout sheet for the hinged laminated body 2010A is not cut or in a state in which the layout sheet for the hinged laminated body 2010A is cut in a form of a layout sheet for a hinged laminated body in which a plurality of (for example, two) hinged laminated bodies 2010 is connected to each other, binding may be performed in a mode in which a plurality of passports is arranged (so-called multiple layout).

In this case, after binding, the layout sheet for the hinged laminated body 2010A is separated into individual pieces corresponding to the hinged laminated bodies 2010 by separating the passport into individual pieces. In this case, separation into individual pieces corresponding to the hinged laminated bodies 2010 may be performed after binding, and thus a binding process may be performed according to a specification of a binding machine, convenience in manufacturing, etc.

As described above, when the hinged laminated body 2010 of the present embodiment is manufactured using the layout sheet for the hinged laminated body 2020A, the hinged laminated body 2010 in which the hinge section 2041a protrudes may be manufactured easily and at low cost.

(3-2nd Embodiment)

Next, a description will be given of a 3-2nd embodiment of the invention.

In the following description and drawings, a portion having the same function as that of the above-described 3-1st embodiment will be appropriately denoted by the same reference numeral or the same suffix (last two digits), and a repeated description will be appropriately omitted.

Figure 26A:
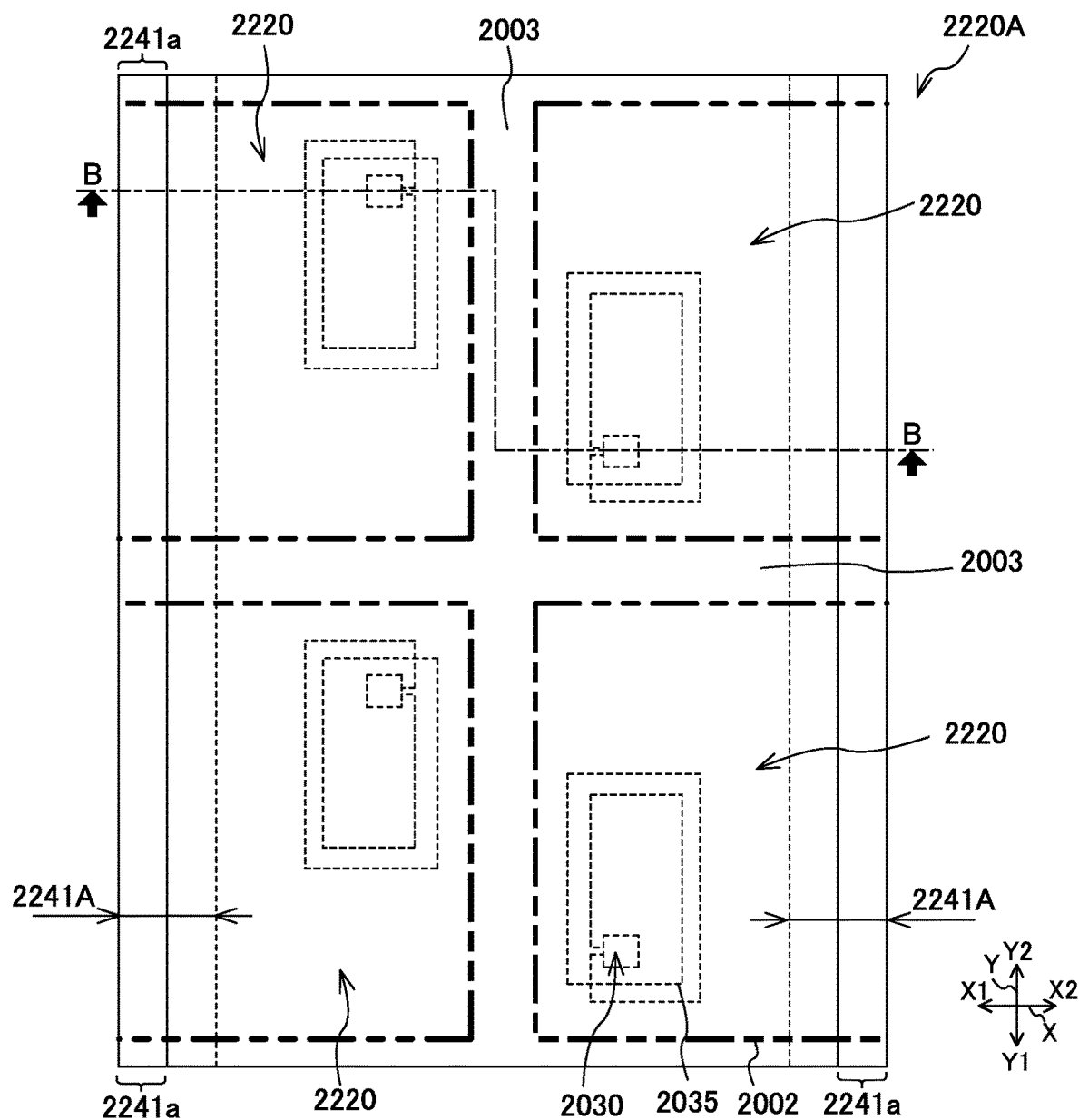
FIG. 26A is a diagram for description of a layout sheet for a hinged laminated body 2220A of a 3-2nd embodiment.
Figure 26B:
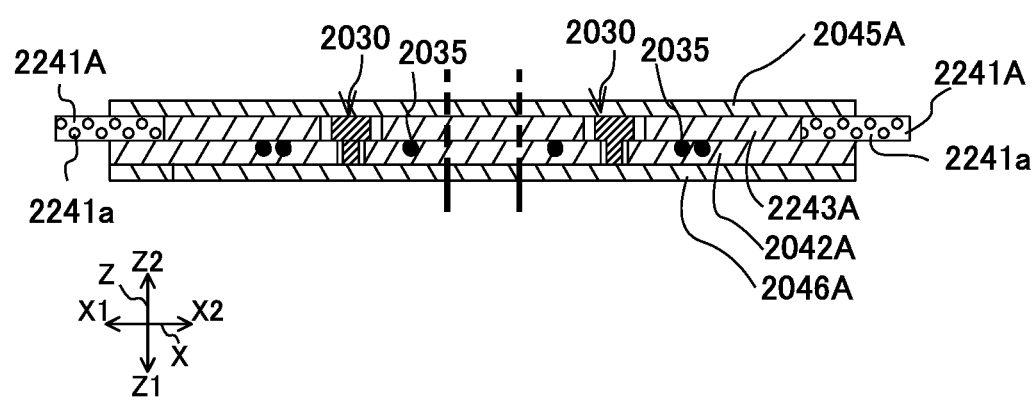
FIG. 26B is a diagram for description of the layout sheet for the hinged laminated body 2220A of the 3-2nd embodiment.
Figure 26C:
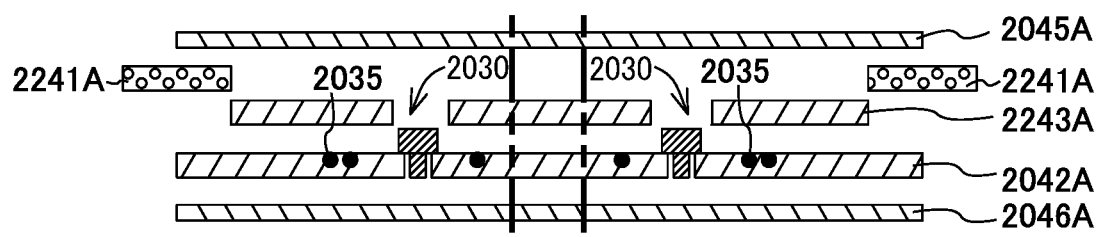
FIG. 26C is a diagram for description of the layout sheet for the hinged laminated body 2220A of the 3-2nd embodiment.

FIG. 26A to FIG. 26C are diagrams for description of a layout sheet for a hinged laminated body 2220A of the 3-2nd embodiment.

FIG. 26A is a diagram of the layout sheet for the hinged laminated body 2220A viewed from an upper side Z2 in a thickness direction Z (normal direction of an upper surface).

FIG. 26B is a cross-sectional view of the layout sheet for the hinged laminated body 2220A (B-B sectional view of FIG. 26A).

FIG. 26C is a cross-sectional view for description of a method of manufacturing the layout sheet for the hinged laminated body 2220A.

As illustrated in FIG. 26A and FIG. 26B, in the layout sheet for the hinged laminated body 2220A, two hinge layer sheet materials 2241A are disposed only at an edge of a side (at least one side) on a left side X1 and an edge of a side (at least one side) on a right side X2, respectively. That is, the respective hinge layer sheet materials 2241A are disposed only at edges along a left side surface and a right side surface corresponding to side surfaces from which hinge sections 2241a protrude.

In a left-right direction X, a thickness adjustment layer sheet material 2243A is laminated inside the two hinge layer sheet materials 2241A. A thickness of the thickness adjustment layer sheet material 2243A is the same as a thickness of the hinge layer sheet materials 2241A. That is, the thickness adjustment layer sheet material 2243A provides an adjustment related to the thickness of the hinge layer sheet materials 2241A. The thickness adjustment layer sheet material 2243A is formed of the similar material as that of the intermediate layer sheet material 2042A.

The layout sheet for the hinged laminated body 2220A may form the upper surface and the lower surface flat by including the thickness adjustment layer sheet material 2243A.

As illustrated in FIG. 26C, when the layout sheet for the hinged laminated body 2220A is manufactured, first, the thickness adjustment layer sheet material 2243A is laminated on the intermediate layer sheet material 2042A.

Thereafter, the hinge layer sheet materials 2241A and the intermediate layer sheet material 2042A are positioned such that a part forming the hinge section 2241a of the hinge layer sheet material 2241A on the right side X2 protrudes from the intermediate layer sheet material 2042A. Similarly, the hinge layer sheet material 2241A on the left side X1 and the intermediate layer sheet material 2042A are positioned.

In this way, in a state in which the hinge layer sheet materials 2241A are positioned and laminated, the respective layers are thermally welded at interfaces thereof by a hot pressing process similarly to the 3-1st embodiment (see FIG. 25C and FIG. 25D).

As described above, it is possible to manufacture the layout sheet for the hinged laminated body 2220A.

As described above, since the hinge layer sheet materials 2241A are disposed only along the edges at which the hinge sections 2241a are provided in the layout sheet for the hinged laminated body 2220A of the present embodiment, it is possible to reduce external shapes of the hinge layer sheet materials 2241A. In this way, the layout sheet for the hinged laminated body 2220A may suppress material cost, and thus is manufactured at low cost.

(3-3rd Embodiment)

Next, a description will be given of a 3-3rd embodiment of the invention.

Figure 27B:
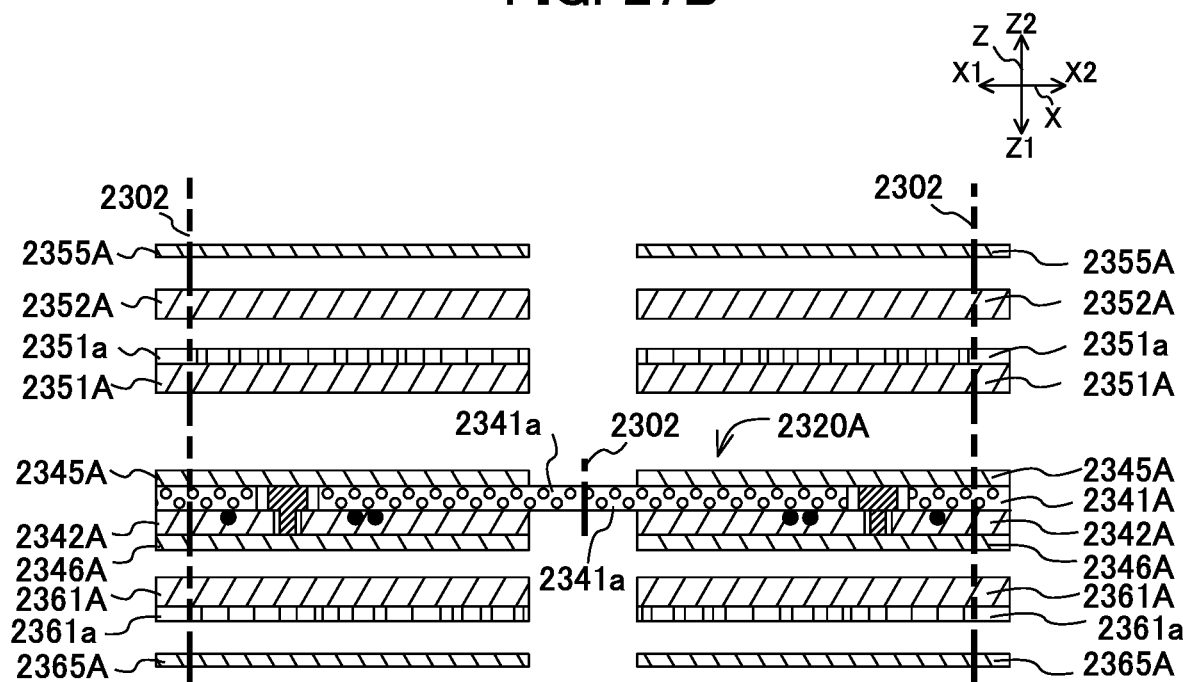
FIG. 27B is a diagram for description of the layout sheet for the hinged laminated body 2310A of the 3-3rd embodiment.

FIG. 27A and FIG. 27B are diagrams for description of a layout sheet for a hinged laminated body 2310A of a 3-3rd embodiment (diagrams corresponding to FIG. 20A and FIG. 20B).

FIG. 27A is a diagram of the layout sheet for the hinged laminated body 2310A viewed from an upper side Z2 in a thickness direction Z (a normal direction of an upper surface).

FIG. 27B is a cross-sectional view (B-B sectional view of FIG. 27A) of the layout sheet for the hinged laminated body 2310A.

(Configuration of Layout Sheet for Hinged Laminated Body 2310A)

A configuration of a single part of a hinged laminated body 2310 of the present embodiment is similar to that in the 3-1st embodiment.

However, hinged laminated bodies 2310 adjacent to each other in a left-right direction X are disposed such that side surfaces from which hinge sections 2341a protrude are inside the layout sheet for the hinged laminated body 2310A. The hinged laminated bodies 2310 adjacent to each other in the left-right direction X are continuous as a result of the hinge sections 2341a being connected to each other.

(Configuration of Layout Sheet for Hinged Laminated Body 2320A)

Figure 28B:
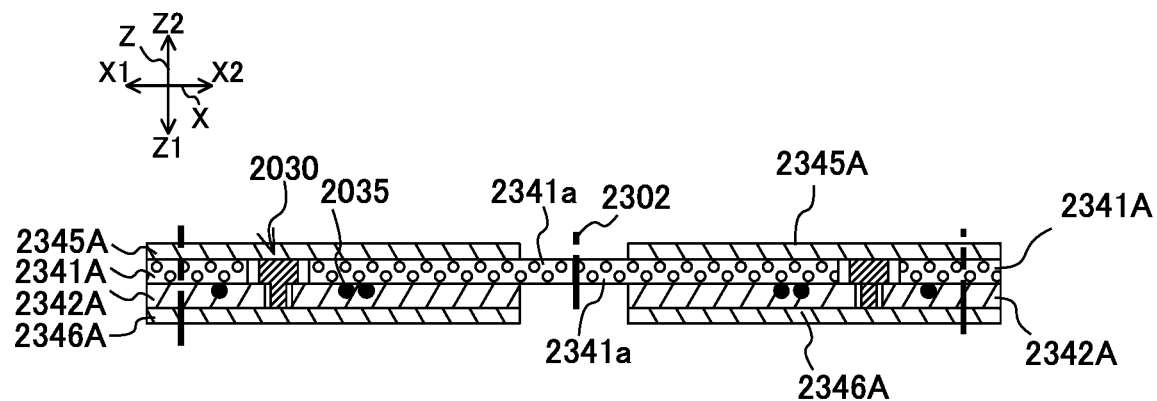
FIG. 28B is a diagram for description of the layout sheet for the hinged laminated body 2320A of the 3-3rd embodiment.
Figure 28C:
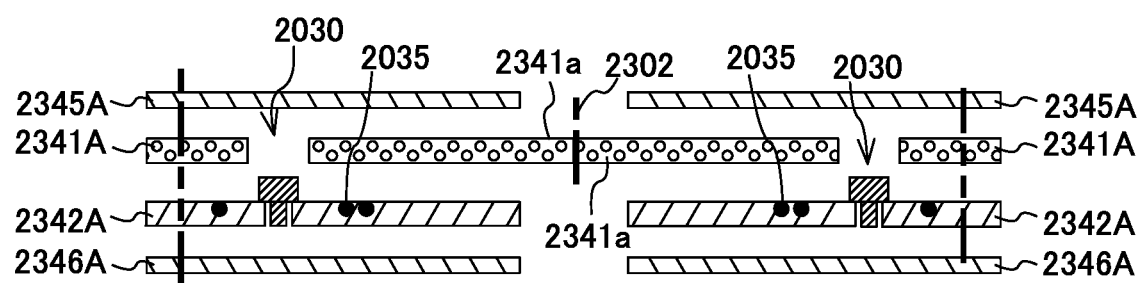
FIG. 28C is a diagram for description of the layout sheet for the hinged laminated body 2320A of the 3-3rd embodiment.

FIG. 28A to FIG. 28C are diagrams for description of a layout sheet for a hinged laminated body 2320A of the 3-3rd embodiment.

FIG. 28A is a diagram of the layout sheet for the hinged laminated body 2320A viewed from the upper side Z2 in the thickness direction Z (a normal direction of an upper surface).

FIG. 28B is a cross-sectional view (B-B sectional view of FIG. 28A) of the layout sheet for the hinged laminated body 2320A.

FIG. 28C is a cross-sectional view for description of a method of manufacturing the layout sheet for the hinged laminated body 2320A.

As illustrated in FIG. 28A and FIG. 28B, in the layout sheet for the hinged laminated body 2320A, similarly to the hinged laminated bodies 2310 of the layout sheet for the hinged laminated body 2310A, four hinged laminated bodies 2320 are disposed. That is, hinged laminated bodies 2320 adjacent to each other in the left-right direction X have hinge sections 2341a disposed toward the inside of the layout sheet for the hinged laminated body 2320A and are continuous through the hinge sections 2341a thereof.

In addition, a hinge layer sheet material 2341A is larger than an external shape of other sheet materials and is laminated on the entire surface of the layout sheet for the hinged laminated body 2320A.

(Method of Manufacturing Layout Sheet for Hinged Laminated Body 2320A)

As illustrated in FIG. 28A and FIG. 28C, manufacturing of the layout sheet for the hinged laminated body 2310A is performed such that the hinged laminated bodies 2320 are formed on respective left and right sides as below. Hereinafter, a different part from that of the 3-1st embodiment will be mainly described.

(1) As a configuration of two hinged laminated bodies 2320 on a left side X1, two antennas are formed in an intermediate layer sheet material 2342A having two intermediate layers. Similarly, two antennas are formed in an intermediate layer sheet material 2342A on a right side X2.

(2) As a configuration of the two hinged laminated bodies 2320 on the left side X1, an intermediate layer sheet material 2342A having two intermediate layers, an upper protective layer sheet material 2345A having two upper protective layers, and a lower protective layer sheet material 2346A having two lower protective layers are laminated with respect to one hinge layer sheet material 2341A (laminate manufactured in the above process (1)). Similarly, an intermediate layer sheet material 2342A on the right side X2, an upper protective layer sheet material 2345A on the right side X2, and a lower protective layer sheet material 2346A on the right side X2 are laminated with respect to one hinge layer sheet material 2341A (laminate manufactured in the above process (1)). Then, the layers are welded by hot pressing at interfaces thereof.

As described above, it is possible to manufacture the layout sheet for the hinged laminated body 2320A.

In the above process, the hinge layer sheet material 2341A and the other sheet materials may be positioned by aligning a left end or a right end, and thus workability is excellent. In a case in which this positioning is performed at an end on the hinge section 2341a side, an operation may be easily performed if a jig, etc. for brining ends of the other sheet materials 2341A, 2342A, 2345A, and 2346A into contact with each other is used.

(Method of Manufacturing Layout Sheet for Hinged Laminated Body 2310A and Hinged Laminated Body 2310)

As illustrated in FIG. 27B, similarly to the layout sheet for the hinged laminated body 2320A, manufacture of the layout sheet for the hinged laminated body 2310A is performed such that the hinged laminated bodies 2310 are formed on respective left and right sides. Hereinafter, a different part from that of the 3-1st embodiment will be mainly described.

(1) A base material layer sheet material 2351A, a laser color development layer sheet material 2352A, a transparent protective layer sheet material 2355A, a base material layer sheet material 2361A, and a transparent protective layer sheet material 2365A, each of which has two members, are laminated respectively on the left side X1 and the right side X2 of the layout sheet for the hinged laminated body 2320A manufactured in the above-described process. Then, the respective layers are welded at interfaces thereof by hot pressing.

Similarly to the method of manufacturing the layout sheet for the hinged laminated body 2320A, positioning of the respective members is excellent in workability.

(2) Separation into individual pieces is performed by cutting through pressing the layout sheet for the hinged laminated body 2310A thermally welded in the above process (1) into external shapes of the respective hinged laminated bodies 2310 (individual piece separation process).

In this case, shapes of cut portions 2302 of the respective hinged laminated bodies 2310 are rectangles corresponding to the respective hinged laminated bodies 2310. In the layout sheet for hinged laminated bodies 2310A adjacent to each other in the left-right direction X, inside cut portions 2302 coincide with each other. For this reason, the continuous hinge section 2341a is cut. In this way, the layout sheet for the hinged laminated bodies 2310A adjacent to each other in the left-right direction X is separated into left and right parts.

As described above, in the layout sheet for the hinged laminated body 2320A of the present embodiment, the hinged laminated bodies 2310 may be manufactured by making the hinge sections 2341a of the hinged laminated bodies 2320 adjacent to each other in the left-right direction X continuous and cutting the hinge sections. For this reason, similarly to the 3-1st embodiment, the hinged laminated body 2310 in which the hinge section 2341a protrudes may be manufactured easily and at low cost.

(3-4th Embodiment)

Next, a description will be given of a 3-4th embodiment of the invention. In the following description and drawings, a portion having the same function as that of the above-described 3-2nd and 3-3rd embodiments will be appropriately denoted by the same reference numeral or the same suffix (last two digits), and a repeated description will be appropriately omitted.

Figure 29A:
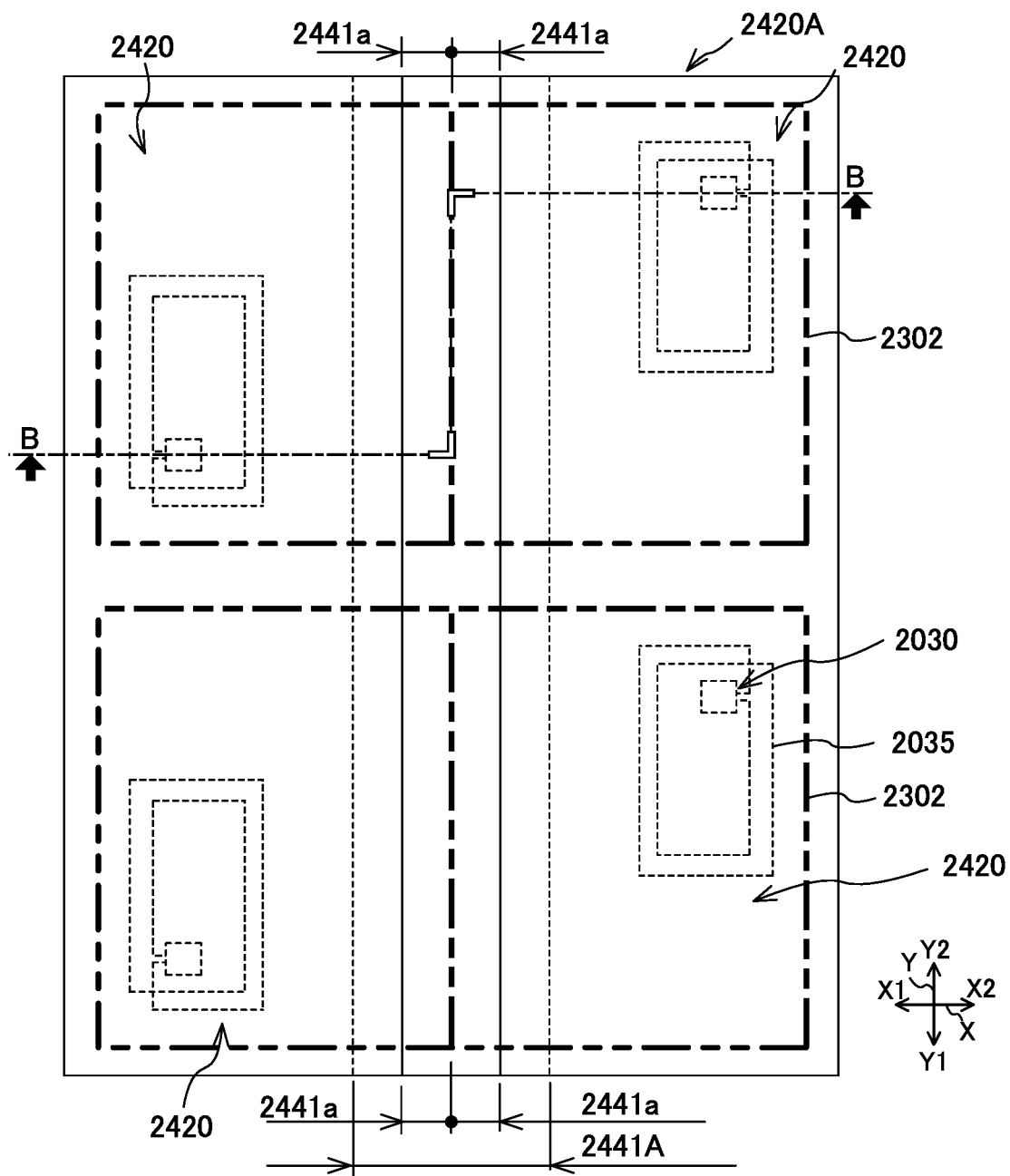
FIG. 29A is a diagram for description of a layout sheet for a hinged laminated body 2420A of a 3-4th embodiment.
Figure 29B:
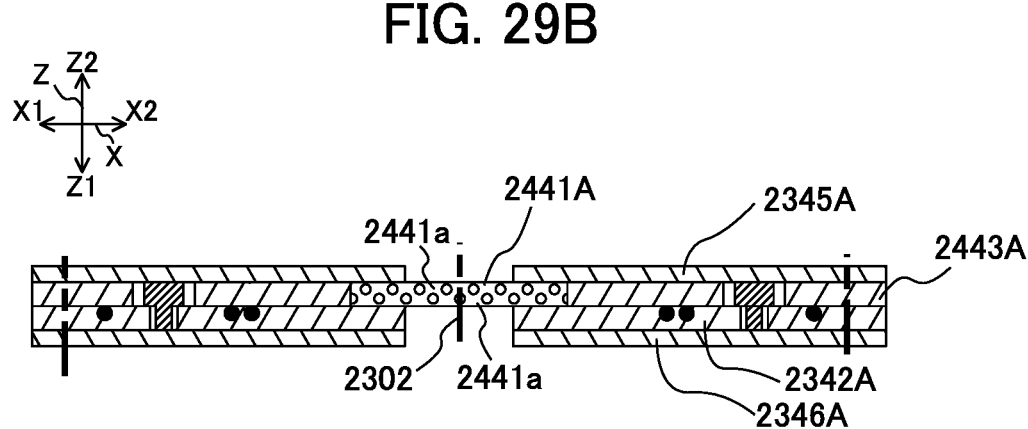
FIG. 29B is a diagram for description of the layout sheet for the hinged laminated body 2420A of the 3-4th embodiment.
Figure 29C:
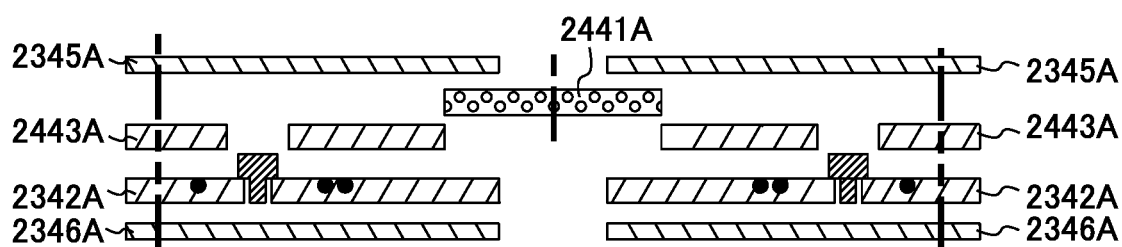
FIG. 29C is a diagram for description of the layout sheet for the hinged laminated body 2420A of the 3-4th embodiment.

FIG. 29A to FIG. 29C are diagrams for description of a layout sheet for a hinged laminated body 2420A of a 3-4th embodiment.

FIG. 29A is a diagram of the layout sheet for the hinged laminated body 2420A viewed from an upper side Z2 in a thickness direction Z (a normal direction of an upper surface).

FIG. 29B is a cross-sectional view (B-B sectional view of FIG. 29A) of the layout sheet for the hinged laminated body 2420A.

FIG. 29C is a cross-sectional view for description of a method of manufacturing the layout sheet for the hinged laminated body 2420A.

As illustrated in FIG. 29A and FIG. 29B, the layout sheet for the hinged laminated body 2420A is obtained by changing the hinge layer sheet material (see FIG. 28B) of the layout sheet for the hinged laminated body of the 3-3rd embodiment to the hinge layer sheet material and the thickness adjustment layer sheet material (see FIG. 26B) as in the second embodiment.

A hinge layer sheet material 2441A is disposed to extend in a longitudinal direction Y in a center range relative to left and right directions of the layout sheet for the hinged laminated body 2420A. In this way, in a hinged laminated body 2420 on a left side X1, a hinge layer sheet material 2441A is disposed only at an edge of a side (at least one side) on a right side X2. In addition, in a hinged laminated body 2420 on the right side X2, a hinge layer sheet material 2441A is disposed only at an edge of a side (at least one side) on the left side X1.

Further, similarly to the 3-3rd embodiment, hinged laminated bodies 2420 adjacent to each other in a left-right direction X are continuous through hinge sections 2441a thereof.

As illustrated in FIG. 29C, when the layout sheet for the hinged laminated body 2420A is manufactured, first, a thickness adjustment layer sheet material 2443A and an intermediate layer sheet material 2342A may be laminated, and a laminate in which an antenna and an IC module are formed may be manufactured, on each of the left side X1 and the right side X2. Then, laminates on the left side X1 and the right side X2 may be connected to each other by laminating the hinge layer sheet material 2441A on the laminates on the left side X1 and the right side X2.

Thereafter, according to the same processes as those of the 3-3rd embodiment, it is possible to manufacture the layout sheet for the hinged laminated body 2420A, the layout sheet for the hinged laminated body, and the hinged laminated body.

As described above, similarly to the 3-2nd embodiment, the layout sheet for the hinged laminated body 2420A of the present embodiment may reduce an external shape of the hinge layer sheet material 2441A, and thus is manufactured at low cost.

(Modifications)

(1) In the 3-1st to 3-4th embodiments, an example in which the (upper layer/lower layer-equipped) layout sheet for the hinged laminated body is cut to separate the (upper layer/lower layer-equipped) hinged laminated bodies into individual pieces has been shown. However, the invention is not limited thereto. The (non-upper layer/lower layer-equipped) hinged laminated bodies may be separated into individual pieces by cutting a single part of the (non-upper layer/lower layer-equipped) layout sheet for the hinged laminated body into external shapes of the (non-upper layer/lower layer-equipped) hinged laminated bodies (individual piece separation process).

In this mode, for example, it is possible to manufacture the (upper layer/lower layer-equipped) hinged laminated body by laminating another layer on the individual (non-upper layer/lower layer-equipped) hinged laminated body. In addition, the (non-upper layer/lower layer-equipped) hinged laminated body may be used as is for management of a booklet, etc. by binding the individual (non-upper layer/lower layer-equipped) hinged laminated body into the booklet without change.

In addition, when the (non-upper layer/lower layer-equipped) hinged laminated body is bound into the booklet without being changed to the (upper layer/lower layer-equipped) hinged laminated body as described above, similarly to the description of the individual piece separation process of the 3-1st embodiment, binding may be performed in a state in which the (non-upper layer/lower layer-equipped) layout sheet for the hinged laminated body is not cut or in a state in which the (non-upper layer/lower layer-equipped) layout sheet for the hinged laminated body is punched to form a (non-upper layer/lower layer-equipped) layout sheet for a hinged laminated body in which a plurality of (for example, two) (non-upper layer/lower layer-equipped) hinged laminated bodies is connected to each other, thereby performing binding and individual piece separation.

(2) In the embodiments, an example in which the hinged laminated bodies are arranged in both the left-right direction and the longitudinal direction in the layout sheet for the hinged laminated body has been shown. However, the invention is not limited thereto. It is possible to adopt a mode in which the hinged laminated bodies are arranged in one of the left-right direction and the longitudinal direction in the layout sheet for the hinged laminated body.

(3) A security film such as a hologram layer, etc. may be provided in the hinged laminated body of the embodiments.

In this case, for example, in FIG. 23A and FIG. 23B, the security film may be laminated between the laser color development layer 2052 and the base material layer 2051 (print layer 2051a).

(4) The laminated configuration of the hinged laminated body of the embodiments may be appropriately modified. For example, the configuration of FIG. 23A and FIG. 23B may be modified as below.

The print layer 2051a may not be provided on the base material layer 2051, and a transparent layer printed with the same content as that of the print layer 2051a may be laminated on the lower side of the transparent protective layer 2055 (that is, between the laser color development layer 2052 and the transparent protective layer 2055). In this case, a security film such as a hologram layer may be laminated between the laser color development layer 2052 and the printed transparent layer.

EXPLANATION OF REFERENCE NUMERALS

1 . . . passport, 10, 210, 310, 410, 510, 610 . . . hinged laminated body, 10A . . . layout sheet for hinged laminated body, 20, 220, 320, 420, 520, 620 . . . hinged laminated body, 20A . . . layout sheet for hinged laminated body, 30 . . . IC module, 31 . . . mounted substrate, 32 . . . IC chip, 35 . . . antenna, 41, 241, 341, 441, 541, 641 . . . hinge layer, 41a . . . hinge section, 42, 349, 449, 542, 642 . . . intermediate layer (non-hinge layer), 45 . . . upper protective layer, 46 . . . lower protective layer, 47, 347, 447, 547, 647 . . . IC module housing hole, 47a . . . first housing hole, 47b . . . second housing hole, 48, 248, 548, 648 . . . antenna buried groove, 50 . . . upper layer, 51, 61 . . . base material layer, 51a, 51c, 61a, 61c . . . print layer, 52 . . . laser color development layer, 55, 65 . . . transparent protective layer, 56 . . . upper layer window portion, 60 . . . lower layer, 66 . . . lower layer window portion, 70 . . . hologram layer 1001 . . . passport, 1010, 1210, 1310, 1410, 1510 . . . hinged laminated body, 1010A . . . layout sheet for hinged laminated body, 1020, 1220, 1320, 1420, 1520 . . . hinged laminated body, 1020A . . . layout sheet for hinged laminated body, 1030 . . . IC module, 1031 . . . mounted substrate, 1032 . . . IC chip, 1035 . . . antenna, 1041, 1241, 1341, 1441 . . . hinge layer, 1041a . . . hinge section, 1042, 1242, 1342, 1442, 1542 . . . thickness adjustment layer, 1043, 1349, 1449, 1543 . . . intermediate layer, 1045 . . . upper protective layer, 1046 . . . lower protective layer, 1047, 1347, 1447 . . . IC module housing hole, 1048, 1248 . . . antenna buried groove, 1050 . . . upper layer, 1051, 1061 . . . base material layer, 1051a, 1051c, 1061a, 1061c . . . print layer, 1052 . . . laser color development layer, 1055, 1065 . . . transparent protective layer, 1056 . . . upper layer window portion, 1060 . . . lower layer, 1066 . . . lower layer window portion, 1070 . . . hologram layer 2001 . . . passport, 2002, 2302 . . . cut portion, 2003, 2303 . . . space, 2010, 2310, hinged laminated body, 2010A, 2310A . . . layout sheet for hinged laminated body, 2020, 2220, 2320, 2420 . . . hinged laminated body, 2020A, 2220A, 2320A, 2420A . . . layout sheet for hinged laminated body, 2041 . . . hinge layer, 2041A, 2241A, 2441A . . . hinge layer sheet material, 2041a, 2241a, 2341a, 2441a . . . hinge section, 2042 . . . intermediate layer, 2042A, 2342A . . . intermediate layer sheet material, 2045 . . . upper protective layer, 2045A, 2345A . . . upper protective layer sheet material, 2046 . . . lower protective layer, 2046A, 2346A . . . lower protective layer sheet material, 2051 . . . base material layer, 2051A, 2351A . . . base material layer sheet material, 2052 . . . laser color development layer, 2052A, 2352A . . . laser color development layer sheet material, 2055 . . . transparent protective layer, 2055A, 2355A . . . transparent protective layer sheet material, 2061 . . . base material layer, 2061A, 2361A . . . base material layer sheet material, 2065 . . . transparent protective layer, 2065A, 2365A . . . transparent protective layer sheet material, 2243A, 2443A . . . thickness adjustment layer sheet material

The invention claimed is:

1. A hinged laminated body comprising:
an IC module having an IC chip capable of performing contactless communication;
a hinge layer having a hinge section bindable into a booklet; and
a non-hinge layer which is laminated on the hinge layer and does not have a hinge section,
wherein the hinge layer is provided on an entire surface of the hinged laminated body,
the hinge layer and the non-hinge layer have a housing hole penetrating across the two layers, and
the IC module is housed and held in the housing hole
wherein the IC module further has a mounted substrate on one surface of which the IC chip is mounted,
a width of the mounted substrate is larger than a width of the IC chip in a cross-sectional view, and
the housing hole is divided into a first housing hole on a side of the hinge layer and a second housing hole on a side of the non-hinge layer in the cross-sectional view, the first housing hole houses one of the mounted substrate and the IC chip, and the second housing hole houses the other one of the mounted substrate and the IC chip.

2. The hinged laminated body according to claim 1, wherein the first housing hole or the second housing hole housing the IC chip has a width not allowing the mounted substrate to be housed.

3. The hinged laminated body according to claim 1, wherein a melting temperature of the hinge layer is different from a melting temperature of the non-hinge layer.

4. The hinged laminated body according to claim 1, further comprising
an antenna connected to the IC chip,
wherein one of or both the hinge layer and the non-hinge layer have an antenna buried groove in which the antenna is buried.

5. The hinged laminated body according to claim 1, further comprising:
an upper layer laminated on an upper side of the hinge layer and the non-hinge layer; and
a lower layer laminated on a lower side of the hinge layer and the non-hinge layer.

6. A layout sheet for a hinged laminated body in which a plurality of hinged laminated bodies according to claim 1 is arranged.

7. A booklet in which the hinged laminated body according to claim 1 is bound at the hinge section included in the hinged laminated body.

8. A hinged laminated body comprising:
an IC module having an IC chip capable of performing contactless communication;
an antenna connected to the IC chip; and
a hinge layer having a hinge section bindable into a booklet,
an upper layer laminated on an upper side of the hinge layer and the thickness adjustment layer; and
a lower layer laminated on a lower side of the hinge layer and the thickness adjustment layer,
wherein the hinge layer is laminated on a part of the hinged laminated body when an upper surface of the hinged laminated body is viewed from the upper side in the thickness direction, and
the hinged laminated body further comprises a thickness adjustment layer which is laminated at a same position as a position of the hinge layer in a thickness direction, has a thickness corresponding to the hinge layer, and holds at least one of the IC module and the antenna,
wherein the hinge layer and/or the thickness adjustment layer has translucency,
the upper layer includes an upper layer window portion through which a part of the hinge layer and the thickness adjustment layer is visually recognizable, and
the lower layer includes a lower layer window portion through which a part of the hinge layer and the thickness adjustment layer is visually recognizable and which is provided in a region overlapping the upper layer window portion.

9. The hinged laminated body according to claim 8, wherein the thickness adjustment layer forms at least a part of a housing hole that holds the IC module by housing the IC module therein.

10. The hinged laminated body according to claim 8, further comprising
a housing hole that houses the IC module,
wherein the thickness adjustment layer covers an opening of the housing hole.

11. The hinged laminated body according to claim 8, further comprising
an antenna buried layer having an antenna buried groove in which the antenna is buried,
wherein the thickness adjustment layer holds the antenna by covering an opening of the antenna buried groove of the antenna buried layer.

12. The hinged laminated body according to claim 8, wherein the thickness adjustment layer includes an antenna buried groove in which the antenna is buried.

13. A layout sheet for a hinged laminated body in which a plurality of hinged laminated bodies according to claim 8 is arranged.

14. A booklet in which the hinged laminated body according to claim 8 is bound at the hinge section included in the hinged laminated body.

15. A layout sheet for a hinged laminated body in which a plurality of hinged laminated bodies is arranged,
wherein the hinged laminated body includes:
an IC chip capable of performing contactless communication;
an antenna connected to the IC chip; and
a hinge layer having a hinge section bindable into a booklet,
wherein hinge sections of adjacent hinged laminated bodies are disposed on opposite sides of the layout sheet for a hinged laminated body.

16. The layout sheet for a hinged laminated body according to claim 15,
wherein the hinge section protrudes at a side surface on a bound side.

17. The layout sheet for a hinged laminated body according to claim 15,
wherein hinge sections of adjacent hinged laminated bodies are disposed along at least one side of the layout sheet for a hinged laminated body.

18. The layout sheet for a hinged laminated body according to claim 15,
wherein a hinge layer sheet material in which hinge layers of the plurality of hinged laminated bodies are arranged is laminated exclusively at an edge of a side along a side surface from which the hinge section protrudes.

19. The layout sheet for a hinged laminated body according to claim 15,
wherein a hinge layer sheet material in which hinge layers of the plurality of hinged laminated bodies are arranged is larger than an external shape of another sheet material of the layout sheet for a hinged laminated body and is laminated on an entire surface of the layout sheet for a hinged laminated body.

20. The layout sheet for a hinged laminated body according to claim 15,
wherein hinge sections of adjacent hinged laminated bodies are disposed along at least one side of the layout sheet for a hinged laminated body, and
a hinge layer sheet material in which hinge layers of the adjacent hinged laminated bodies are arranged is laminated exclusively at an edge along at least the one side.

21. A method of manufacturing a hinged laminated body using the layout sheet for the hinged laminated body according to claim 15, the method comprising:
an individual piece separation process of separating the hinged laminated bodies into individual pieces such that the hinge sections remain by cutting the layout sheet for the hinged laminated body.

22. A method of manufacturing a hinged laminated body using the layout sheet for the hinged laminated body according to claim 15, the method comprising:
- an upper layer lamination process of laminating an upper layer layout sheet in which a plurality of upper layers is arranged on the layout sheet for the hinged laminated body;
- a lower layer lamination process of laminating a lower layer layout sheet in which a plurality of lower layers is arranged on the layout sheet for the hinged laminated body;
- a hot pressing process of thermally welding layers of the layout sheet for the hinged laminated body at interfaces thereof, and the upper layer layout sheet and the lower layer layout sheet; and
- an individual piece separation process of separating the hinged laminated bodies into individual pieces such that the hinge sections remain by cutting the thermally welded layers.

23. A layout sheet for a hinged laminated body in which a plurality of hinged laminated bodies is arranged,
wherein the hinged laminated body includes:
- an IC chip capable of performing contactless communication;
- an antenna connected to the IC chip;
- a hinge layer having a hinge section bindable into a booklet; and hinge sections of adjacent hinged laminated bodies are disposed on an inside of the layout sheet for a hinged laminated body, and the adjacent hinged laminated bodies are connected through the hinge sections thereof,
wherein the hinge layer of the hinged laminated body is laminated exclusively at an edge of a side along a side surface from which the hinge section protrudes.

24. The layout sheet for a hinged laminated body according to claim 23,
wherein the hinge section protrudes at a side surface on a bound side.

25. The layout sheet for a hinged laminated body according to claim 23,
wherein a hinge layer sheet material in which hinge layers of the plurality of hinged laminated bodies are arranged is larger than an external shape of another sheet material of the layout sheet for a hinged laminated body and is laminated on an entire surface of the layout sheet for a hinged laminated body.

26. A hinged laminated body comprising:
- an IC module having an IC chip capable of performing contactless communication;
- a hinge layer having a hinge section bindable into a booklet; and
- a non-hinge layer which is laminated on the hinge layer and does not have a hinge section,
- an upper layer laminated on an upper side of the hinge layer and the non-hinge layer; and
- a lower layer laminated on a lower side of the hinge layer and the non-hinge layer, wherein the hinge layer is provided on an entire surface of the hinged laminated body,
the hinge layer and the non-hinge layer have a housing hole penetrating across the two layers, and
the IC module is housed and held in the housing hole
wherein the hinge layer and the non-hinge layer have translucency,
the upper layer includes an upper layer window portion through which a part of one of the hinge layer and the non-hinge layer close to the upper layer is visually recognizable, and
the lower layer includes a lower layer window portion through which a part of one of the hinge layer and the non-hinge layer close to the lower layer is visually recognizable and which is provided in a region overlapping the upper layer window portion.

* * * * *